United States Patent [19]
Pfeiffer et al.

[11] Patent Number: 5,198,644
[45] Date of Patent: Mar. 30, 1993

[54] SYSTEM FOR DISPLAY OF PRICES AND RELATED METHOD

[75] Inventors: James W. Pfeiffer, Santa Clara; Larry A. Lincoln, Milpitas; Donald E. Pezzolo, Los Altos; Robert F. Garry, Jr.; Kent A. Fritz, both of San Jose, all of Calif.

[73] Assignee: Diablo Research Corporation, Sunnyvale, Calif.

[21] Appl. No.: 870,731

[22] Filed: Apr. 16, 1992

Related U.S. Application Data

[63] Continuation of Ser. No. 348,355, May 5, 1989, abandoned.

[51] Int. Cl.$^5$ ............................................. G06F 15/24
[52] U.S. Cl. ..................................... 235/383; 235/385
[58] Field of Search ....................... 235/383, 385, 472; 340/825.07, 825.35, 825.69, 825.72, 825.73, 825.75

[56] References Cited

U.S. PATENT DOCUMENTS

| | | | |
|---|---|---|---|
| 1,326,727 | 12/1919 | Hammond | 340/825.75 X |
| 3,395,390 | 7/1968 | Parker et al. | 340/825.75 X |
| 4,002,886 | 1/1977 | Sundelin | |
| 4,139,149 | 2/1979 | Crepeau et al. | |
| 4,198,141 | 4/1980 | Tominaga et al. | 340/600 X |
| 4,423,319 | 12/1983 | Jacobsen | 235/472 |
| 4,434,510 | 2/1994 | Lemelson | 455/603 |
| 4,500,880 | 2/1985 | Gomersall et al. | |
| 4,521,677 | 6/1985 | Sarwin | 235/383 X |
| 4,766,295 | 8/1988 | Davis et al. | 235/383 |
| 4,879,756 | 11/1989 | Stevens et al. | 340/825.69 X |
| 4,888,709 | 12/1989 | Revesz et al. | 340/825.15 X |
| 4,916,441 | 4/1990 | Gombrich | 235/472 X |
| 5,019,811 | 5/1991 | Olsson et al. | 340/825.17 |

FOREIGN PATENT DOCUMENTS

| | | |
|---|---|---|
| 0167072 | 6/1986 | European Pat. Off. . |
| 0299355 | 7/1988 | European Pat. Off. . |
| 2561422 | 12/1984 | France . |
| 2604315 | 9/1987 | France . |
| WO83/00251 | 6/1982 | World Int. Prop. O. . |

OTHER PUBLICATIONS

IBM Technical Disclosure Bulletin vol. 34 No. 1 Jun. 1991 "Automated Labeling System", pp. 453–458.
Bureaux d'Etudes Automatismes No. 39, Dec. 1987, Paris–France pp. 41–42; J. -F. Desclaux: '16000 afficheurs: les faire tour dialoguer *the whole document*.

*Primary Examiner*—John W. Shepperd
*Attorney, Agent, or Firm*—Skjerven, Morrill, MacPherson, Franklin & Friel

[57] ABSTRACT

A price display system for a store includes spread spectrum radio broadcasting of UPC and price data from a transmitter in the store to a large number of receivers. Each receiver is connected to one or more LCD displays attached to the store shelves, and each receiver provides the relevant information to each of the connected displays. The displays and receivers are battery powered.

39 Claims, 49 Drawing Sheets

SHELF BLOCK DIAGRAM

DISPLAY MODULE I/O MAP

| I/O PORT | MSB | BIT 2 | BIT 1 | BIT Ø |
|---|---|---|---|---|
| S PORT (INPUT) | COMM CHANNEL | Ø | Ø | Ø |
| M PORT (INPUT) | DARK | Ø | Ø | LOW BATT |
| PØ PORT (OUTPUT) | LOW BATT CKT EN | N. C. | N. C. | OPTO RANGE |
| P1 PORT (OUTPUT) | N. C. | N. C. | N. C. | SEND A 1* |

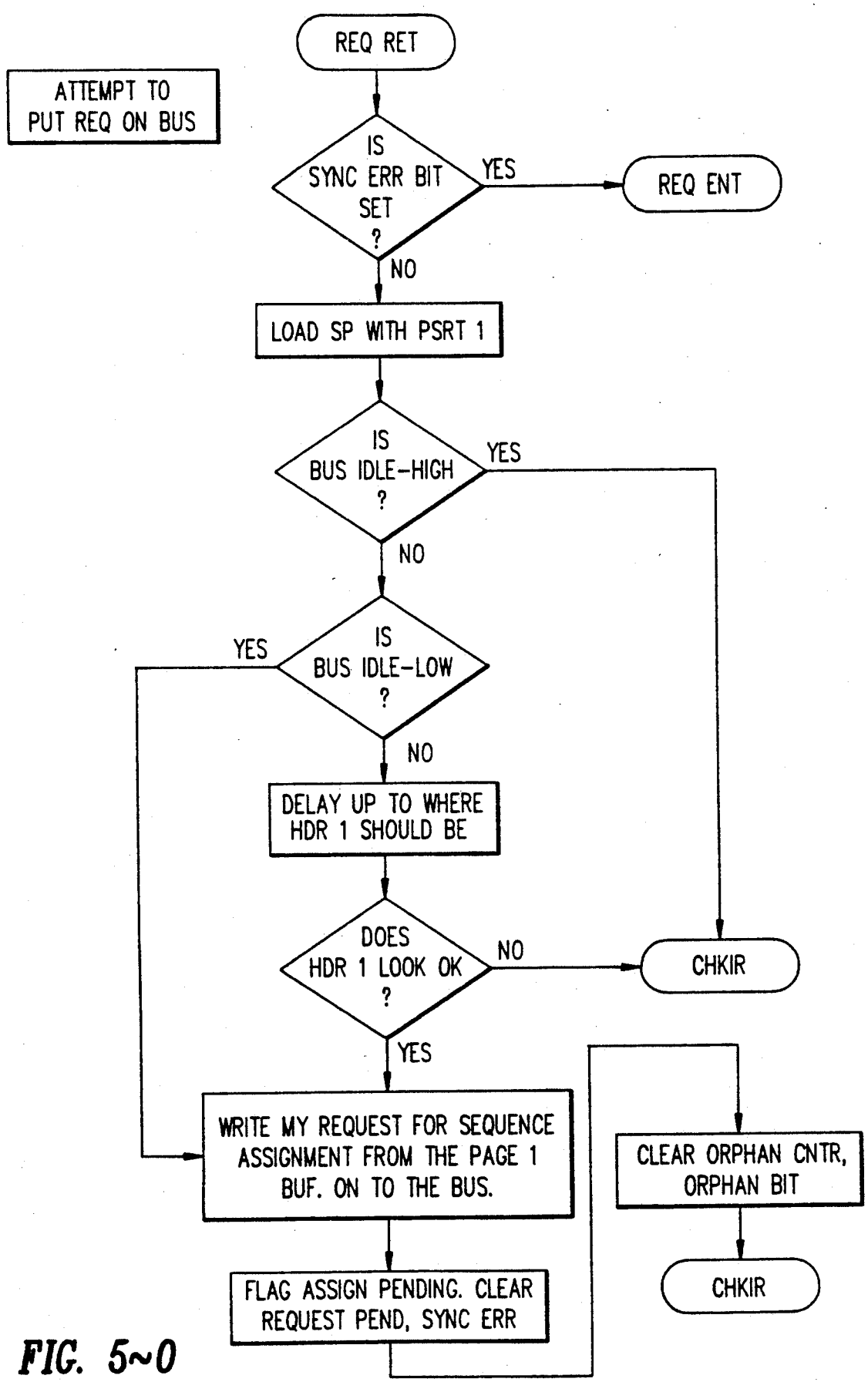
FIG. 5~0

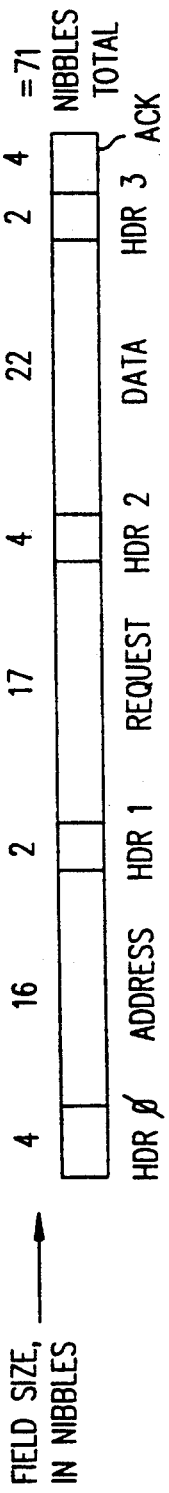
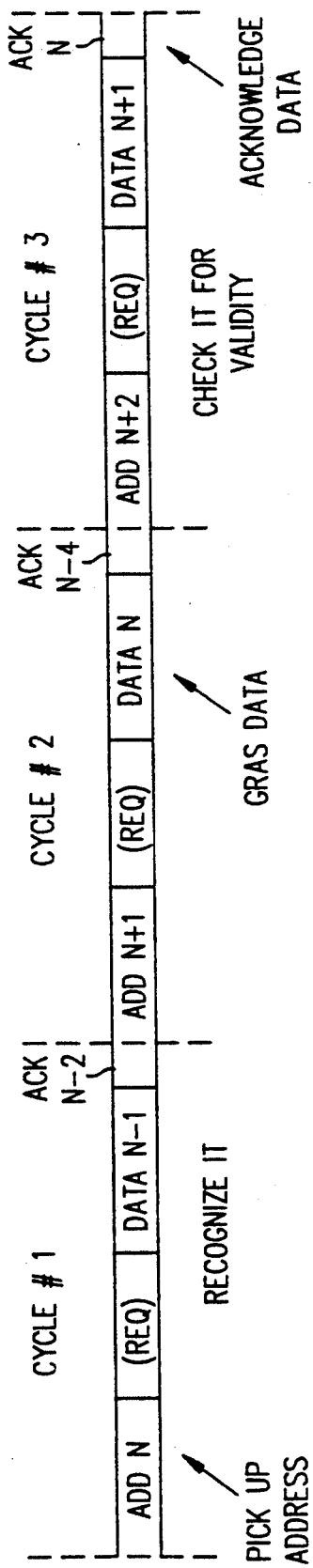

FIG. 6F

EXAMPLE: UPC = 0 12345-67890 5
                NS              CHK
        SEQ = 4      QUAD-2

(1) 0 NS
(2) 1
(3) 2
(4) 3
(5) 4
(6) 5 — UPC
(7) 6
(8) 7
(9) 8
(10) 9
(11) 0
(12) 5 CHK
(13) 4 SEQ
(14) + 2 QUAD
     $56_{10}$

SO SUM OF ALL NIBBLES = $56_{10}$ = 38H
1'S COMPLEMENT = C7H,
ADD 1 ⟶ C8H.

COMPLETE FIELD:

| HDR 0 | 0 | 1 | 2 | 3 | 4 | 5 | 6 | 7 | 8 | 9 | 0 | 5 | 4 | 2 | 8 | C | HDR 1 |

REQUEST FIELD FORMAT (17 NIBBLES, TOTAL)

FIG. 6G

| HDR 1 | 7 | 5 | UPC1 | UPC2 | UPC3 | UPC4 | UPC5 | UPC6 | UPC7 | UPC8 | UPC9 | UPC10 | UPC11 | UPC12 | LS CHK | MS CHK | HDR 2 |

HEADER                           MY NEW UPC CODE                              BCD         DEAD AIR
                                                                              CHECKSUM

DATA FIELD FORMAT: (22 NIBBLES, TOTAL)

FIG. 6G'

| HDR 2 | 1 | 2 | 3 | 4 | 5 | 6 | 7 | 8 | 9 | 10 | 11 | 12 | 13 | 14 | 15 | 16 | 17 | 18 | 19 | 20 | L | M | HDR 3 |

DISPLAY INFO. 20 NIBBLES                                                        CHECKSUM
                                                                                            BYTE

SEGMENT NUMBER TABLE
| SEGMENT LINE | COMMON LINE | | |
|---|---|---|---|
| | 1 | 2 | 3 |
| 1 | 1 | 2 | 3 |
| 2 | 4 | 5 | 6 |
| 3 | 7 | 8 | 9 |
| 4 | 10 | 11 | 12 |
| 5 | 13 | 14 | 15 |
| 6 | 16 | 17 | 18 |
| 7 | 19 | 20 | 21 |
| 8 | 22 | 23 | 24 |
| 9 | 25 | 26 | 27 |
| 10 | 28 | 29 | 30 |
| 11 | 31 | 32 | 33 |
| 12 | 34 | 35 | 36 |
| 13 | 37 | 38 | 39 |
| 14 | 40 | 41 | 42 |
| 15 | 43 | 44 | 45 |
| 16 | 46 | 47 | 48 |
| 17 | 49 | 50 | 51 |
| 18 | 52 | 53 | 54 |
| 19 | 55 | 56 | 57 |
| 20 | 58 | 59 | 60 |
| 21 | 61 | 62 | 63 |
| 22 | 64 | 65 | 66 |
| 23 | 67 | 68 | 69 |
| 24 | 70 | 71 | 72 |
| 25 | 73 | 74 | 75 |
| 26 | 76 | 77 | 78 |
| 27 | 79 | 80 | X |
*FIG. 6H*
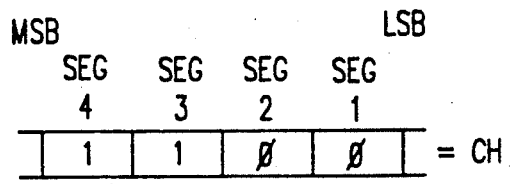
*FIG. 6I*
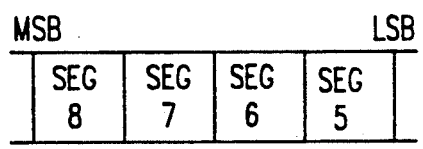
*FIG. 6J*
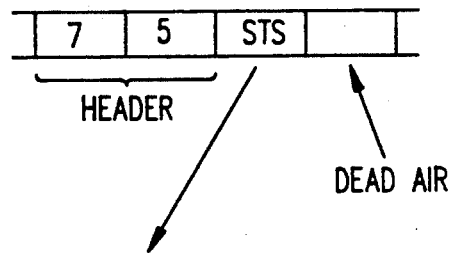
*FIG. 6L*

| HDR 2 | SEG 1 | SEG 2 | SEG 3 | SEG 4 | | SEG 5 | SEG 6 |

*FIG. 6K*

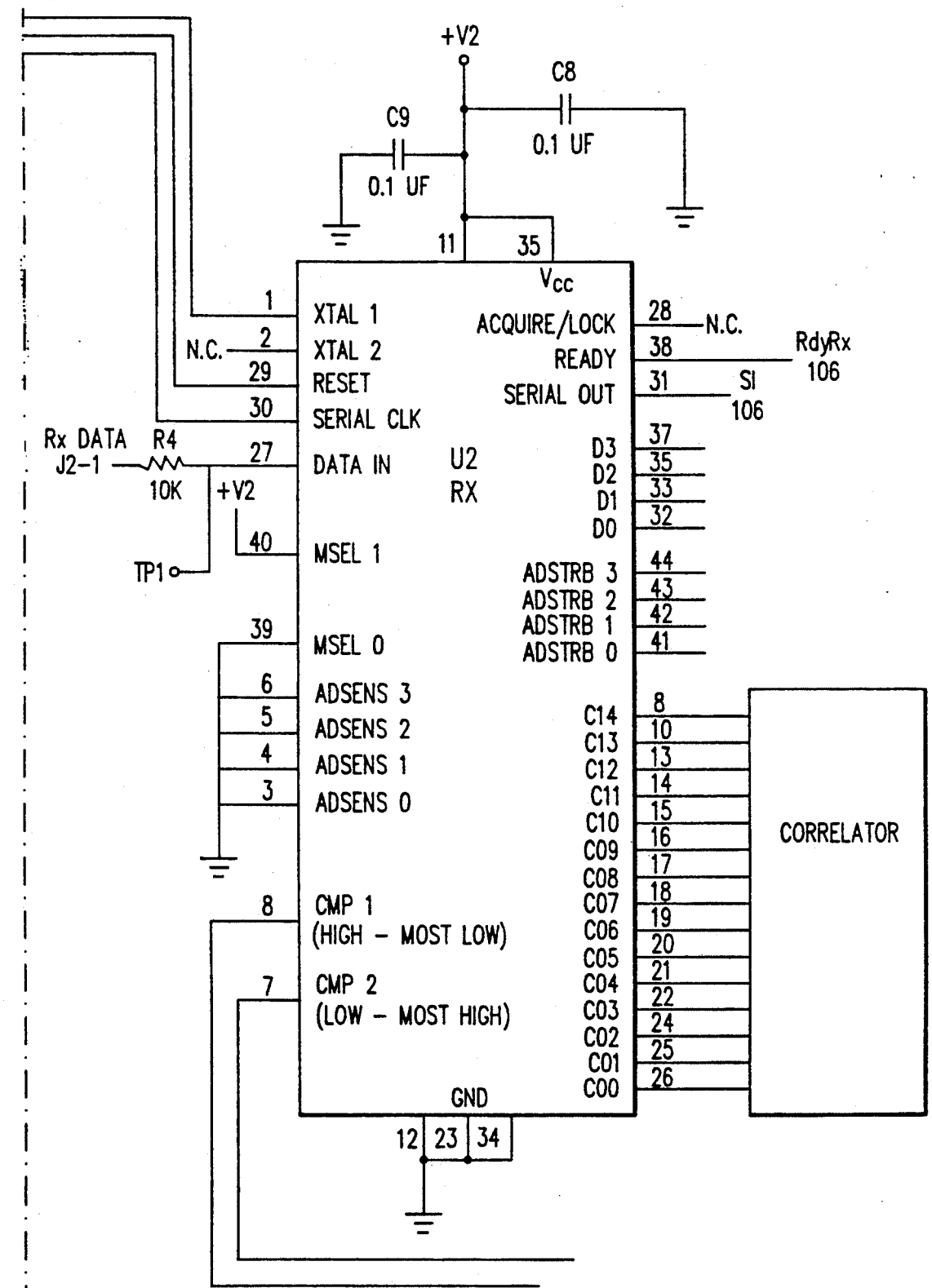
FIG. 9A"

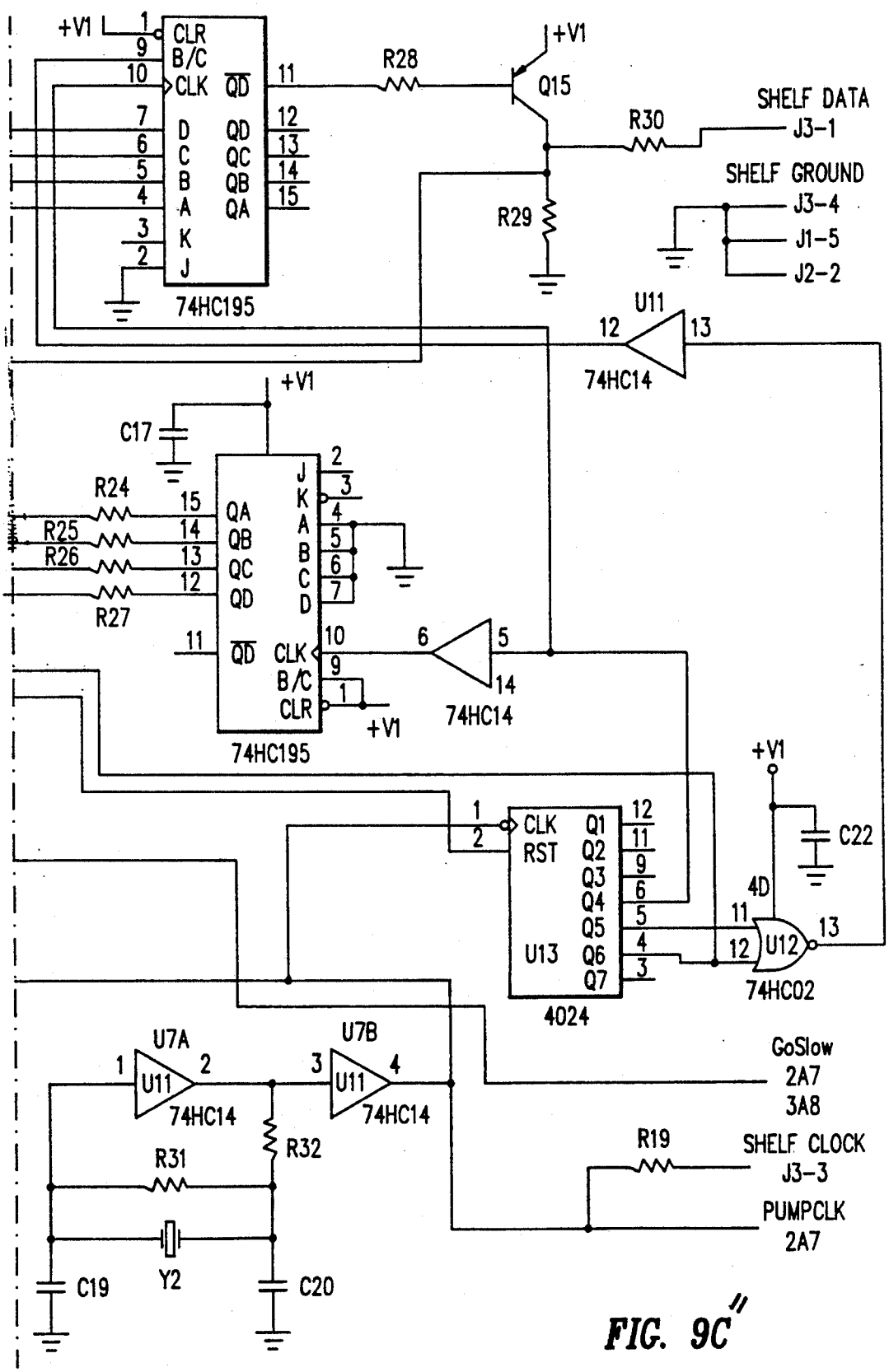
FIG. 9C"

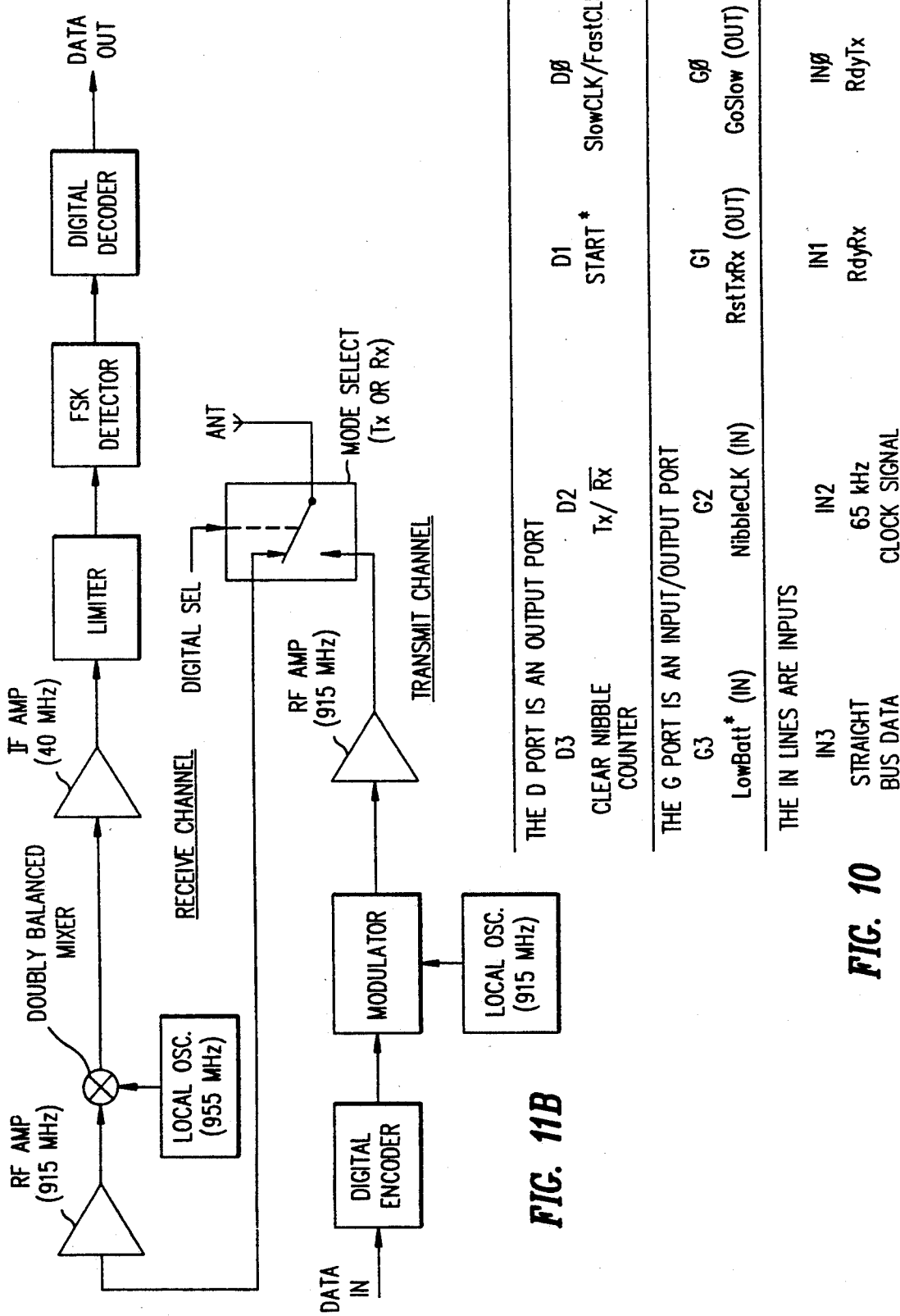

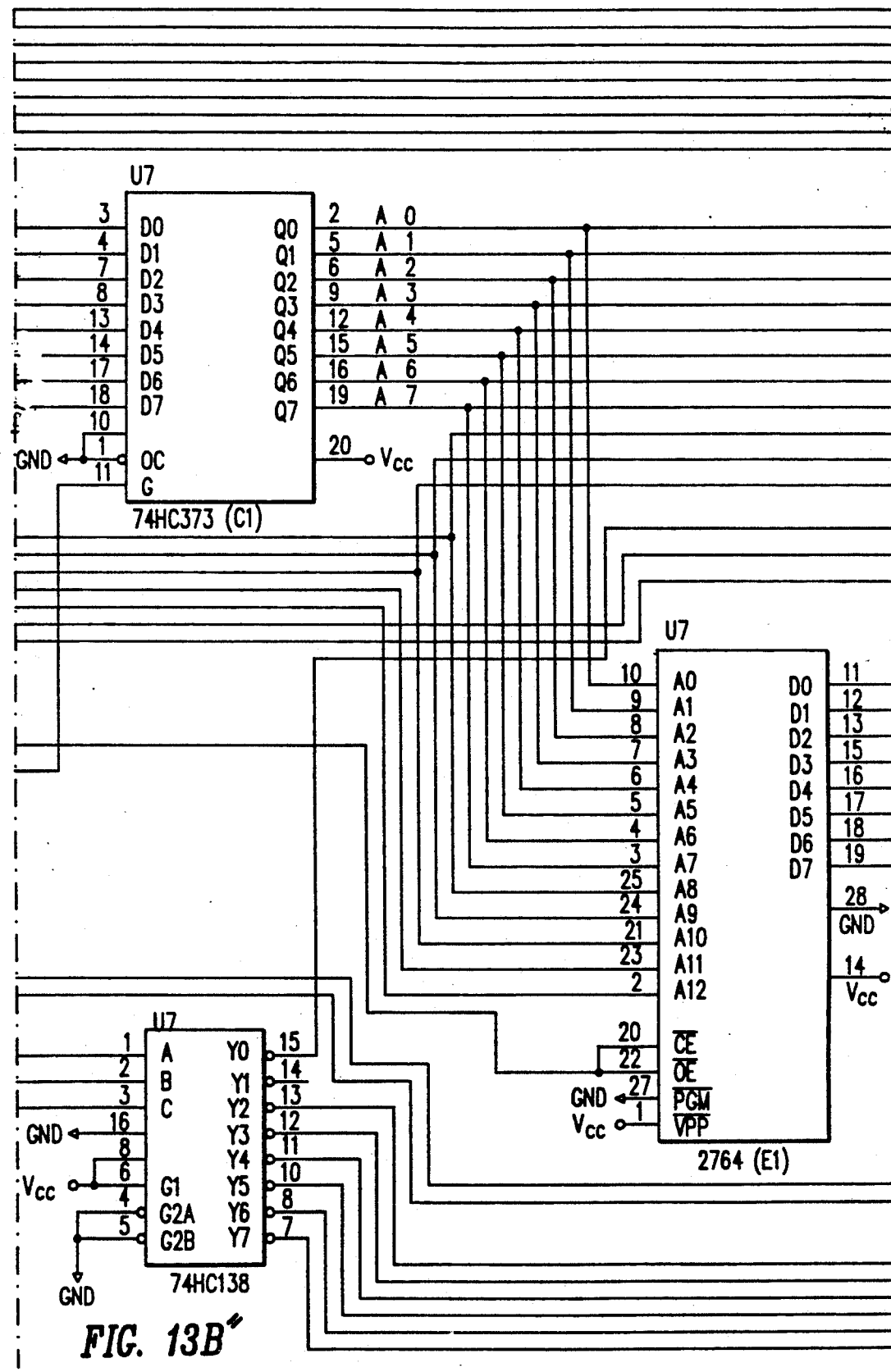
FIG. 13B"

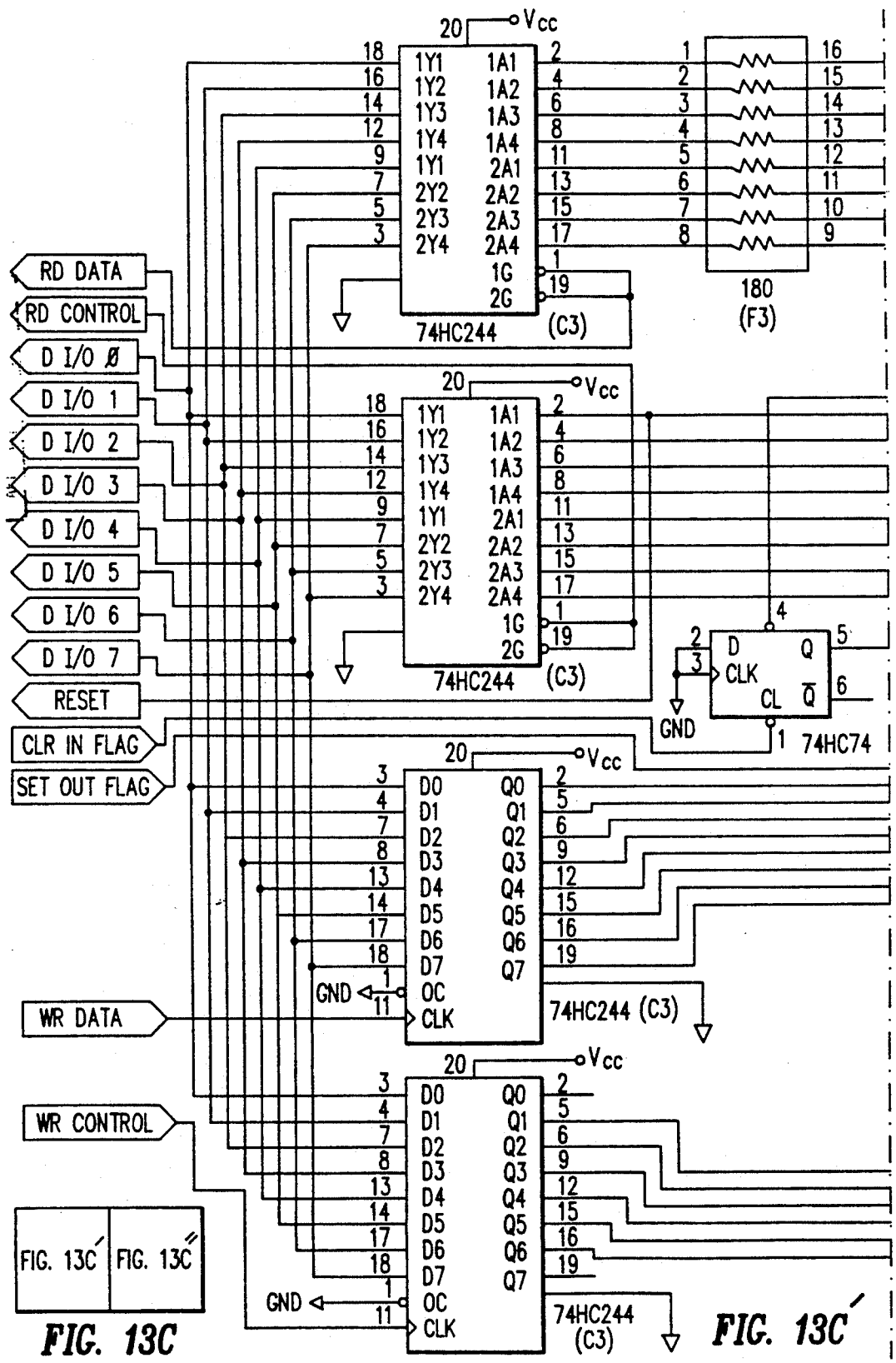

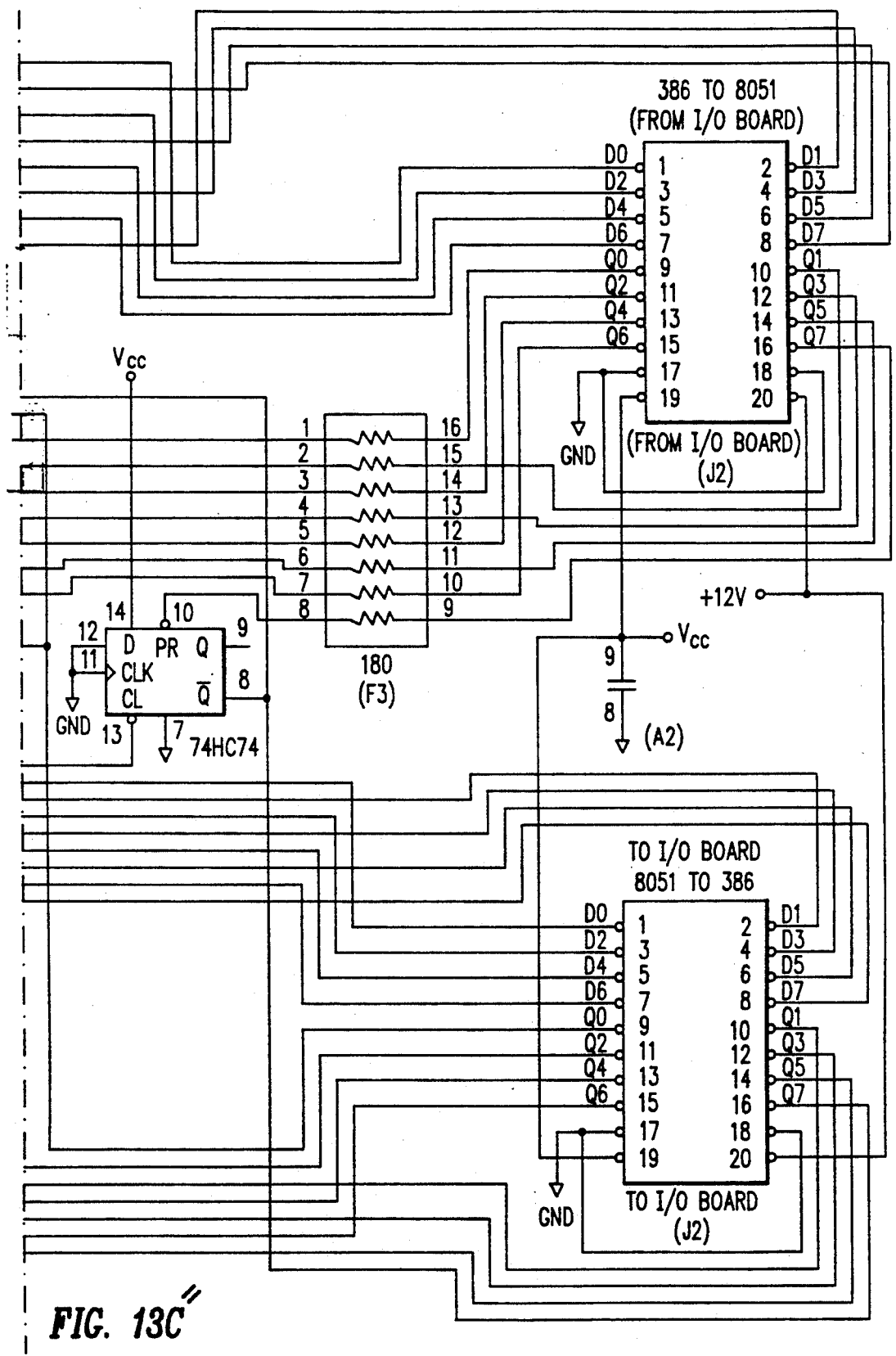
FIG. 13C"

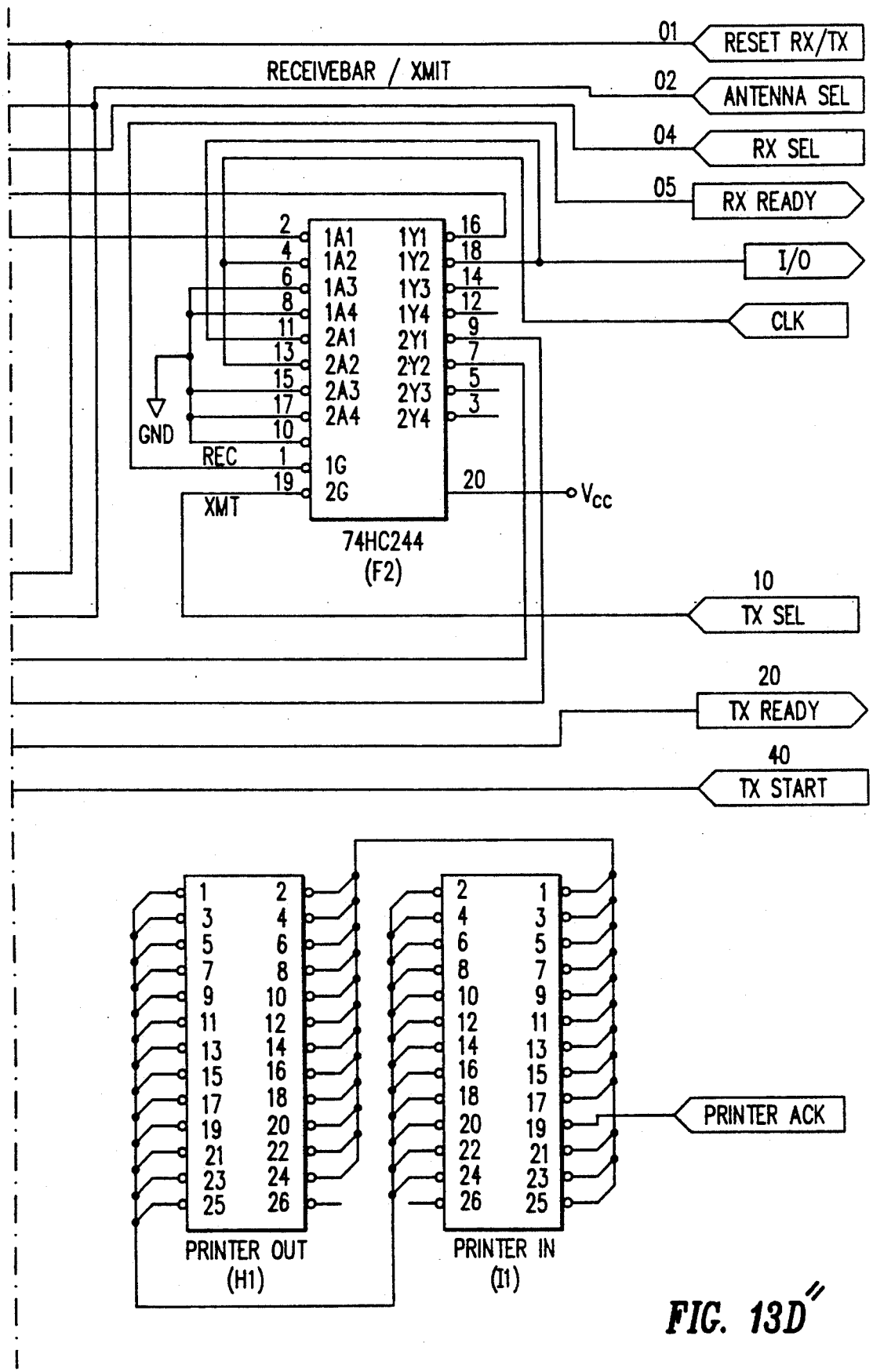
FIG. 13D″

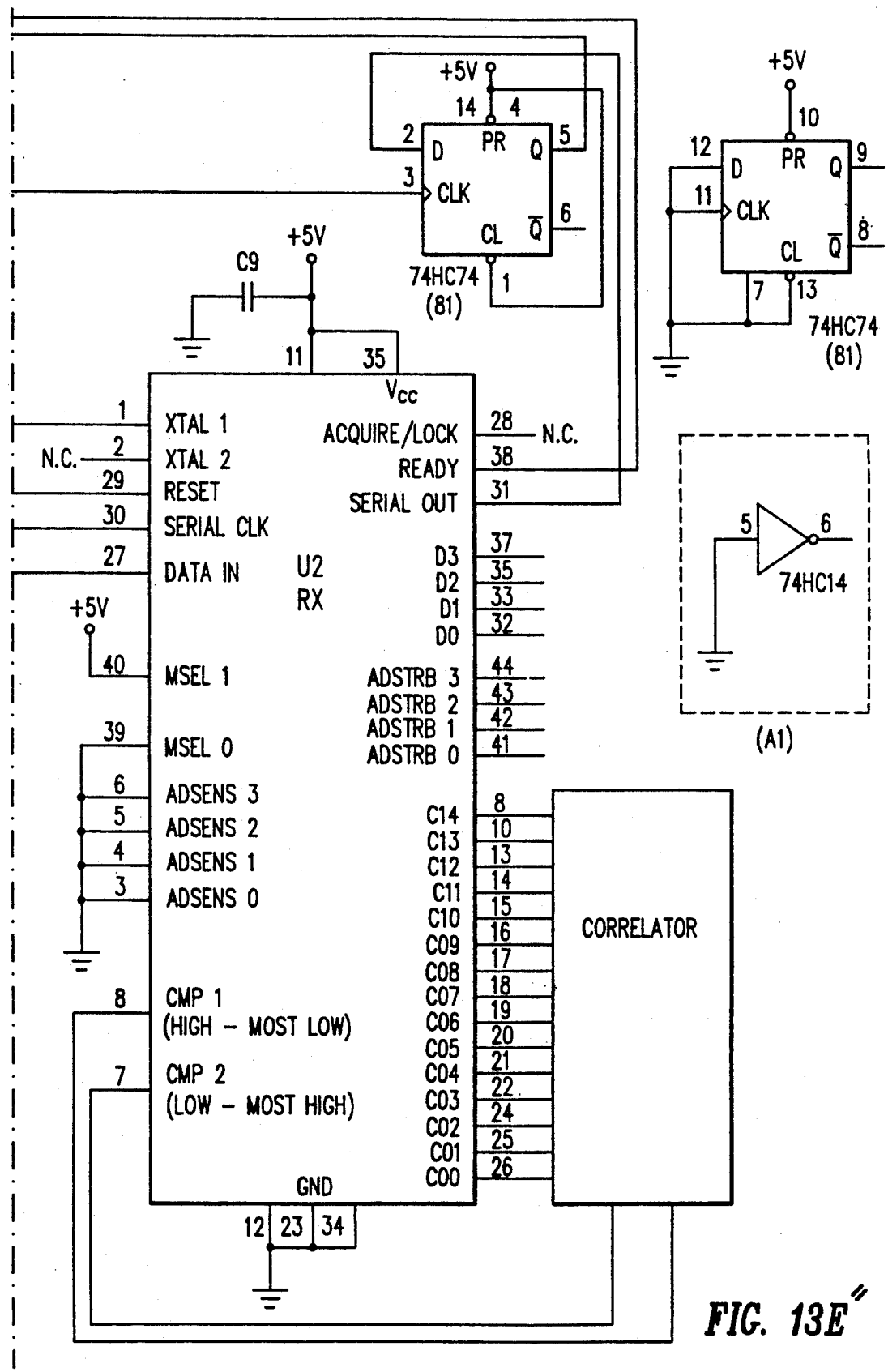
FIG. 13E″

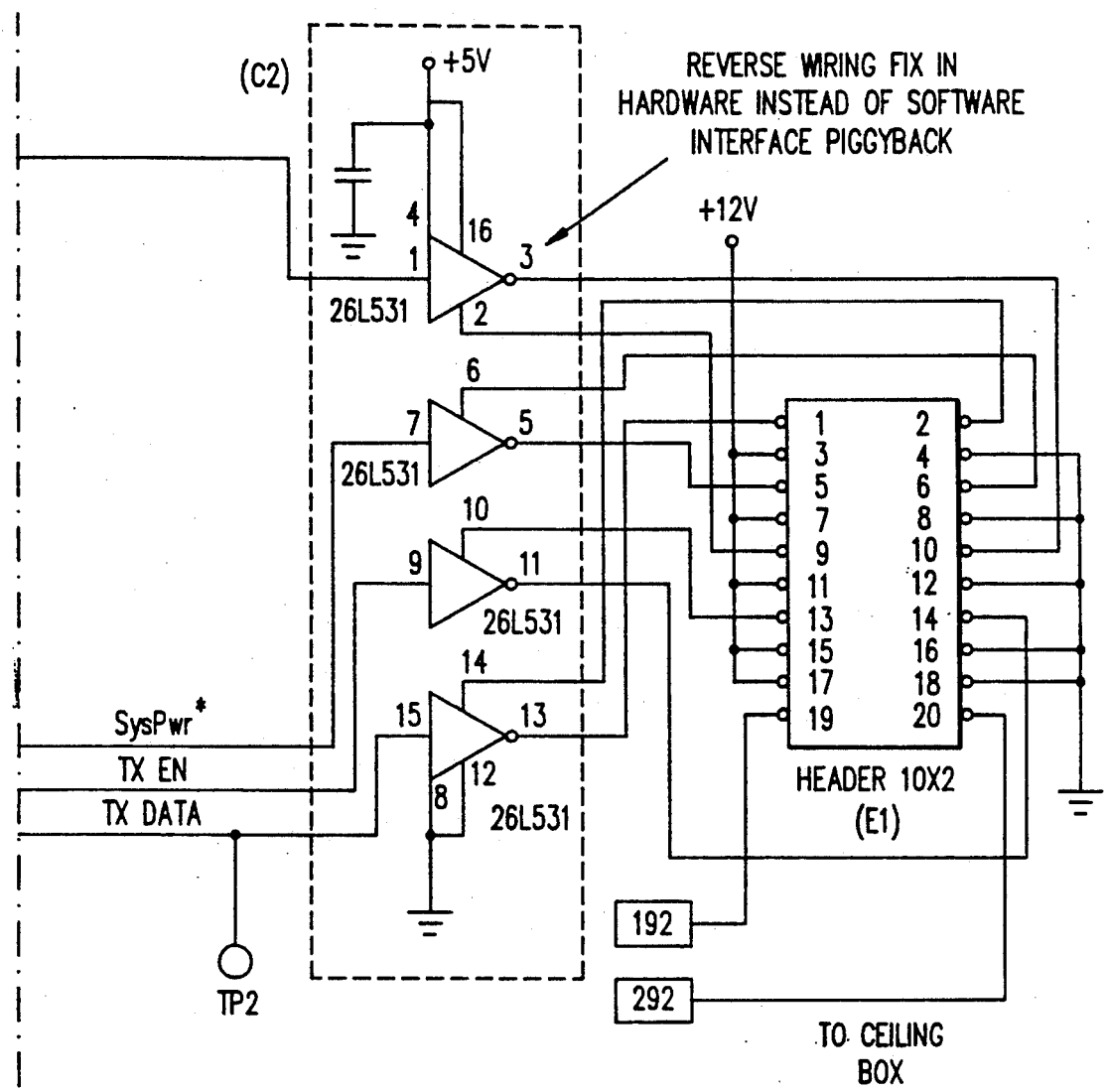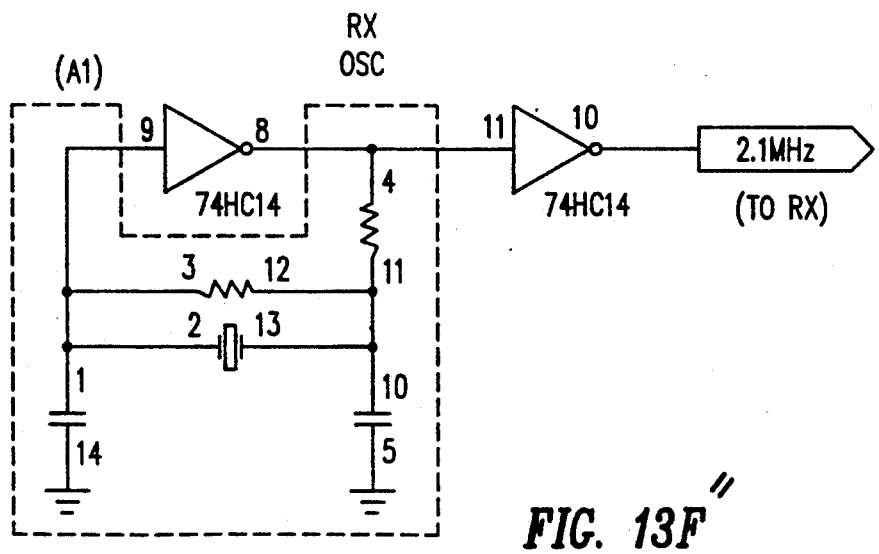
FIG. 13F″

SYSTEM FOR DISPLAY OF PRICES AND RELATED METHOD

This application is a continuation of application Ser. No. 07/348,355, filed May 5, 1989, now abandoned.

BACKGROUND OF THE INVENTION

1. Field of the Invention

This invention relates to a system for the display of prices associated with merchandise in a store and in particular to an electronics systems which allows the prices associated with any item in the store not only to be displayed but to be changed from time to time as frequently as desired.

2. Description of the Prior Art

In stores, items are typically placed on shelves above a label showing the price of the item and perhaps a price per unit quantity such as weight or volume. To change prices, an employee must walk the aisles of the store, removing the old price labels and placing new price labels in the price label slots on the shelves. This takes time and is expensive. Moreover, employees make mistakes and prices cannot be changed rapidly to reflect special sales or the desire of the management to change prices on goods to respond to local marketing conditions.

Various approaches have been taken to deal with this problem. Thus, one system includes an electronic display in which prices are transmitted from a central terminal to the various displays Each display is identified by the UPC code associated with the product, the price of which is carried in a particular display. Thus should the store wish to change the price on a given product, the UPC code of that product is transmitted, followed by the new price. The particular display coded to receive the transmitted UPC code then will respond to the receipt of the UPC code and change the price displayed on the label to the new price. Typically the electronic display module associated with a particular product contains its own receiver which is capable of receiving the UPC code and the new price and then sending back to the transmitter station a signal indicating that it has received the new code and changed the price in response thereto.

This system has the significant drawback that the receivers are expensive, take up space, and use electric power. Also, the need to provide so many receivers leads to use of simple unsophisticated receivers to keep the cost of the system down; this results in a degraded communications capability.

SUMMARY OF THE INVENTION

In accordance with the invention, an information display system is provided that includes a message transmitting capability, and a number of receivers for receiving the message information. Each receiver drives several displays, so as to display the information. In the preferred embodiment, the transmitting is by spread spectrum radio from one transceiver. The information preferably includes but is not limited to UPC code and associated price information. Each transceiver acknowledges the broadcast messages, and provides the information to the display associated with the UPC in the memory. The transceivers and displays are preferably battery powered, and include power conservation features.

Each display also preferably includes an optical port for programming and communication of product order information to other devices in the system.

In other embodiments, the communications are by ordinary radio, infra-red, cabling, or other means. The data communicated need not be limited to product-related data, but can include other levels of information.

The invention in various embodiments is compatible with any conventional point of sale system.

This invention is not limited to the preferred embodiment; other embodiments will be apparent to those skilled in the art in the light of this disclosure.

BRIEF DESCRIPTION OF THE DRAWINGS

FIGS. 6A to 6L depict the bus format.
FIG. 9C shows, the relation of FIG. 9C' and 9C".
FIG. 10 is the I/O map for the Shelf Node controller.
FIG. 11B is a block diagram of the Ceiling Node transceiver.
FIGS. 13A to 13G are schematics of the Ceiling Node.

DETAILED DESCRIPTION OF THE INVENTION

Figure 1:
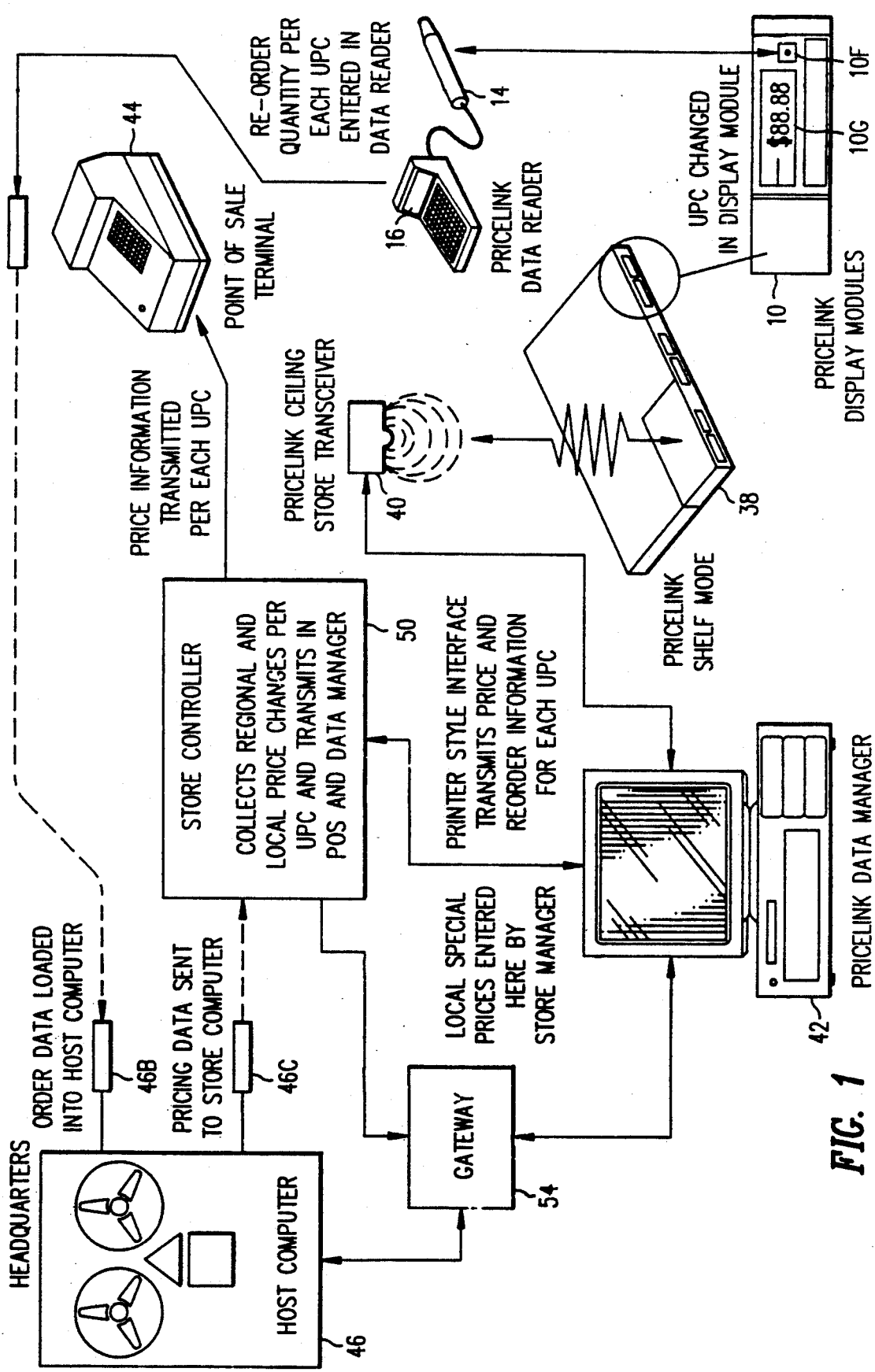
FIG. 1 shows one embodiment of the invention.

The Pricelink System in accordance with the invention (see FIG. 1) accomplishes the task of maintaining accurate pricing information at the shelf using computers, microcontrollers, and 915 mHz spread spectrum RF communication techniques.

UPC Code

The primary key for data in the system is the UPC Code. All information in the various parts of the system regarding a product is kept and all new information is accepted by UPC Code.

Display Module

The component of the system which is the most visible to the public is the Display Module 10. The Display Module is designed around a microcontroller which accepts a UPC Code assignment, accepts data relevant to that UPC Code, and displays that information on a Liquid Crystal Display 10G40 (LCD).

Making the UPC Code assignment is done using a barcode wand 14 attached to a handheld data terminal specially programmed portable computer 16. The product is "wanded" to pick up the UPC Code or the UPC code is keyed, then the same wand 14 is placed in the optical "port" 10F on the Display Module 10. Once the UPC Code is transferred to the Display Module 10, the Display Module calls for an assignment from the Module Controller. This assignment contains enough information to separate this Display Module from all other Display Modules including other Display Modules with the same UPC Code. Thus, the possibility of having a normal shelf location, a special end cap display, and a cold section display for the same product is accommodated.

Each Display Module initially receives four each 81 bit images, then regularly receives updates to those images. If the refresh does not come in time, (such as 10-20 hours) the Display Module will assume that it has lost communication and that its display may be incorrect. Its reaction to the possibility of displaying incorrect information is to blank itself or otherwise react until communication is restored.

The first two images contain the normal display for the item. Each bit in the first image is converted into a segment on the LCD display for 1 second, then each bit in the second image is converted into a segment on the LCD display for 1 second. This process repeats in such a way that any differences in the images show up as flashing segments in the display.

The third image contains the information which is displayed when the optical "button" is pressed by the consumer. Pressing the "button" simply blocks the room light from entering the Display Module.

The last image contains some information for the store personnel. This can be seen by placing the barcode wand 14 in the optical "port" 10F. At this same time, the wand will read the UPC Code of the product the Display Module represents.

Shelf Rail

Figure 2A:
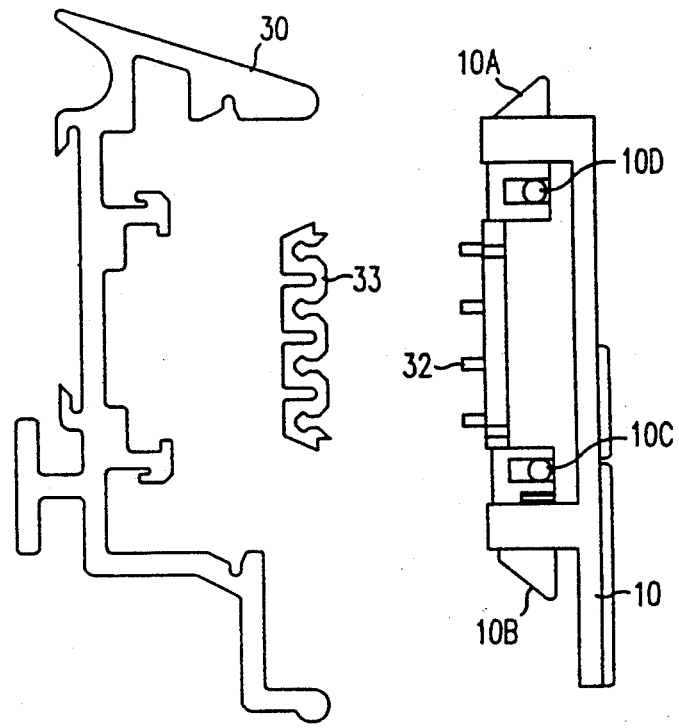
FIGS. 2A and 2B show a shelf assembly.
Figure 2B:
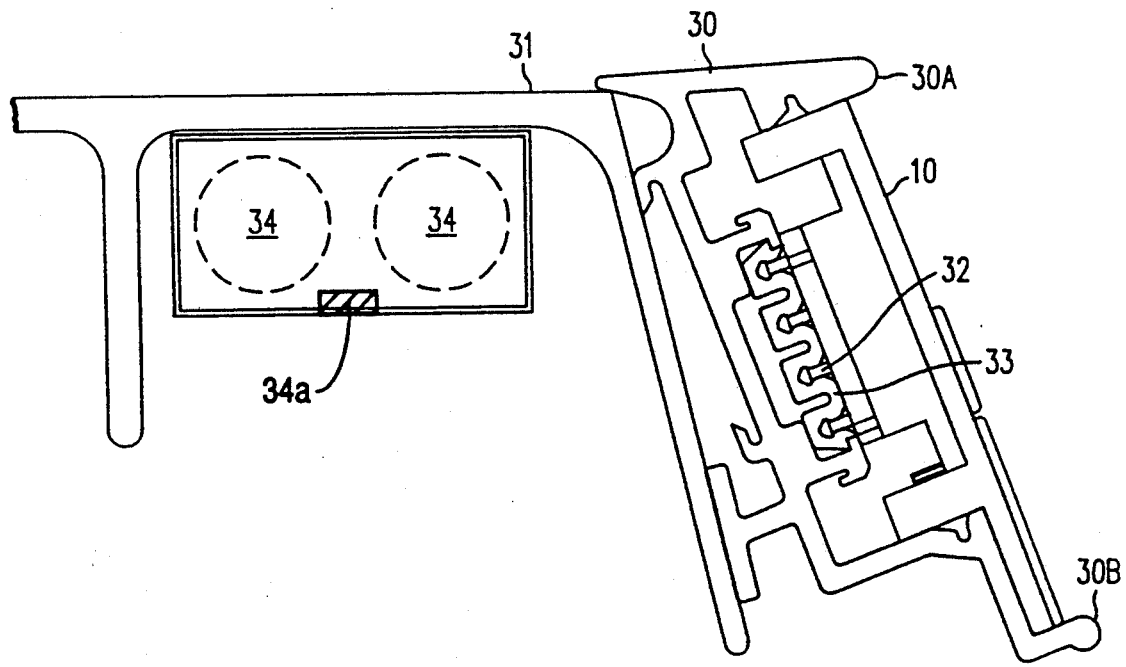

The Display Modules are clipped onto an extruded rail 30 (see exploded view FIG. 2A) which has been designed to attach to the face of the more standard shelving 31 (see FIG. 2B for an assembled view) found for instance in grocery stores. The rail 30 design provides protection from the box and grocery cart collisions occurring during normal shopping and restocking operations. Rail extensions 30A and 30B extend beyond the front surface of the Display Module 10 to provide this protection. The Display Module 10 locks to the rail 30 by means of spring loaded clips 10A and 10B The clips are loaded against the rail 30 by spring wires 10C and 10D. To remove the Display Module 10 from the rail, four spring wires 10C, 10D (two not shown on far side) must be simultaneously compressed. A special removal tool is provided to compress all four Spring wires 10C, 10D and remove the Display Module. These clips 10A, 10B and spring wires 10C, 10D limit vandalism in the form of casually removing or moving the Display Module (i.e., "module") 10. Extruded neoprene spacer 32 fits between Display Module 10 and rail 30 as shown. Interlock 34a physically prevents (see FIG. 2) removal of the batteries from their enclosure 34 unless power is provided to the displays via a temporary power connected (not shown) plugged into interlock 34a. The rail 30 also provides the four electrical leads 32 between all of the Display Modules 10 on a shelf and the Shelf Node 38 (see FIG. 3). In one embodiment, several Display Modules connected to one Shelf Node are located on different shelf tiers.

Shelf Node

The Shelf Node 38 (see FIG. 3) contains the interface between the Shelf Rail of Display Modules 10 and the Ceiling Transceiver 40 (see FIG. 1) The batteries 34 (see FIG. 3) for all of the Display Modules and the Shelf Node are in the Shelf Node enclosure. The battery connection to the Display Modules is made using two of the Shelf Rail electrical circuits 32. The Shelf Node also supplies the clock for the Display Modules over another of those electrical circuits. The last line is used for data communications. The Shelf Node is preferably designed so that the communications portion is physically detachable from the logic circuitry portion.

The Shelf Node 38 and the Ceiling Transceiver 40 (see FIG. 1) communicate in the 902 mHz to 928 mHz band using a spread spectrum technique. Essentially the data to be sent is encoded into a much longer message which is transmitted at a much higher bit rate. If most of the bits get through correctly, the message may be reconstructed with no errors, by a receiver which decodes the bit stream back into the initial data. The band chosen is relatively quiet since technological breakthroughs have only recently opened it for low cost use. The detection scheme (FSK) used is relatively immune to noise of a lower amplitude than the desired signal. This is analogous to AM radio stations coming in at the same time, with FM stations which are clean right up to the point where the transmitter is too far away and reception stops. This means that a store down the street will probably not interfere with communications. In addition, the store down the street will probably have a different encoding pattern so that the information could not be mistakenly accepted.

The communication protocol has been defined to maximize battery life at the shelf, while minimizing the probability that incorrect information will ever be displayed. The net result of this protocol is the ability to do the following:

Accept a new module or new UPC Code for a module in two seconds or less.

Reload prices into 150 modules in not more than ten minutes. Since the Shelf Nodes sleep for most of the time to conserve battery power, it may be a few seconds or at the worst case five minutes until the Shelf Nodes wake up and look for instructions regarding an impending transmission. Once this communication starts, 150 modules may be reprogrammed in each subsequent five minute period.

Awaken a whole 20,000 Display Module store in a half hour. This capability is needed if the power to the transmitter goes down for over four hours.

A mode is provided which sacrifices Shelf Node battery life for fast response. Once the initial five minute conversion to that mode has occurred, changes may be made to any module nearly instantly.

Ceiling Transceiver

This unit 40 (see FIG. 1) preferably is attached near the center of the store, above the shopping area. One is preferably provided per store. It is attached to the Module Interface Box (not shown) by a cable. All signals will be low voltage, but they may be run in conduit. The Ceiling Transceiver 40 contains the 915 mHz communications equipment to communicate with the Shelf Nodes.

Module Interface Box

This box houses the final electrical and the logical link to attach the Module Controller to the Data Modules.

Module Controller (also referred to as Data Manager 42)

This computer (also referred to as the "Data Manager") performs a number of real-time computing functions:

Accept console queries & entries,

Manage Module Controller 42 to POS Terminal 44 communications, Service POS Terminal 44 communication interrupts, Mange Mode Controller 42 to Host Computer 46 communications, Service Host Computer 46 communication interrupts, Translate POS Terminal 44 & Host Computer 46 communications into actions, Update Item File Download Communication statistics Translate Item File into Image Files Manage Image File transmissions to Display Modules Service transmission interrupts.

POS Controller and Host Computer Interface

This will vary as a function of the particular POS system chosen, and the options selected.

Datachecker

In one embodiment, the present invention uses a PC based interface program commercially supplied by Datachecker under the name "POSilink". An Interface Computer (a PC i.e., personal computer) running this and other programs will watch both its console and the serial link to the Module Controller 42.

On a regular basis the Module Controller 42 requests a copy of certain records from the EXCP file which contains all of the changes the POS Controller (i.e., Store Controller 50) has acknowledged since the last time it was cleared by the Host Computer 46 (clearing occurs possibly twice per week). Retransmission of this data to the Module Controller 42 will allow it to correct its information to stay current.

On a less frequent basis, probably once a week, possibly just after the Host Computer 46 has made its updates, the Module Controller 42 will, request a complete copy of certain fields of the POS Controller's 50 Item File. This will be compared to the Pricelink Item File to verify that no changes have slipped through unnoticed, and will correct them before they have existed for an extended period. It is not expected that any differences will be noted once the system is fully operational.

IBM 3270 Emulator

A number of cards/software combinations are commercially available to allow a personal computer (PC) to access mainframe files. Once the PC has the files, the transmission over a standard modem link to another PC in the store is straightforward. The PC in the store is the Module Controller, or the Interface Computer. It will make the information received indirectly from the Host Computer available to the Module Controller for maintaining certain fields in the Pricelink Item File: Units of Measure, Unit Price Divisor, Special Dates, Price when on Special, Coupon Dates.

Also provided in one embodiment is a Gateway Computer 54 for connecting the POS Controller 50 and Host Computer 46 to the Data Manager Computer 42.

Typical System Configuration:

One installation is configured as follows:

| | |
|---:|---|
| 1 | Module Controller |
| 1 | Module Interface Box |
| 1 | Ceiling Transceiver |
| 3,333 | Shelf Nodes |
| 3,333 | Shelf Rails |
| 20,000 | Dispay Modules |
| | at 6 per Shelf Rail |
| 1 | Interface Computer |
| | POSilink Software from Datachecker |
| per 3270 | IBM 3270 Emulator/PC |

Display Module

The PriceLink system in accordance with the invention includes a central controller and a large number of displays. The controller, called the Data Manager, sends display information to the individual Display Modules over a serial bus. The display modules acknowledge each message, allowing the manager to verify the transfers.

The system is especially suited for use in grocery stores or similar retail applications, where each display module replaces one price sticker on the shelf. Each module is thus associated with a product, and the modules will be labeled with stickers that describe the product for the consumer.

The system in one embodiment requires that each product have a UPC (Universal Product Code). This is the type of barcode which is widely used in grocery stores today. The UPC of the product becomes the "address" of the module on the serial bus. Since some products are displayed in multiple locations in the store, a digit (1-9), called the sequence number, is appended to the UPC to form the complete address of a module. This allows the manager to verify writes to each module for a given product.

The Display Module as described above includes an optical port with a light sensor and a light emitter. This port has two uses; as an interface to optical 'wands' (barcode readers), and as an optical 'pushbutton', which the customer may use to invoke an alternate display.

Basic Display Module Functions

The module has storage for four, 80 segment displays (i.e., images, as described above) (the 81st segment is unused). Each block of display data is called a Quad and has four display modes:

Quad 0: Normal Display
Quad 1: Flash Display
Quad 2: User Accessible Display
Quad 3: Store Use Display During normal operation, the display will alternate between the Normal display and the Flash display. If a segment is On in the Normal display, and Off in the Flash display, then the segment will flash on and off at about ½ Hz. That is, the display is changed about once a second.

The customer may request user accessible information such as unit price information or health/diet information from the module by blocking the optical port with a finger. The module detects the change in light level, and switches to the User Accessible Display. When the finger is removed, the module delays for 2.8 seconds, and then restores the Normal display.

The fourth display is used by store personnel. When a barcode wand is detected (by the presence of a bright light at the port), the Order Mode display is invoked. This display gives re-stocking information for that product.

After changing to the order mode display, the module sends its current UPC to the wand by turning an LED in the optical port on and off in a pattern which simulates the scanning of a barcode label.

Conventional barcode wands use an LED in the tip to illuminate the barcode label. The PriceLink system in one embodiment includes a special wand (attached to a handheld data terminal or computer) which can use this LED to send information to the display modules. After detecting the wand and emitting its barcode, the module attempts a handshake with the wand. If this handshake is successful, the module accepts a new UPC from the wand. Thus the modules are given a UPC code.

Display Module Electronics

The controller in the Display Module is in this embodiment a Sanyo 5733 four bit microcontroller, with 2048 bytes of program ROM and 128 nibbles of RAM. The 5733 includes an LCD interface, supporting an 81 segment display. The planned clock frequency is 65.536 kHz.

Figures 3, 7:
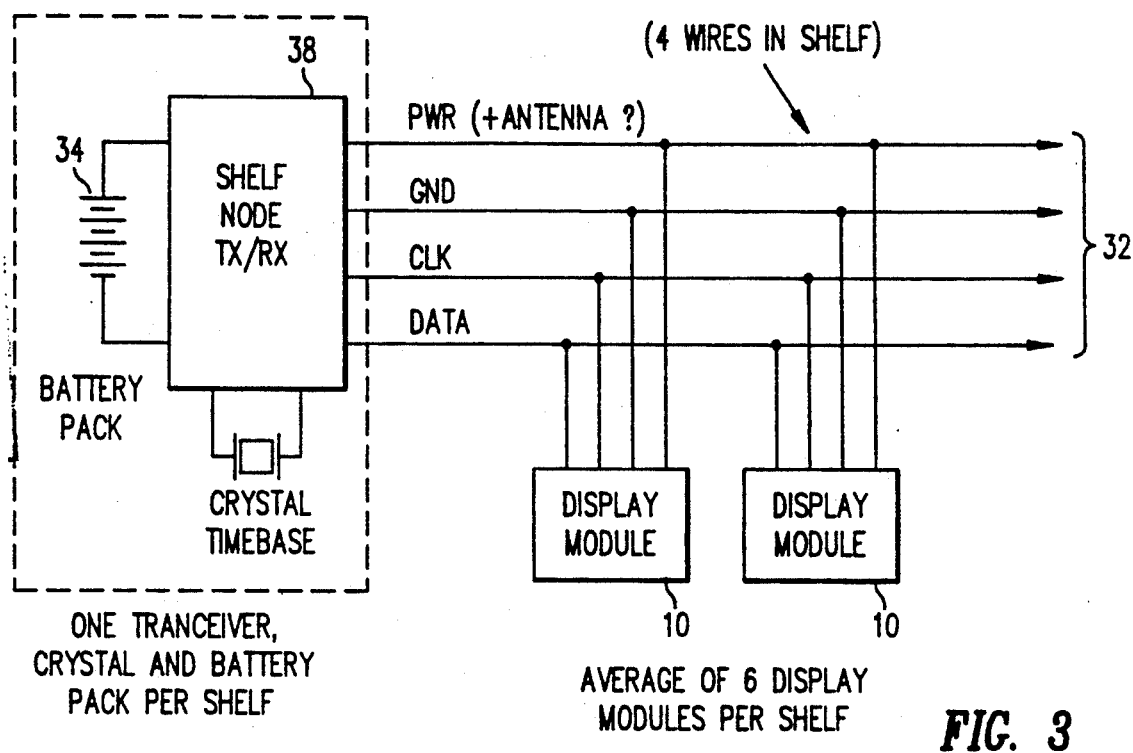
FIG. 3 shows the shelf block diagram.
FIG. 7 shows the Display Module I/O Memory Map.

The Display Module plugs into a special shelf which contains four wires. FIG. 3 shows a block diagram of the shelf. Two of the wires in the shelf bus distribute power to the Display Modules, the third distributes a common clock to the Display Modules, and the fourth wire is used for bidirectional serial communication.

Figure 4:
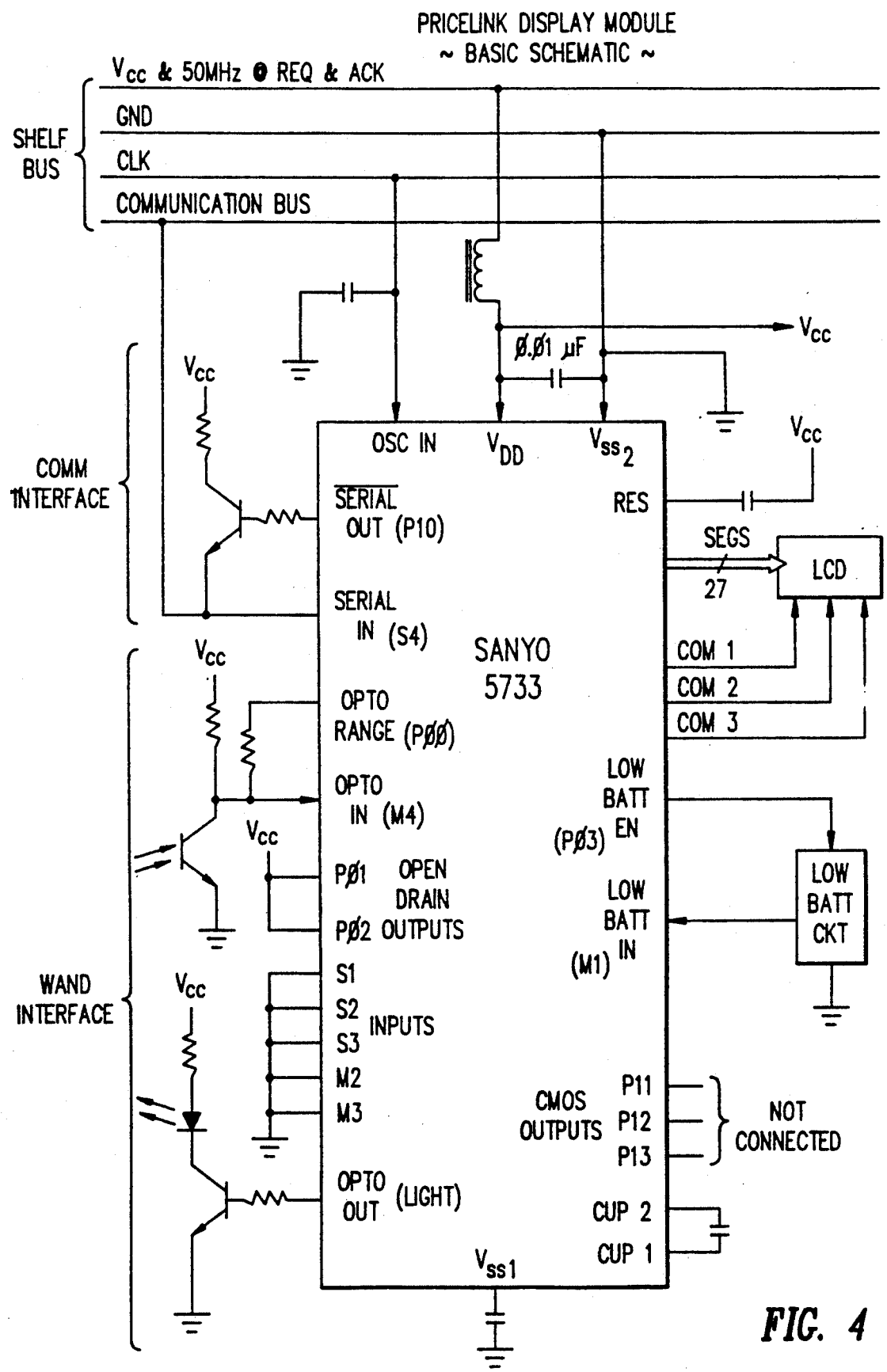
FIG. 4 shows a schematic of the Display Module.

The module circuitry falls into four logical blocks:
1) Display
2) Serial Bus Interface
3) Optical Port Interface
4) Low Battery Detect Circuit Refer to FIG. 4 for a basic schematic of the Display Module.

Display

The Sanyo 5733 controller provides all circuitry required for the display. There are 27 segment lines and three backplane lines. Each segment operates at a 33 percent duty cycle This three way multiplexing allows up to 81 segments to be controlled. The last segment (the intersection of segment line 27 and common line 3) is not used in this embodiment. The module does not process the display information—there are no encoded fields. Each Quad contains 80 bits, each bit controls one segment.

Serial Bus Interface

The module monitors the communication bus with a simple input port. The bus is pulled down by the transceiver. so if tristated the bus will be low. The module may place information on the bus with a pullup transistor.

Optical Port Interface

A phototransistor is used to detect light at the optical port (i.e., wand interface). The circuit has two ranges, allowing it to detect three light levels. In the most sensitive range (range 0), if the circuit detects light then the optical port is considered clear (normal ambient light is detected). If the port is dark, the module knows that a customer is blocking the port with a finger.

In the less sensitive range (range 1), if light is detected then it must be a wand (or an unusually high light source other than a wand—as described below). The circuit is left in range 0 normally, since it pulls less power. The impedance levels required to obtain this performance have yet to be determined.

The module emits barcode and communicates with a "smart wand" via an LED. A smart wand is a wand which is capable of handshaking with the module, and giving it a new UPC. A dumb wand (i.e., a standard commercially available wand) is only capable of reading the module's UPC.

Low Battery Detect Circuit

In one embodiment, for low battery detect, a low performance circuit is in the modules, and a higher performance circuit is in the Shelf Node transceiver. The transceiver would detect the low battery, and would drop the supply level to the modules, which would trip all of the module detectors.

Alternatively, another wire is in the shelf. This would allow the transceiver to indicate the battery condition to the modules directly, saving a few components in both the modules and the transceiver.

The power line may also serve as the RF antenna. The modules will filter this out, and the low battery circuit rejects any residual RF. Also provided is a circuit for temporarily providing power to each display when a battery is removed from the associated Shelf Node. An interlock prevents removal of the battery unless the temporary power supply is connected.

General Display Module Operation

The Display Module receives power as it is being installed in the shelf, especially if it is being added to an existing shelf. (If the whole shelf is new, the modules could be plugged in first, and then the batteries added, if that makes anything easier.)

Figure 5A:
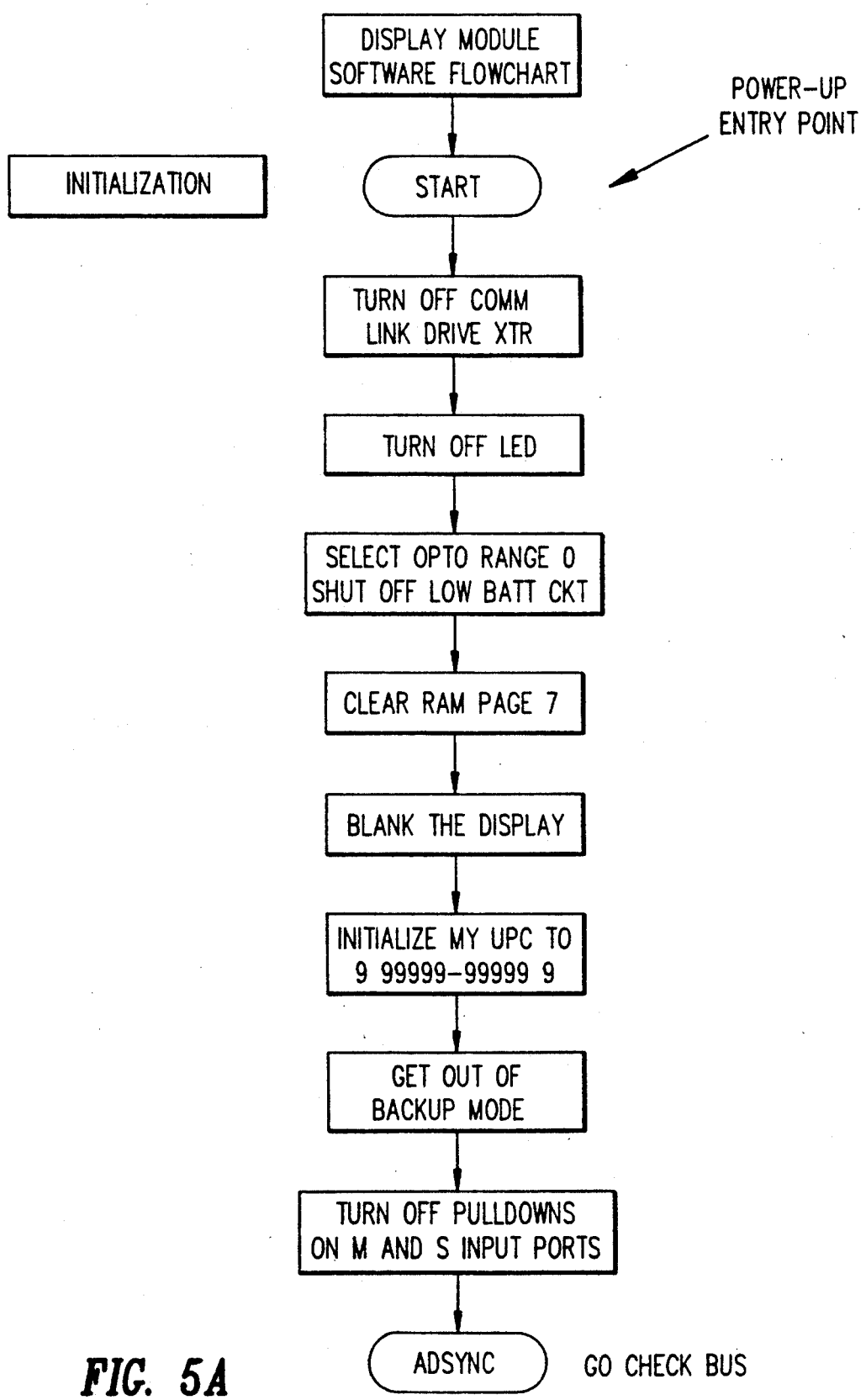
FIGS. 5A to 5O are flowcharts showing operation of the Display Modules.
Figure 5B:
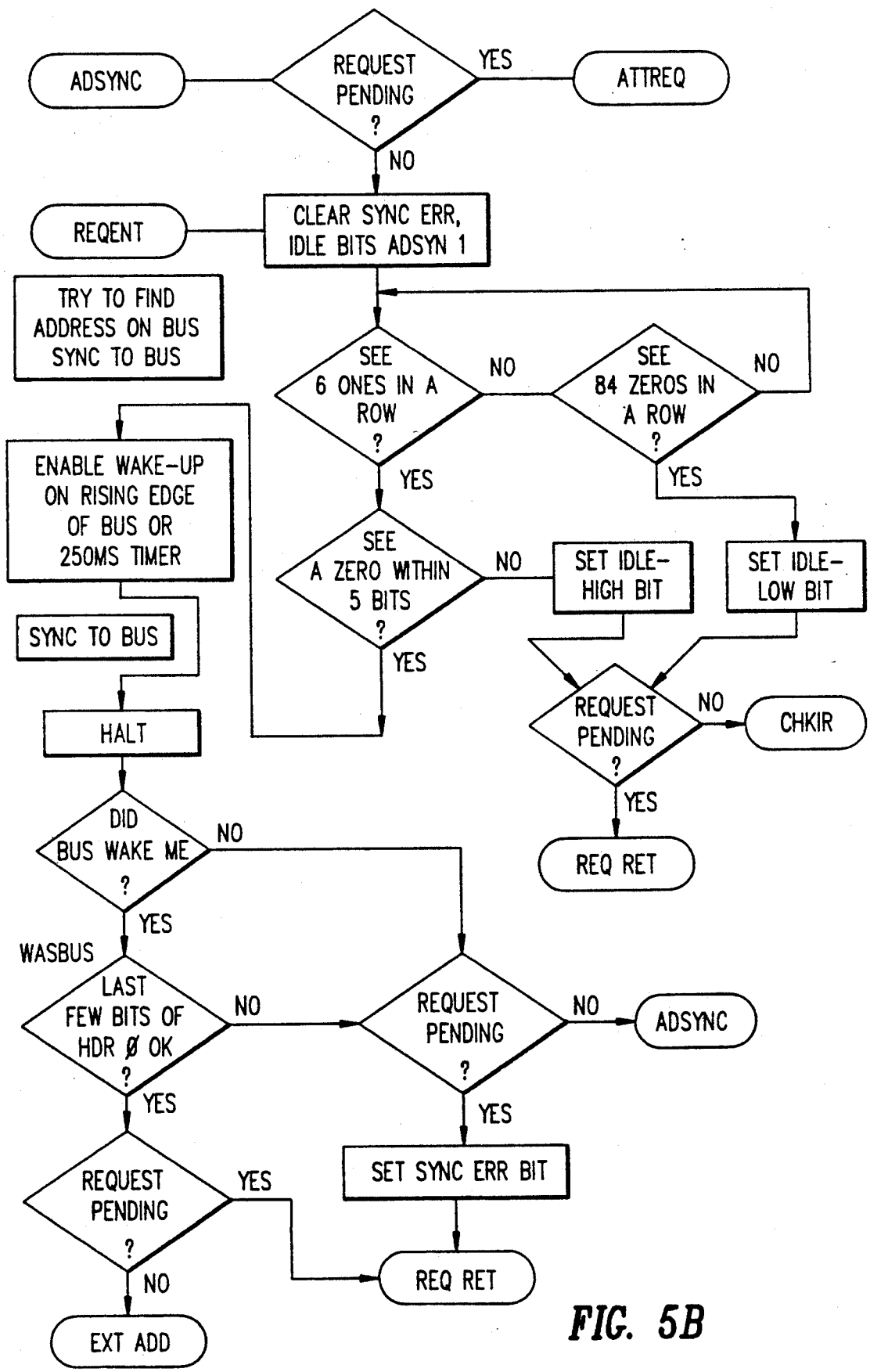
Figure 5C:
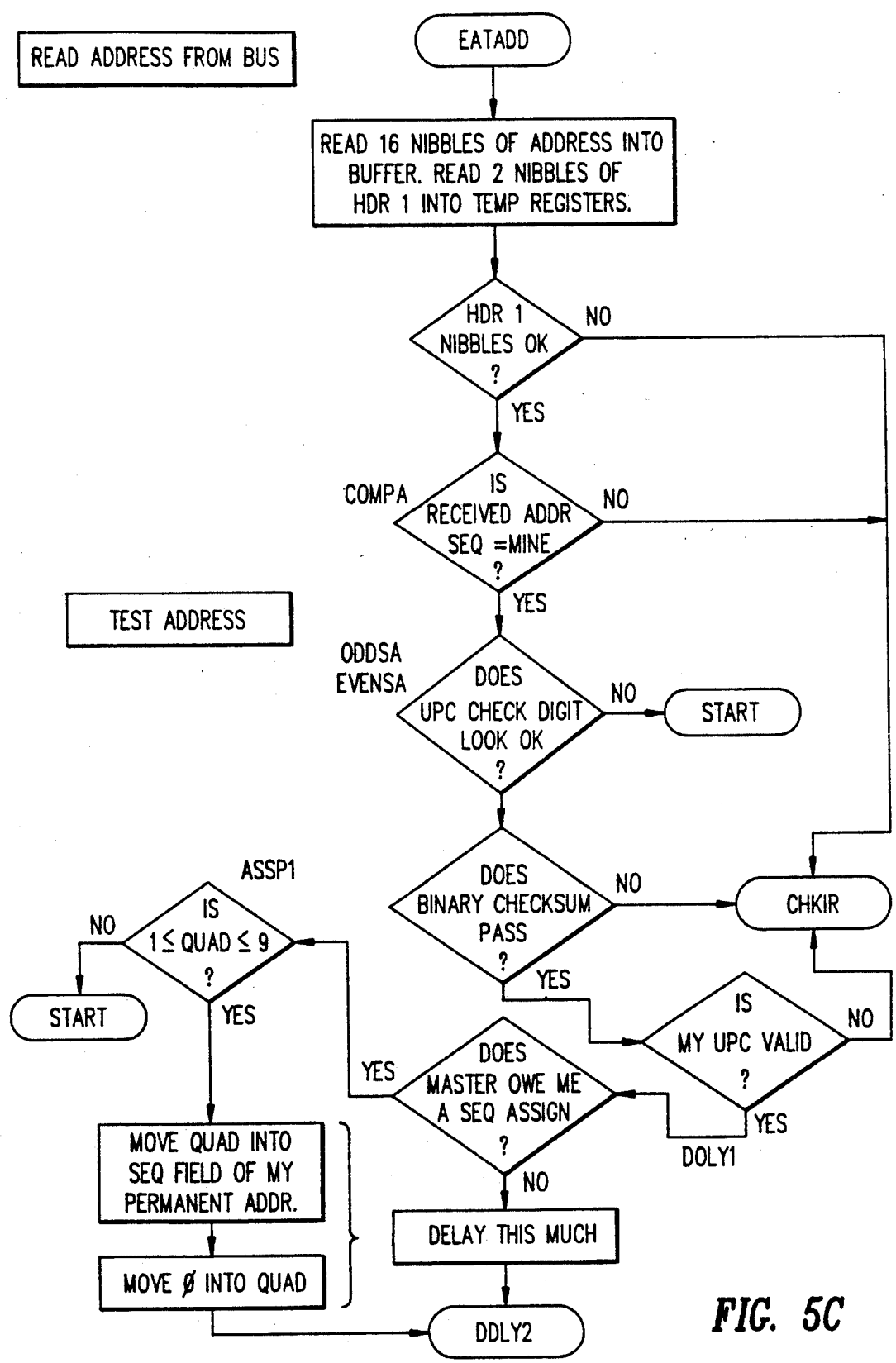
Figure 5D:
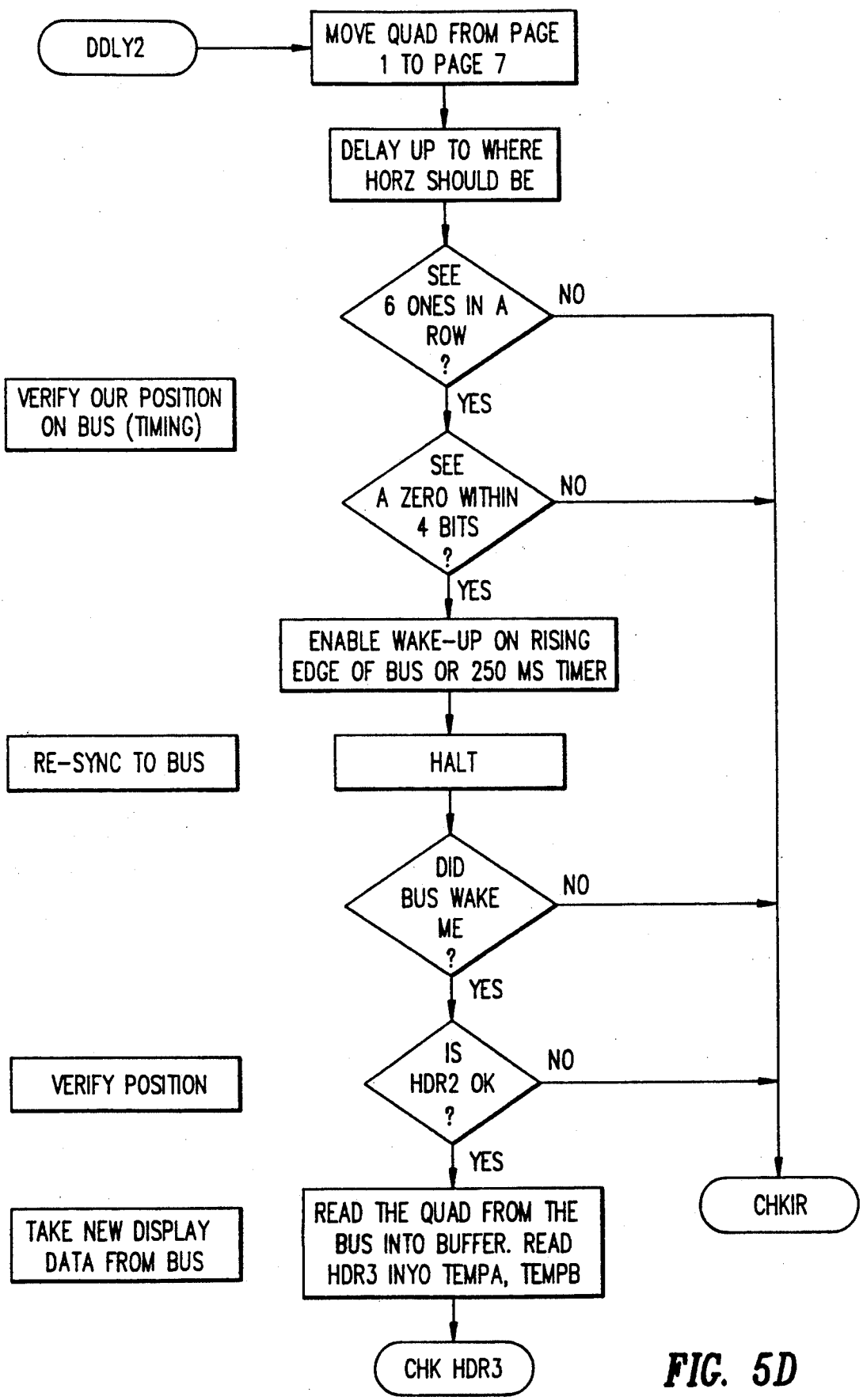
Figure 5E:
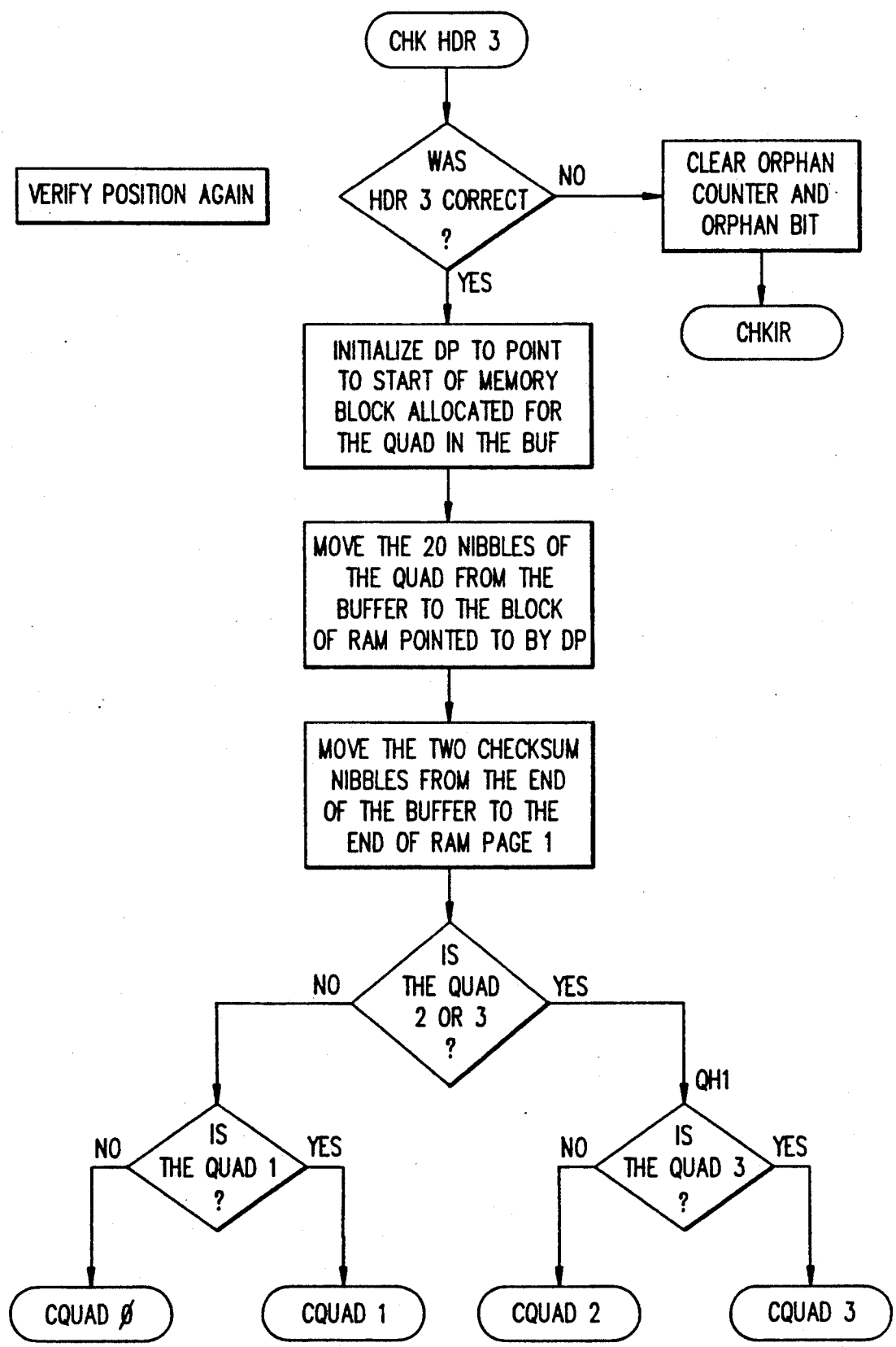
Figure 5F:
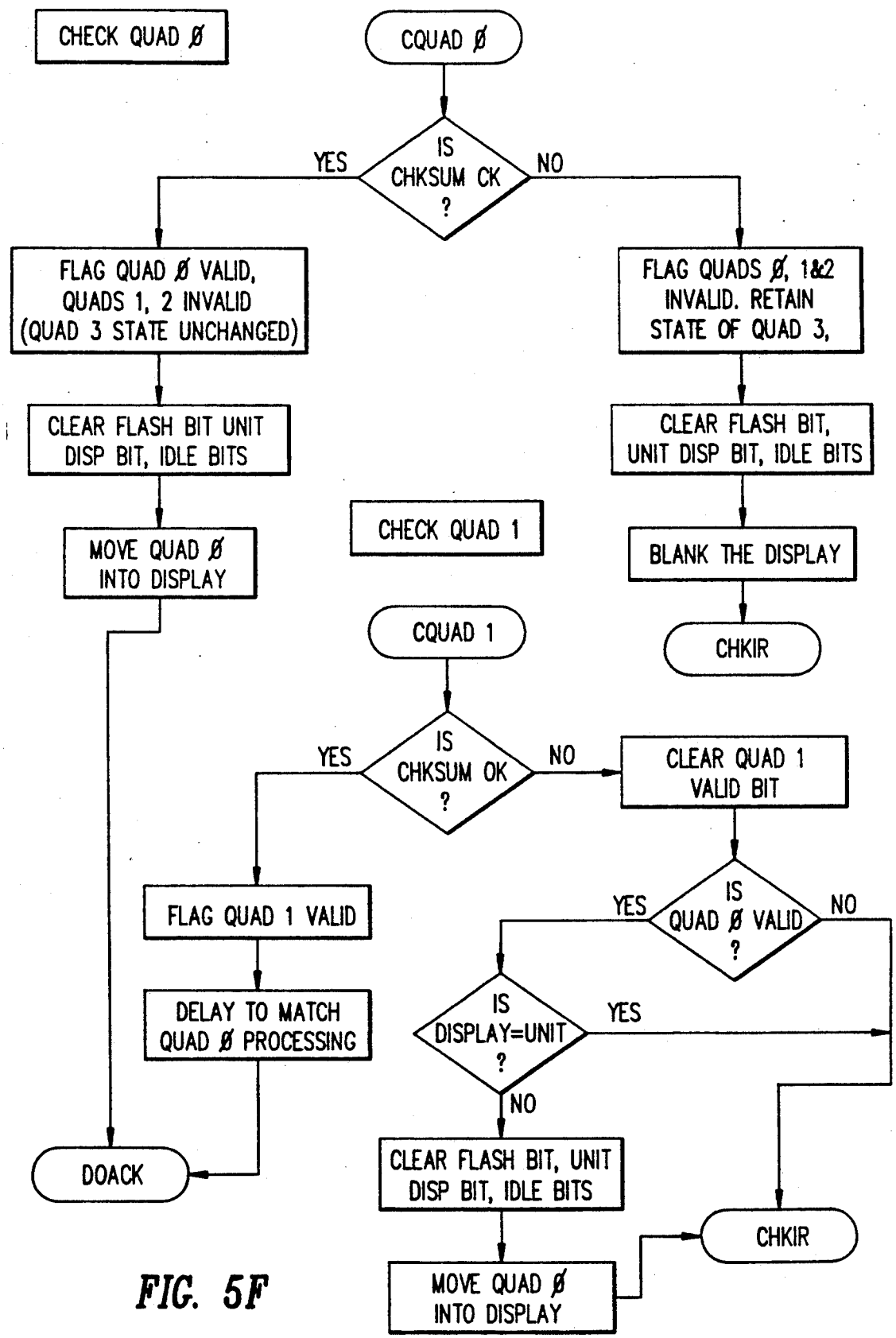
Figure 5C:
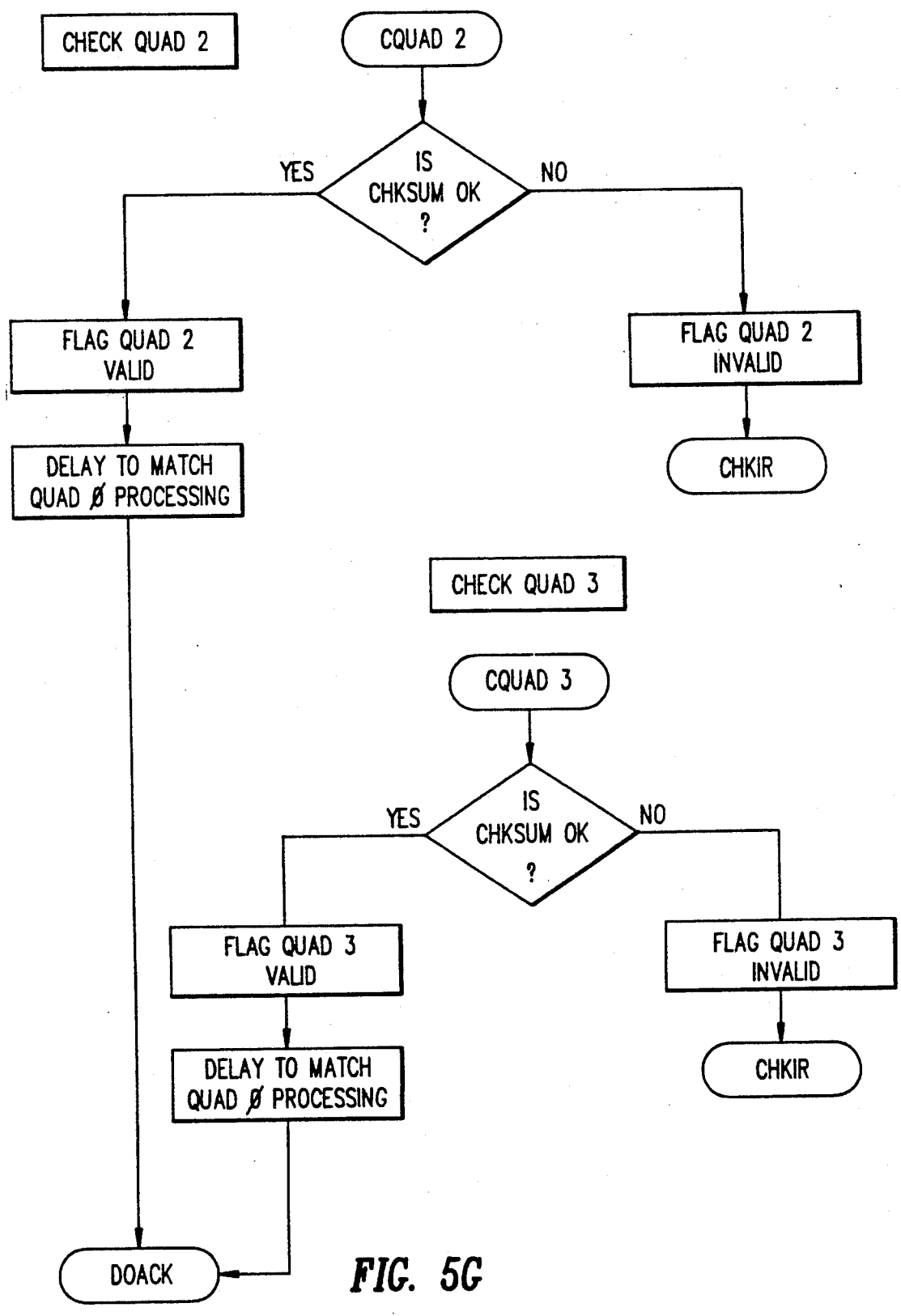
Figure 5H:
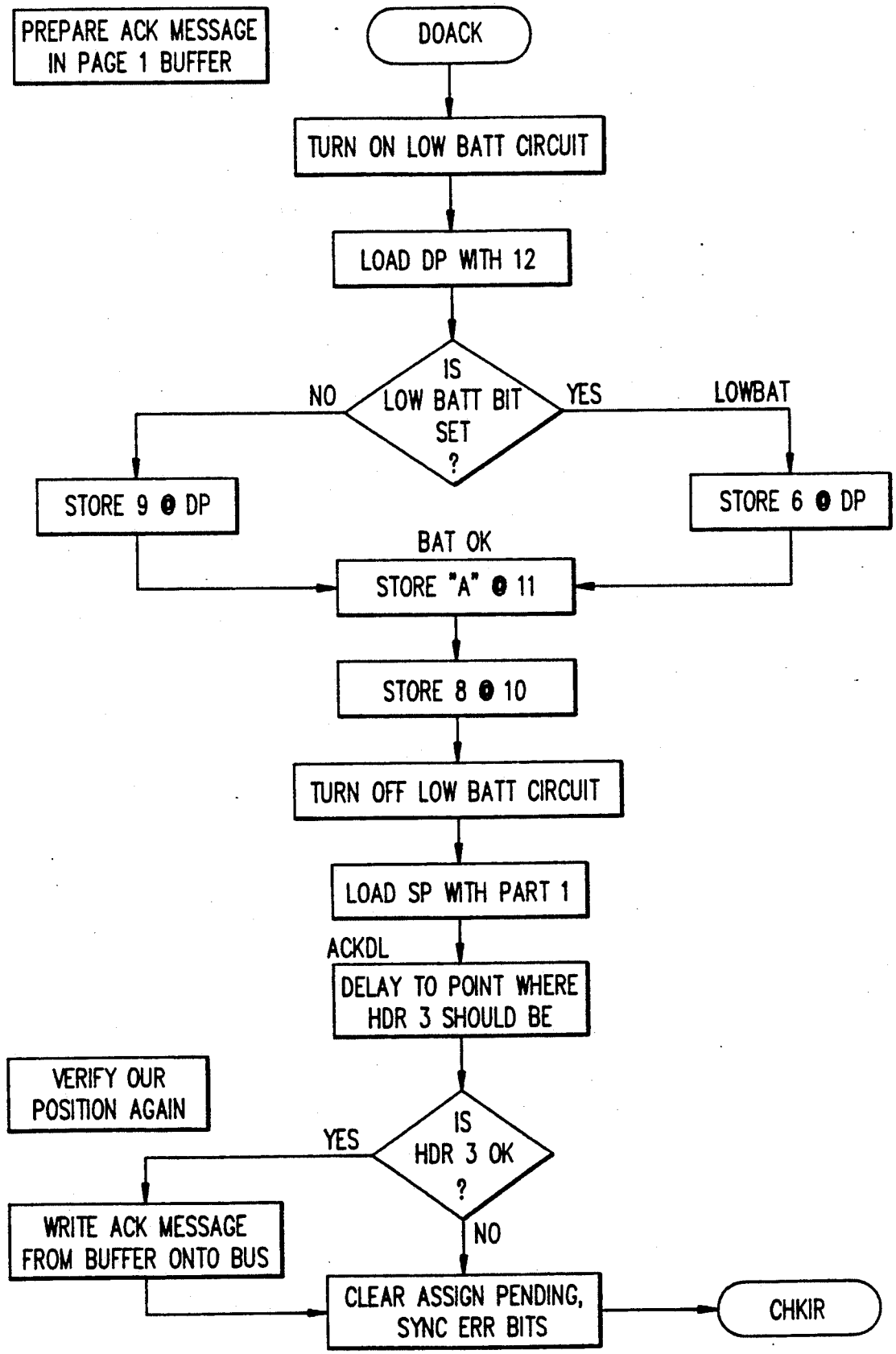
Figure 5I:
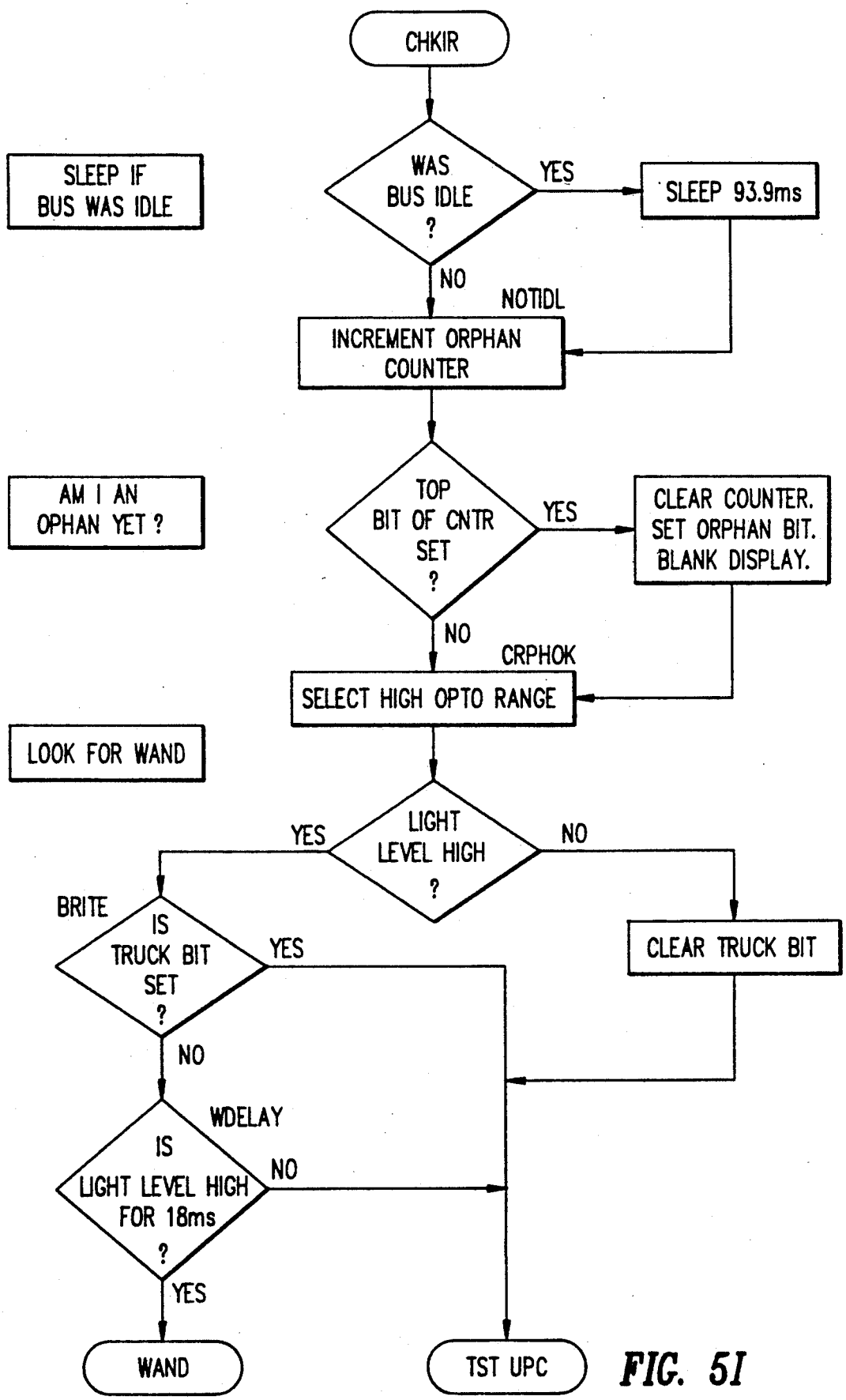
Figure 5J:
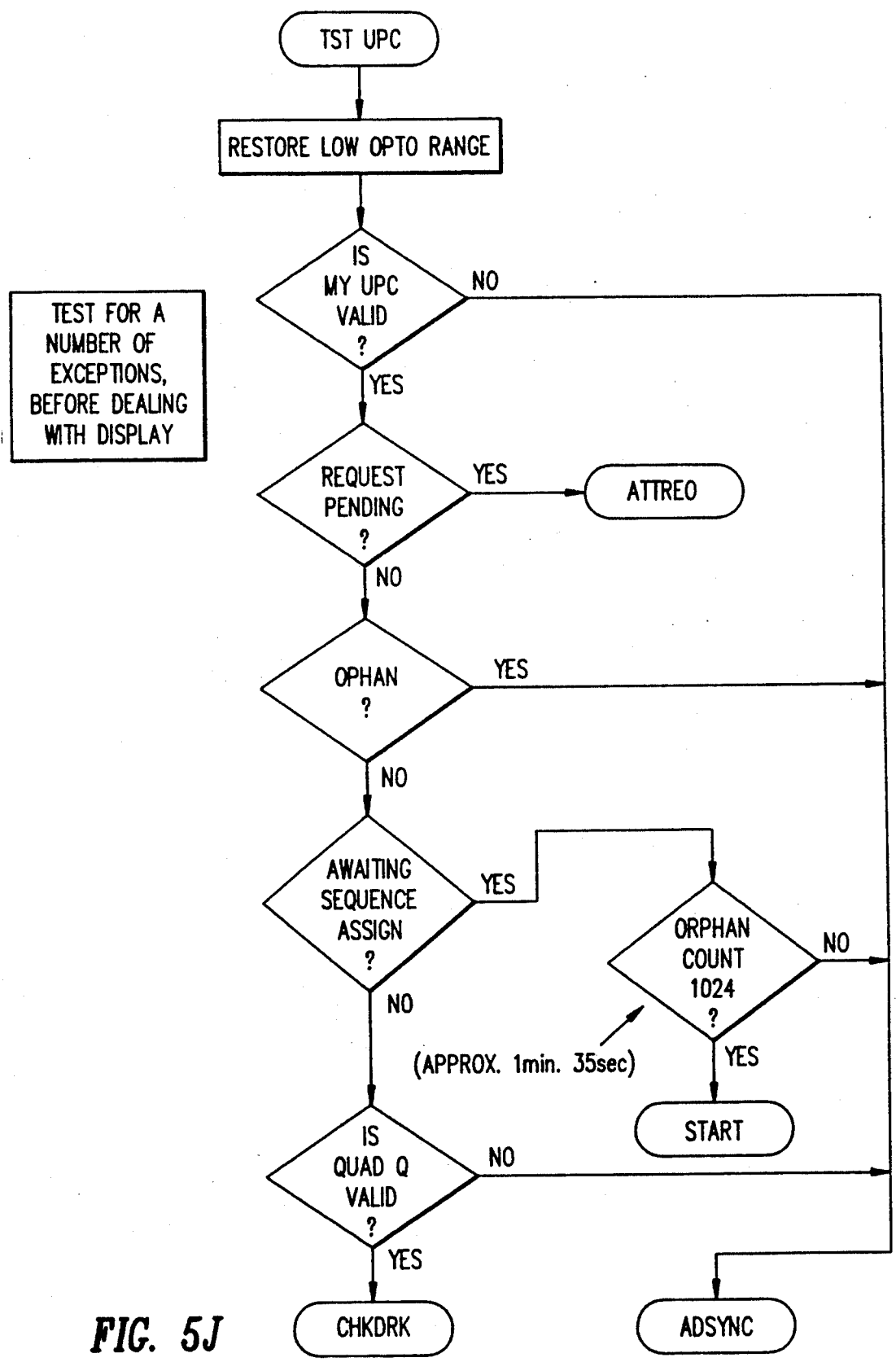
Figure 5K:
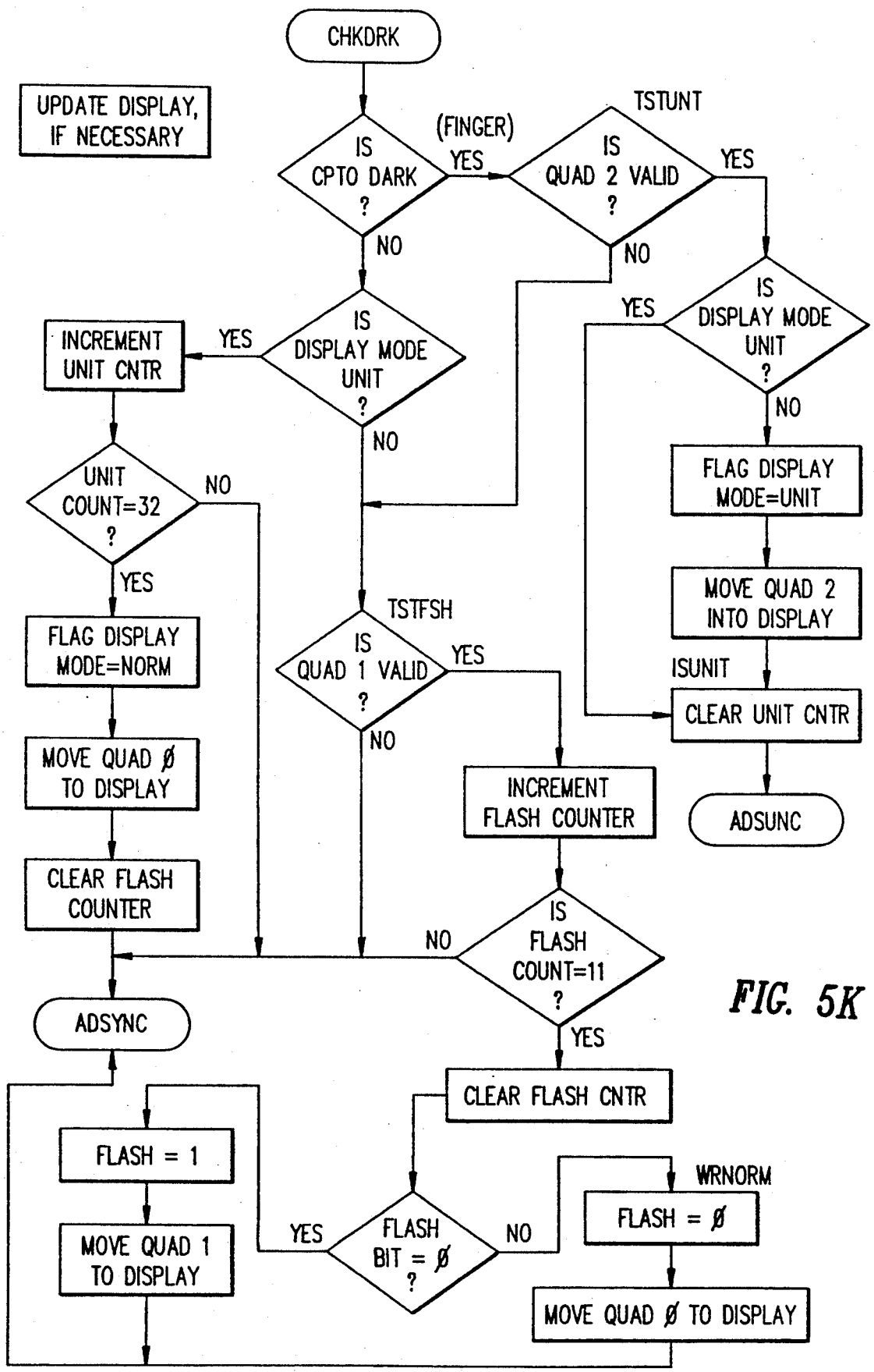
Figure 5L:
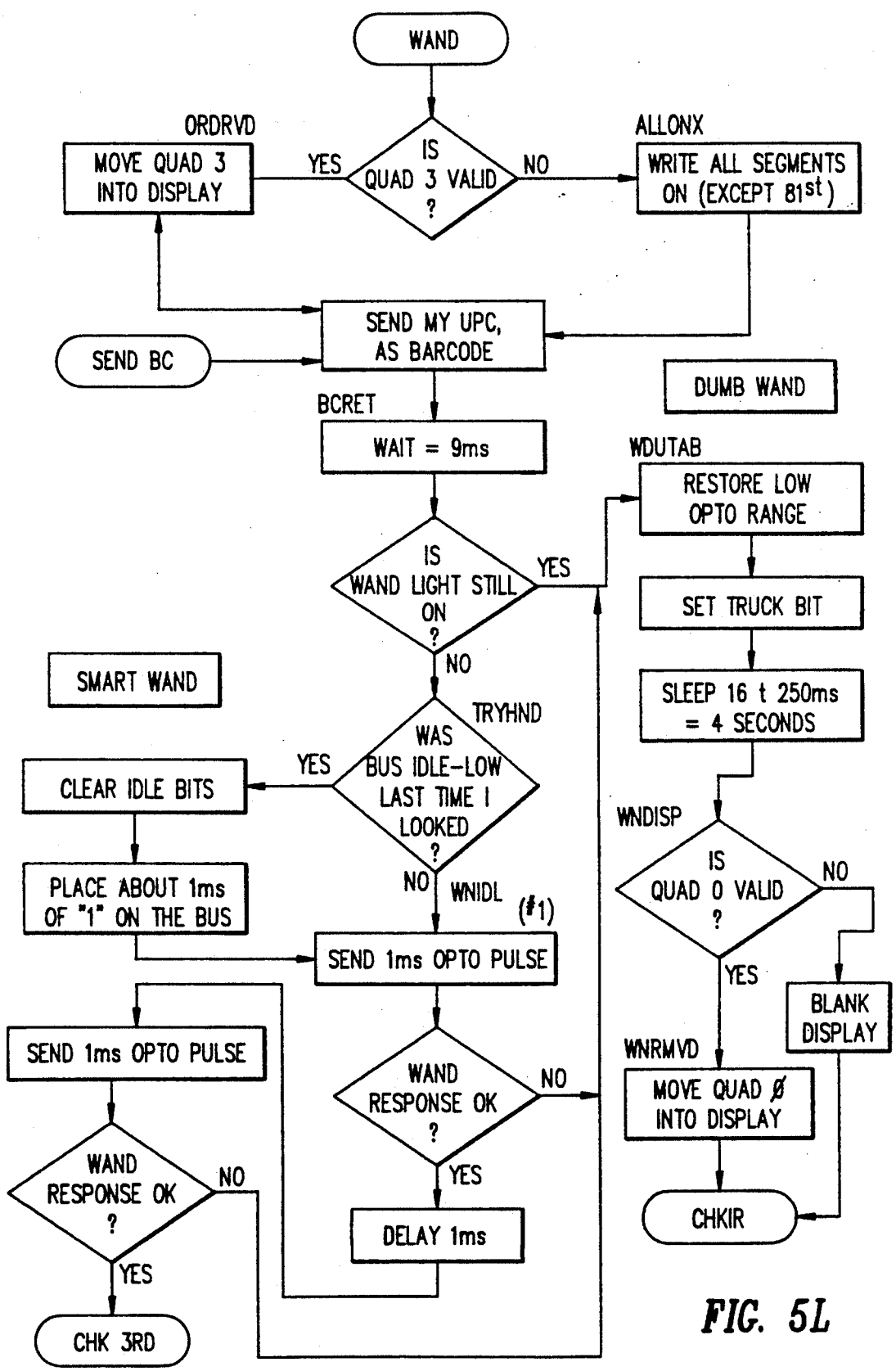
Figure 5M:
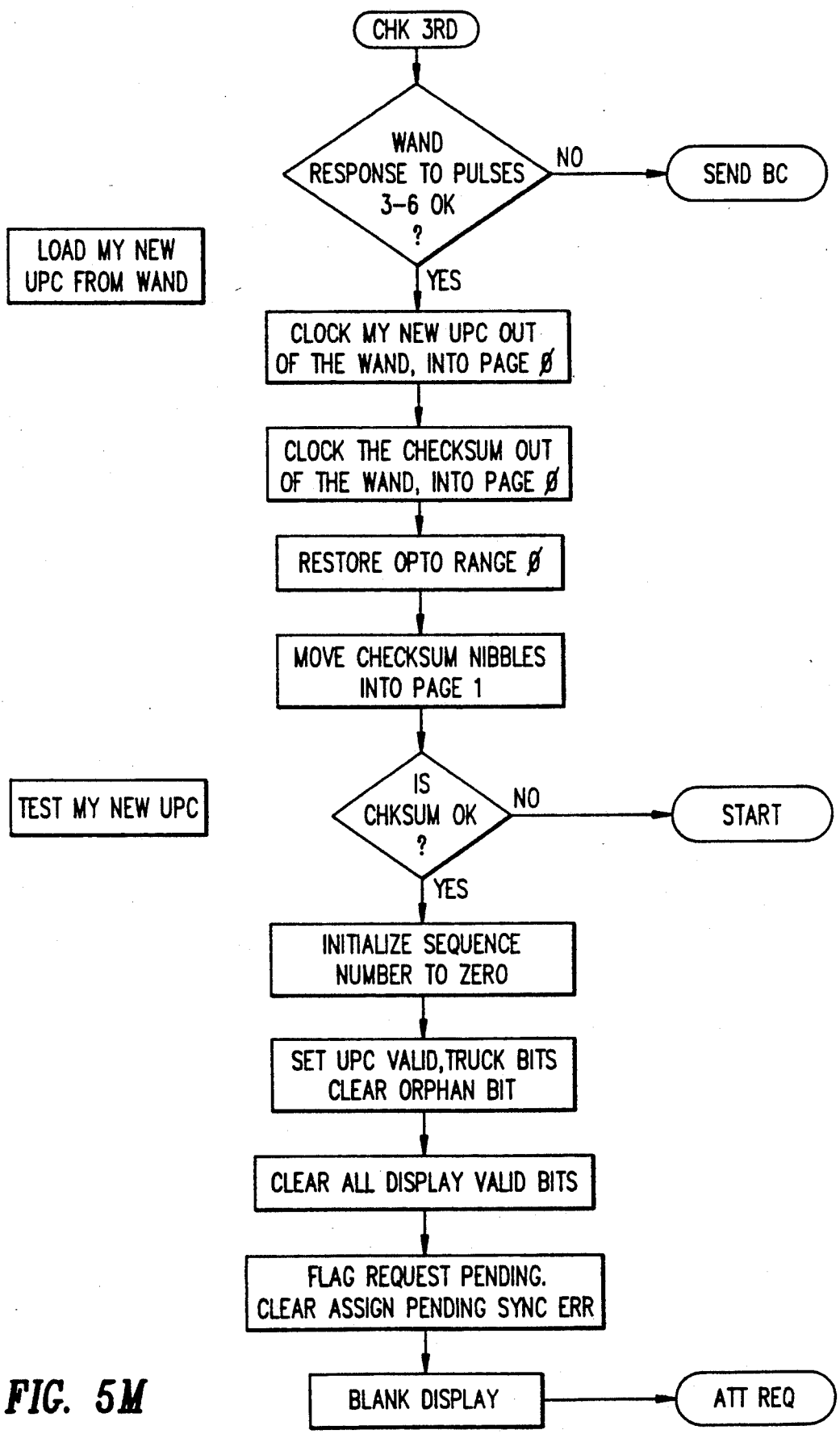
Figure 5N:
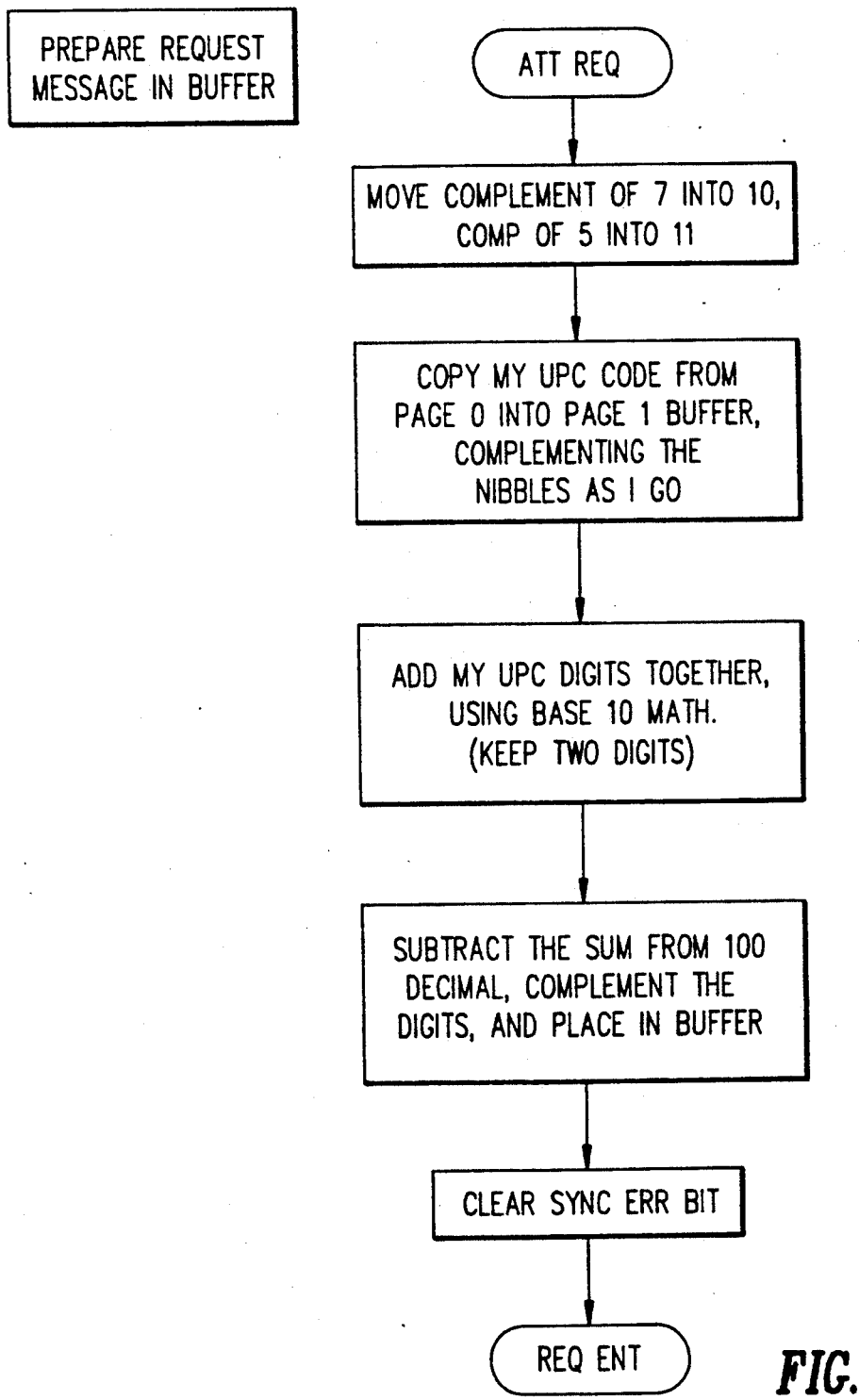

The following discussion concerns the Display Module operation before it is "in the system" —when the Display Module is first powered up, and the Data Manager does not know it exists. The flowchart in FIGS. 5A to 5O describes this operation.

Getting into the System

The Display Module display 10G (see FIG. 1) is initially blank. The installer "wands" the product, (or the barcode symbol on the sticker on the module), to load the UPC into the smart wand 14, and then puts the wand 14 in the optical port 10F of the module and presses the "program" button on the smart wand terminal 16. The smart wand performs a handshake with the module (i.e. Display Module) and then loads the module with the UPC.

The module is now in the "request pending" mode so that it knows that it needs to send a message to the Data Manager 42. The bus protocol provides a window for such a message in every cycle, and the module will find this window and place the request in it. The request message is simply the new UPC which the wand has given to the module.

If the bus is not active and is sitting low, the module will place its request message on the open bus. The Data Manager is responsible for grabbing the message.

Once the module manages to put the request message on the bus, it enters the "assignment pending" state—it knows that the Data Manager owes it a sequence assignment. If the assignment does not show up within 95 seconds, though, the module will reset itself.

If two modules happen to place their requests in the same window, neither of them will know there is a problem. However, the message will undoubtedly be garbled, and the Data Manager will ignore it. (The message includes a two digit checksum.) Both modules will reset themselves within 95 seconds, if the installer with the wand doesn't wand them again before then.

The Data Manager must see the request message and then access the hard disk to find out how many other modules with that same UPC code are in the system. The maximum is nine. If there are fewer than nine, the Data Manager adds the new module to the list and allocates a "sequence number" for the new module. The Data Manager must also retrieve the 80 bit Quad 0 display data for that UPC code.

The Data Manager must now provide this new sequence number to the Display Module. It does so by sending a message to the new UPC code, with a sequence number of zero. The Display Module which is awaiting assignment will look for this message Included in the message is a nibble which normally holds a "quad" number, but this field is used to pass the new sequence number to the Display Module during a sequence assignment. The quad is implicitly 0 during a sequence assignment, meaning that the data field contains the normal price display, Quad 0.

The Display Module picks up the price data and places it in the display, so the installer knows that the Display Module installation is complete. The objective is to have this feedback occur within a second or two after the wand programs the Display Module.

Immediately following the sequence assignment the Display Module has only a normal price display. To make the Display Module fully functional the Data Manager must send it the other three displays.

Vulnerability

If the installer with the wand reprograms the module many times, the Data Manager runs out of sequence numbers for that UPC code, and thinks that there are nine modules. When it comes time to send information to that code, it is going to try repeatedly to talk to each one of these non-existent modules. Eventually it will write them off (perhaps a week later), but until then much time will be wasted. Also, no more modules with that UPC may be added to the system until the bad assignments are deleted.

The Data Manager hardens the system against this abuse by disallowing consecutive assignments to a given code if they come too fast.

Display Module Power-Up

The module does not provide a "reset button"—the Power-On Reset of the Sanyo controller up must operate correctly or the software may fail.

The software starts executing at location 0. The module initially sets its UPC to 999999-999999, which is an erroneous code because the last digit is a check digit, and should be 3. This will prevent an unprogrammed module from responding to any legitimate address on the bus. However, a dumb wand will just beep if it attempts to read an unprogrammed module, because the check digit is wrong.

Even if the "all nines" address is sent down the bus, the Display Module will not accept the data because it will realize that the check digit of its own code is wrong and will reset itself. This check is only made when the module is preparing to accept data after recognizing its address on the bus.

Orphan Counter

A store may want all Display Modules in the store to be updated with new display information every eight hours or so. A related feature requires the modules to blank their display if they do not obtain the update. This feature is supported by the orphan counter—a twenty bit, realtime counter, incremented each time the module wakes up (93.9 ms period), or at each address on the bus (86.7 ms period). If the counter ever carries into bit 19, the module is an orphan. This results in a timeout after 12.6 to 13.7 hours, depending on how often the bus is active.

The orphan counter is reset every time the module detects its address on the bus (if all address checks pass).

An orphaned module blanks its display, but remembers its UPC. It will resume normal operation as soon as the Data Manager sends it a message.

Result of Update

The module maintains four flags which specify the validity of the four internal RAM buffers that hold the four displays. When the module receives a sequence assignment, for example, it initially has only the normal price display —it must not alternate between the normal display (quad 0) and the flash display (quad 1) because the flash buffer does not contain valid information.

In the same way, if it is desired for the module to ignore the customer's request for a unit price display (quad 2) if there is no unit price display to show, and when a wand is presented and there is no valid order mode information, the system just turns on all segments in the display.

Each update affects these "display valid" bits as follows. If the display is immediately affected, this is noted also.

Quad 0 Updated, No errors detected:
    Quad 0 is placed in display.
    Quad 0 is valid. Quads 1 and 2 are invalid.
    Quad 3 remains valid if it was before the update.
Quad 0 Updated, Error detected:
    Display is blanked.
    Quads 0, 1 and 2 are invalid.
    Quad 3 remains valid if it was before the update.
Quad 1 Updated, No errors detected:
    Quad 1 is valid.
    No other quads affected.
Quad 1 Updated, Error detected:
    If quad 0 is valid, and quad 2 is not in the display, move quad 0 into display.
    Quad 1 is invalid.
    No other quads affected.
Quad 2 Updated, No errors detected:
    Quad 2 is valid.
    No other quads affected.
Quad 2 Updated, Error detected:
    Quad 2 is invalid.
    No other quads affected.
Quad 3 Updated, No errors detected:
    Quad 3 is valid.
    No other quads affected.
Quad 3 Updated, Error detected:
    Quad 3 is invalid.
    No other quads affected.
Smart Wand gives me new UPC:

Display is blanked.
All quads invalid.

Power-Up Initialization:
Display is blanked.
All quads invalid.

Once written, the order mode display need not be written again. Nothing short of reprogramming its UPC, or power loss, will make quad 3 invalid.

When quad 0 is updated, quads 1 and 2 have to be written again before full module operation is restored.

If it is desired to idle the bus as much as possible, quad 1 or 2 or 3 are updated. That resets the orphan counter so the module does not blank itself, but requires only about one third as much bus activity.

Processor Details

Option Selections for Sanyo Controller

The Sanyo controller (see FIG. 4) is provided with a 4.5 or 6 volt power supply, and the processor is clocked with an external clock at 65.536 kHz.

None of the internal feedbacks to pullup or pulldown transistors are used. The software turns off the pulldowns on initialization, and never turns them back on.

The software gets out of Backup mode on initialization, and never goes back to backup mode. (Backup mode uses more power in the oscillator circuit.)

A 65 kHz crystal is used to reduce the current wasted in the oscillator. The inverting buffer in the oscillator input has a feedback resistor around it which helps it oscillate when a crystal is used, but draws current from the external clock. This resistor is larger for the 32 kHz option than the 65 kHz option.

The controller uses the "62.5 ms" tap for start1. This yields a 31 ms timer at 65 kHz.

In the Segment PLA, each bit written to the display latches controls one and only one segment.

Awake vs Asleep

If the bus is active the Sanyo controller spends most of its time watching the bus, to locate the start of an address. When the Sanyo controller finds an address it compares it against its own, and if they differ, the Sanyo controller checks the optical port. If there is no wand or finger in the optical port, then it goes right back to staring at the bus again.

If the bus is idle, the Sanyo controller spends most of its time halted. The Sanyo controller wakes up every 93.9 milliseconds (3 of the start1 intervals) to possibly update the display, and to check for activity at the optical port. If nothing is happening there, the Sanyo controller checks the bus again. If the bus is high for more than ten bit times, or low for more than about 90 bit times, then the Sanyo controller goes back to sleep. The result is, battery power is saved when the bus is idle.

Unused Open-Drain Outputs

The output port which drives the Opto Range and Low Batt Ckt En outputs is an open-drain P-channel output.

Serial Bus Format

The serial bus format and protocol are as follows (see FIGS. 6A to 6K). The headers, the interleaving of address, data and acknowledge, the nibble format and the bit rate are selected with regard to the capability of the Sanyo 5733 controller. In order for the bus to work properly, the bus bit rate must be exactly related to the clock speed of the Sanyo controller. The timebase of the bus and the modules must be crystal-controlled to obtain the required matching.

The direction of information on the bus is mainly from the Data Manager to the Display Modules. Each basic bus cycle, the Data Manager outputs 14 nibbles of address and 20 nibbles of data (excluding headers and checksums), and a Display Module responds with 3 nibbles of ACK (acknowledge, two nibbles of which are a fixed header). Infrequently, a Display Module will send a 12 nibble Request for Sequence Assignment to the Data Manager.

As shown in FIG. 6A, the total length of the basic bus cycle is 71 nibbles. Each bus cycle thus is 71 nibble$\times$5 bits/nibble$\times$4 Sanyo controller cycles/bit=1420 Sanyo controller cycles. One Sanyo controller cycle is equal to 4 cycles/bit$\times$1 sec/65536 cycles=61.0352 $\mu$ sec. The bit time is equal to 4 Sanyo controller cycles=4$\times$61.0352 $\mu$ sec.=244.141 $\mu$ sec. At five bits per nibble, the nibble time=5$\times$244.141 $\mu$ sec.=1.22072 $\mu$ sec. at 71 nibbles per bus cycle. The basic bus cycle time=71$\times$122070 $\mu$ sec.=86.6699 $\mu$ sec.

FIG. 6B shows the three basic bus cycles, cycle #1, cycle #2, cycle #3. Cycle #1 is recognizing the address, Cycle #2 is picking up data, and Cycle #3 is issuing the acknowledge. Three bus cycles take 3$\times$966.6699 $\mu$ sec.=260.010 $\mu$sec.

All fields in the bus format are multiples of nibbles. The nibble format (see FIG. 6C) is composed of five bit times. The first four bit times in a nibble carry the nibble value. The fifth bit is called a space, and the Data Manager keeps this bit low, (i.e., a value of D)unless the nibble was all zeros. If the nibble is 0000, then its space bit is a 1. The least significant bit of a nibble happens first in time.

The placement and duration of the space bit is required by the Sanyo controller software when reading the bus into RAM, to give it time to put the nibble away in a buffer and to prepare to receive the next nibble. Each bit is exactly four Sanyo controller machine cycles long, about as fast as the Sanyo controller could possibly receive serial data.

The rule about the value of the space bit is intended to allow the Sanyo controller to recognize quickly whether the bus is active or not, and to allow headers to be made unique by allowing them to violate the space bit rule. Specifically, the Sanyo controller finds HDR0 and HDR2 by the, fact that there are 10 bit times of continuous "1"s (i.e. two F+nibbles). Normal data should have at most 5 consecutive "1"s.

There are two fields in each bus cycle allocated for the modules, to allow them to send information up to the Data Manager. The Sanyo controller is incapable of following the space bit rule economically, though, so to prevent it from placing too many consecutive "1"s on the bus (and thus confusing the other modules and perhaps causing a module to miss a message), the module message nibbles are restricted to BCD values. This is why the checksum for the Request field is a BCD checksum.

Effect of RF Transceivers on Module-Produced Fields

The module synchronizes (see FIG. 6D) to a rising edge in HDR0 or HDR2, as detected by the shelf node receiver. These edges will actually be shifted in time, relative to when the Data Manager sent them, by lags introduced in both the transmitter and receiver circuitry. Furthermore, this shift is not constant, but will vary from module to module depending on AGC performance, module placement within the store: (signal strength), etc.

Figure 6D:
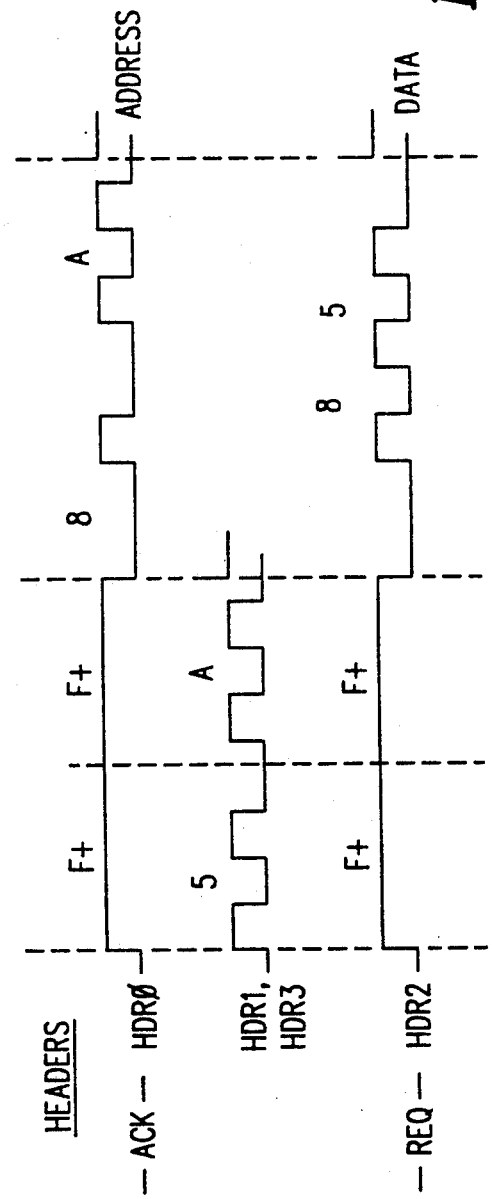
Figure 6E:
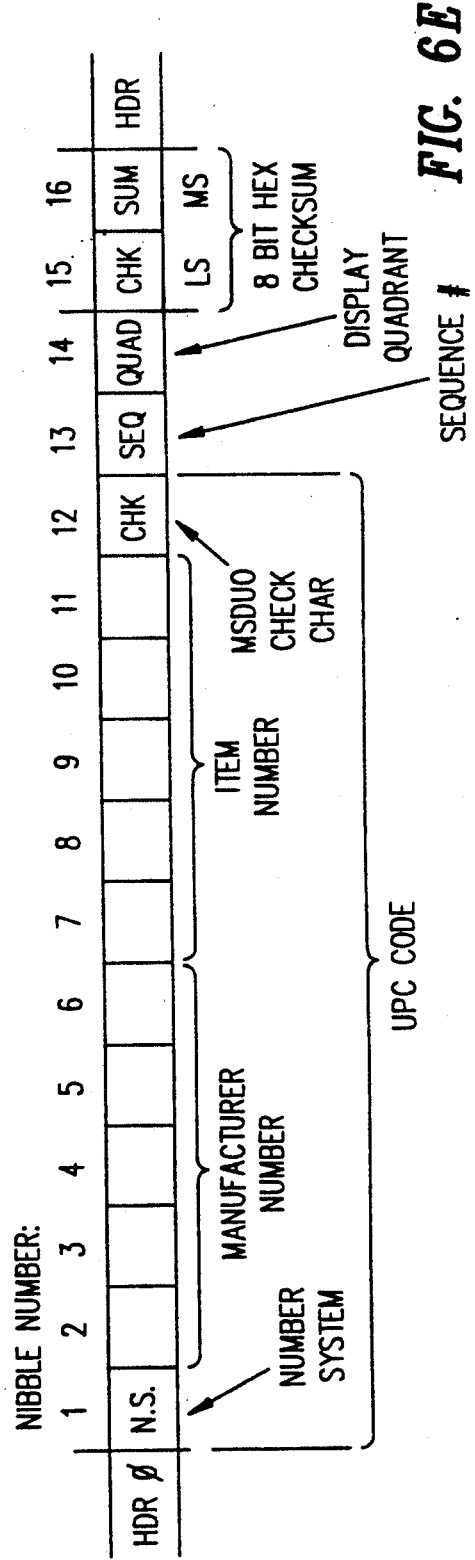

The FIG. 6E shows the address field format, including 16 nibbles total. The 8 bit check hex sum is developed by adding up the 14 nibbles in the address field using eight bit addition, then complementing the result and adding 1. An example is shown in FIG. 6F.

Information placed on the bus by a Display Module is further shifted by the additional lag in the Shelf Node transmitter, and the Data Manager receiver also contributes some lag. The combination may shift the module response by as much as a bit time, as seen by the Data Manager. It is likely that the Data Manager software or hardware will have to adapt to this shift to recover the module message correctly. (Each module message is preceded by "75" hex to provide a known initial pattern as shown in the request field format in FIG. 6G. The request field format is an open window in the data stream, to allow modules to request a sequence assignment from the master. The check sum is all BCD digits. All twelve UPC digits are added together, in BCD math, mod 100 decimal. Then the value is subtracted from 100 decimal.)

If no slop were allowed between the end of a Display Module-produced field and the start of the next Data Manager-produced field, then the Display Module message would overlap into the start of the next field because of the lags discussed above. The bus format includes a full nibble of silence (zeros) at the end of the ACK and Request fields to address this problem.

FIG. 6G' shows the data field format. FIG. 6H shows the Segment number table mapping between the physical pin connections and logical segment numbers 1 through 50. Each nibble in the data field specifies the state of four Display Module segments. A high level turns the segment on. The 81st segment is unused, as is segment line 27, common line 3.

The least significant bit of the nibble controls the lower segment numbers, so that the first nibble is as shown in FIG. 6I. As shown, segments 1 and 2 are off, segments 3 and 4 are on. As shown in FIG. 6J, the second nibble controls segments 5 to 8.

The checksum is the same as in the address field. That is, the nibbles are added up with 8 bit addition, and the checksum is the 2's complement of the sum.

Figure 6K:
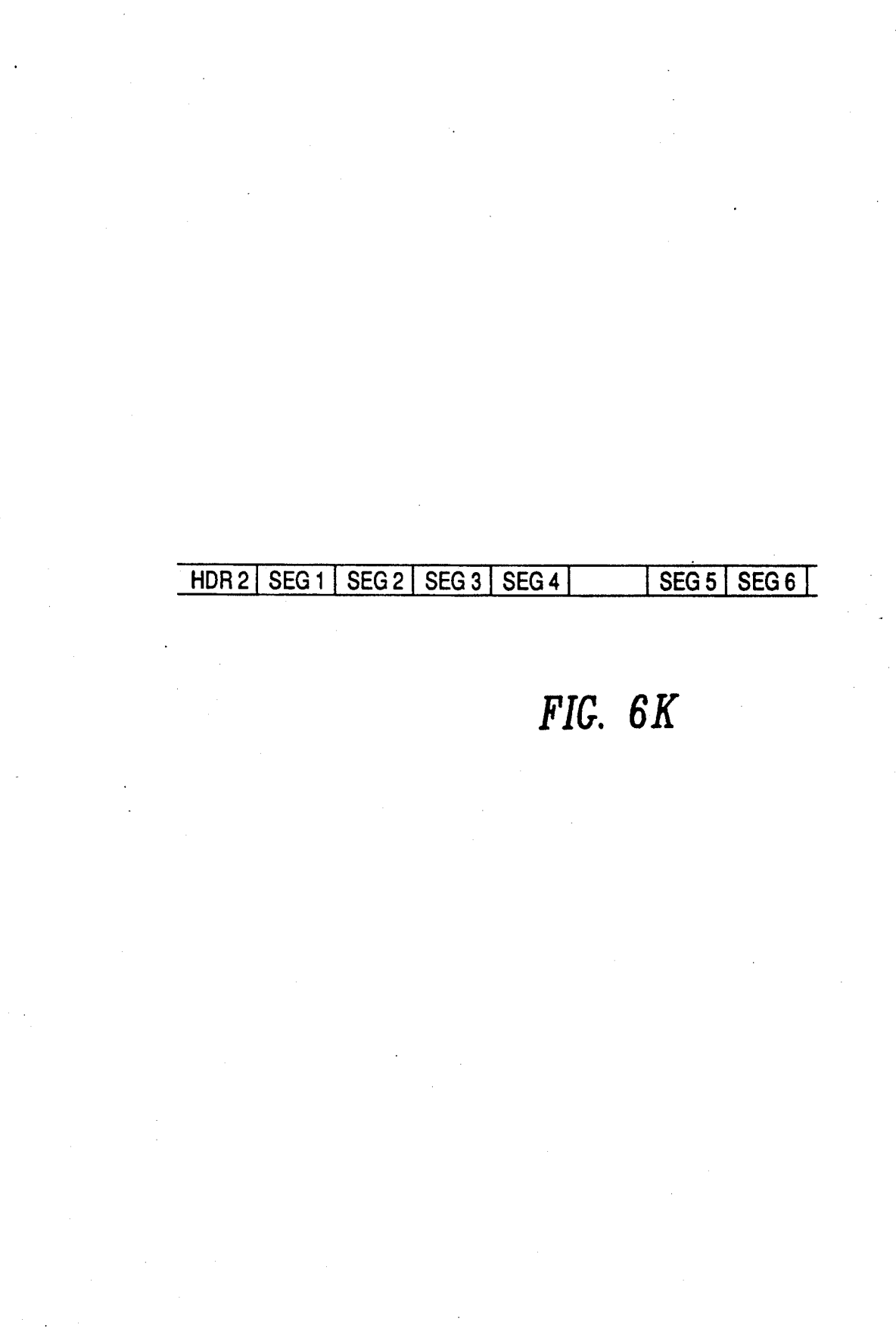

FIG. 6K shows the actual bus configuration, since the least significant bit occurs first in time within each nibble.

FIG. 6L shows the acknowledge field format, consisting of four nibbles total. The status nibble "STS" is 6 if the Display module battery is OK, and 9 if the battery is low.

Optical Port Details

When a wand is not in use, the optical port should be either dark (covered by a customer's finger), or lit by ambient light. Two problems are possible; 1) Ambient too dark, and 2) Ambient too bright.

If the store lights go out, the ambient may drop to the point that most modules revert to the Unit Price display. They will remain in this display until normal lighting is restored. This does not reduce module responsiveness to either messages on the bus, or wand activity at the optical port.

The opposite problem, unusually intense ambient, has become known as the "truck" problem because a likely scenario involves a truck parking right outside and reflecting a lot of sunlight into the store. The unsophisticated module might see this as a wand, and become locked in the order mode display. Unlike the low light condition, the wand demands all of the processor's time and the module would stop monitoring the bus.

The module software rejects continuously high light levels with the use of the "truck" bit. This bit is set by II the software when a wand is first detected and serviced. The bit will not be reset until the software sees the light level drop down again, and the module will ignore high light levels until the truck bit is reset.

A second interlock protects against 60 Hz modulated light levels—the module will reject a wand unless it is bright for at least 18 milliseconds continuously (to the resolution that the module can sample at). However, lower frequency modulation of bright levels may lock up a module. This operation would be characterized by four seconds of Order Mode display, followed by the return of the Normal Price display, and then as soon as the module saw a dark and then a bright the Order Mode display would return for four seconds again.

When a wand is in use a different kind of problem can arise. The conventional (dumb) wand keeps its LED on when the wand is trying to read a barcode. If the optical port reflects too much of this light back to the wand, the wand's light detector may see only this bright level, making it unable to read the barcode pattern emitted by the module's LED. The wand in accordance with the invention will prevent this problem by its configuration.

The smart wand module interface is designed to tolerate excessive reflection at the port window. Two basic features support this capability; 1) The handshake, and subsequent data exchange never requires a detector to sample the port when its own emitter is on, and 2) the barcode emission of the module may be re-triggered by the smart wand, allowing the smart wand to watch the full barcode emission with its LED off.

The wand gets the module's attention by illuminating up the optical port. The module requires anywhere from 20 milliseconds to about 120 milliseconds to respond to the wand, and begin emitting barcode. The barcode takes 260 milliseconds to complete.

The smart wand will not see the reflection of its own LED and will see the module's barcode. In this case the smart wand will not have to request a re-transmission of barcode. If, however, the wand sees nothing but bright, it must hold its LED on for perhaps 150 ms to ensure that the wand sees it. When the wand finally drops its LED and can see the module's LED, the module will have begun the barcode transmission already.

The wand simply waits until the barcode finishes and the handshake begins. The wand performs the start of the handshake correctly, and then purposely fails a later part of the handshake. This causes the module to revert to the start of the barcode emission, and the wand should be able to read it this next time.

Display Module Software

The Sanyo 5733 controller has 2k bytes of program ROM, organized into eight (8) 256-byte pages. A memory map of the Sanyo 5733 controller.

---

RAM is 128 locations, 1 nibble wide.
RAM is organized into pages (because one points into RAM with DP, and DP is broken into DPH (3 bits, RAM page), and DPL (4 bits, offset into page). There are 8 pages, 16 nibbles per page.

RAM Page 0 : (Assigned Address - long term storage is

-continued

|  | Hex Addr |  | only changed by smart wand re-programming.) |
|---|---|---|---|
|  | 00 | Num Sys digit |  |
|  | 01 | 1st digit |  |
|  | 02 | 2nd digit |  |
|  | 03 | 3rd digit |  |
|  | 04 | 4th digit |  |
|  | 05 | 5th digit | Module address - |
|  | 06 | 6th digit | 12 digits from UPC, plus |
|  | 07 | 7th digit | sequence number assigned |
|  | 08 | 8th digit | by master. |
|  | 09 | 9th digit |  |
|  | 0A | 10th digit | Compared against each |
|  | 0B | Check digit | address captured from |
|  | 0C | Sequence number | the shelf bus. |
| TEMP 0 | 0D |  |  |
| TEMP 1 | 0E | Temporary storage during barcode emission |  |
| TEMP 2 | 0F |  |  |

| RAM Page 1: | | Temporary storage of: |
|---|---|---|
|  |  | a) Address pulled from shelf bus stream |
|  |  | b) Request image (complemented UPC + chk) |
|  |  | c) Checksum running sum (last two nibbles) |
|  | Hex Addr | |
|  | 10 | Number System |
|  | 11 | 1st digit |
|  | 12 | 2nd digit |
|  | 13 | 3rd digit |
|  | 14 | 4th digit |
|  | 15 | 5th digit | Organization when holding
|  | 16 | 6th digit | address pulled from bus.
|  | 17 | 7th digit | Processor then performs
|  | 18 | 8th digit | check test(s), and then
|  | 19 | 9th digit | compares against address
|  | 1A | 10th digit | stored in page 0.
|  | 1B | Check digit |
|  | 1C | Sequence number | (The last two nibbles are
|  | 1D | Quad | used by chksum subroutine
| CHXSML | 1E | Checksum, low nibble | to hold running sum.)
| CHKSMH | 1F | Checksum, high nibble |

| RAM Page 2: | | Display Image; | Quad 0 (first 16 nibbles) |
|---|---|---|---|
|  | Hex Addr | | |
|  | 20 | Segs 1-4 | Quad 0, begin |
|  | 21 | Segs 5- | |
|  | 22 | Segs 9-12 | |
|  | 23 | Segs 13-16 | |
|  | 24 | Segs 17-20 | |
|  | 25 | Segs 21-24 | |
|  | 26 | Segs 25-28 | |
|  | 27 | Segs 29-32 | (Normal Price Display) |
|  | 28 | Segs 33-36 | |
|  | 29 | Segs 37-40 | |
|  | 2A | Segs 41-44 | |
|  | 2B | Segs 45-48 | |
|  | 2C | Segs 49-52 | |
|  | 2D | 53-56 | |
|  | 2E | Segs 57-60 | |
|  | 2F | Segs 61-64 | |

| RAM Page 3: | | Display Image; | Quad 0 (last 4 nibbles) |
|---|---|---|---|
|  | | | Quad 1 (first 12 nibbles) |
|  | Hex Addr | | |
|  | 30 | Segs 65-68 | Quad 0, continued |
|  | 31 | Segs 69-72 | |
|  | 32 | Segs 73-76 | (Normal Price Display) |
|  | 33 | Segs 77-80 | |
|  | 34 | Segs 1-4 | Quad 1, begin |
|  | 35 | Segs 5-8 | |
|  | 36 | Segs 9-12 | |
|  | 37 | Segs 13-16 | |
|  | 38 | Segs 17-20 | |
|  | 39 | Segs 21-24 | (Flashed Price Display) |
|  | 3A | Segs 25-28 | |
|  | 3B | Segs 29-32 | |
|  | 3C | Segs 33-36 | |
|  | 3D | Segs 37-40 | |
|  | 3E | Segs 41-44 | |
|  | 3F | Segs 45-48 | |

| RAM Page 4: | | Display Image; | Quad 1 (last 8 nibbles) |
|---|---|---|---|
|  | | | Quad 2 (first 8 nibbles) |
|  | Hex Addr | | |
|  | 40 | Segs 49-52 | Quad 1, continued |
|  | 41 | Segs 53-56 | |
|  | 42 | Segs 57-60 | |
|  | 43 | Segs 61-64 | (Flashed Price Display) |
|  | 44 | Segs 65-68 | |
|  | 45 | Segs 69-72 | |
|  | 46 | Segs 73-76 | |
|  | 47 | Segs 77-80 | |
|  | 48 | Segs 1-4 | Quad 2, begin |
|  | 49 | Segs 5-8 | |
|  | 4A | Segs 9-12 | |
|  | 4B | Segs 13-16 | |
|  | 4C | Segs 17-20 | (Unit Price Display) |
|  | 4D | Segs 21-24 | |
|  | 4E | Segs 25-28 | |
|  | 4F | Segs 29-32 | |

| RAM Page 5: | | Display Image; | Quad 2 (last 12 nibbles) |
|---|---|---|---|
|  | | | Quad 3 (first 4 nibbles) |
|  | Hex Addr | | |
|  | 50 | Segs 33-36 | Quad 2, continued |
|  | 51 | Segs 37-40 | |
|  | 52 | Segs 41-44 | |
|  | 53 | Segs 45-48 | |
|  | 54 | Segs 49-52 | |
|  | 55 | Segs 53-56 | (Unit Price Display) |
|  | 56 | Segs 57-60 | |
|  | 57 | Segs 61-64 | |
|  | 58 | Segs 65-68 | |
|  | 59 | Segs 69-72 | |
|  | 5A | Segs 73-76 | |
|  | 5B | Segs 77-80 | |
|  | 5C | Segs 1-4 | Quad 3, begin |
|  | 5D | Segs 5-8 | |
|  | 5E | Segs 9-12 | (Order Mode Display) |
|  | 5F | Segs 13-16 | |

| RAM Page 6: | | Display Image; | Quad 3 (last 16 nibbles) |
|---|---|---|---|
|  | Hex Addr | | |
|  | 60 | Segs 17-20 | Quad 3, continued |
|  | 61 | Segs 21-24 | |
|  | 62 | Segs 25-28 | |
|  | 63 | Segs 29-32 | |
|  | 64 | Segs 33-36 | |
|  | 65 | Segs 37-40 | |
|  | 66 | Segs 41-44 | |
|  | 67 | Segs 45-48 | (Order Mode Display) |
|  | 68 | Segs 49-52 | |
|  | 69 | Segs 53-56 | |
|  | 6A | Segs 57-60 | |
|  | 6B | Segs 61-64 | |
|  | 6C | Segs 65-68 | |
|  | 6D | Segs 69-72 | |
|  | 6E | Segs 73-76 | |
|  | 6F | Segs 77-80 | |

End of Display storage. Displays are each 20 nibbles long. There are 4 displays, for a total storage of 80 nibbles. This represents 62.5% of available RAM.

| RAM Page 7: | | Temp storage, Flags, Counters. | | | |
|---|---|---|---|---|---|
|  | Hex Addr | | | | |
| ORPHCT | 70 | IS nibble | Orphan counter | | |
|  | 71 | nibble 1 | | | |
|  | 72 | nibble 2 | 20 bit counter; | | |
|  | 73 | nibble 3 | "Time since last update" | | |
|  | 74 | MS nibble | (Also, all six of these nibbles | | |
|  | 75 | used as temp register when data read from bus) | | | |
| UNITCT | 76 | IS nibble | 8 bit counter | | |
|  | 77 | MS nibble | Unit Price delay count | | |
| FLSHCT | 78 | count | 4 bit counter - flash rate | | |
|  |  | MSB | bit 2 | bit 1 | LSB |
| REQST | 79 | Assign pend | Req pend | Sync Err | (not used) |
| TEMPA | 7A | Temporary Registers | | | |
| TEMPB | 7B | Temporary Registers | | | |
| QUAD 7 | 7C | Holds destination for data being received | | | |
|  |  | MSB | bit 2 | bit 1 | LSB |
| DISPVD | 7D | Order Valid | Unit Valid | Flash Valid | Price Valid |
| DISPST | 7E | Flash bit | Unit disp | Idle High | Idle Low |

-continued

MAINST   7F   UPC valid   (not used)   Orphan   Truck
Explanation of bit interpretation:
  Input Bits:
  Comm Channel is High (1) if Channel is in Superior state.
    Superior state is High level in hardwired version, or
    Carrier On in RF implementation of bus.
  Dark is High (1) to indicate that light level is below the
    selected sensitivity threshold.
  Low batt is high to indicate low battery voltage.
    Output Bits:
  Low batt ckt En is written high to power-up the low
    batt detect circuit (turned off when not in use to conserve
    battery power).
    (The low batt circuit is tested just before an ACK is sent
    to the Master, so it is off almost all the time.)
  Opto Range sets the light sensitivity:
    Range 0 is most sensitive - used to detect the difference
      between normal ambient, and completely dark (when
      customer obstructs opening with finger to invoke unit
      price display).
    Range 1 is least sensitive - used to detect the difference
      between normal ambient, and very bright (when wand is
      inserted into opto port, and wand LED turned on.)
      (Opto Range should always be '0', unless Opto port is
      being serviced. When Range is '1', current can flow in
      detect circuit, depleting the battery.)
  Send a '1'*  is used to send information from a display
    module to the shelf node processor or Data Manager.
    When written Low (0), the shelf node bus will be
    forced to a '1'. This bit is always set high, except
    when sending data. Data is complemented before
    sending it, so it ends up right-side-up on the bus.
  Light Output:
    SLGT turns module LED on.
    RLGT turns module LED off.
      (LED should always be off, except during
      communications with wand - uses lots of power.)
  ALARM output:   Not used.

Pricelink Display Module Operation Request timing

The preferred embodiment leaves any given shelf bus idle-low almost all the time; the only time the shelf bus is active is for a period of about one second each eight hours. This means that when a Display Module is wanded, the bus will a most certainly be idle-low.

If a smart want is detected by the module and the bus was idle-low last time the module checked it, the module will place a 1.3 millisecond pulse on the bus. The pulse is issued if the wand's LED is not detected after the module has completed emitting its barcode. This is just before the handshake is attempted with the wand.

The Display Module then attempts a handshake procedure with the wand, and if the handshake succeeds the Display Module clocks its new UPC out of the wand. The module then checks the received code to see if the two-BCD-digit checksum is correct, and if correct, the Display Module prepares to place a request on the bus.

The Display Module first checks the bus again to see that it is still idle (this takes 100 ms). All together, about 575 milliseconds pass after the initial pulse, before the request message is transmitted. The request itself takes about 39 milliseconds (80 shelf bus bit times).

Wand to Display Module Interface

The Display Modules in the system will remain blank until the Data Manager sends them their first display information. This operation cannot take place, however, until an association is formed between the Display Module and a particular product in the store.

This association is formed when the Display Module is assigned a UPC code by a smart wand. The smart wand is a barcode-reader-type handheld optical wand in accordance with the invention, with the ability to modulate its light source. This capability makes possible two-way communication between a Display Module and a smart wand.

The following describes the timing of the UPC assignment process.

The Display Module contains an optical transmitter and an optical receiver (a silicon phototransistor). The smart wand "tip" is inserted, into a hole in the front of the module, so that the wand's optical components are closely coupled to the module's.

The Display Module detects the presence of a wand by noting an unusually high light level. This can take as long as 94 milliseconds to occur, because the Display Module only samples the state of the optical port once every 94 ms. When a wand is detected the Display Module first moves the Quad 3 image into the display (or turns on all segments if no valid quad 3 info is available). This operation can take several milliseconds.

The Display Module next emits its current UPC code, using its LED, in barcode format. If the module has not been assigned a barcode, the code emitted will be 999999-999999. Note that this is an erroneous code, since the check digit should be 3, but it is 9.

The barcode format allows conventional barcode readers to read the code of a Display Module. A conventional barcode reader is referred to as a dumb wand, since it cannot assign a new UPC code to the Display Module.

The barcode is issued with a timing of approximately two milliseconds per "module" (smallest element in code); there are 110 modules in a code, including margins, so the barcode emission takes about 220 ms.

After turning off its LED at the completion of the barcode, the Display Module waits about 9 ms, then tests the state of the wand. If the wand LED is still on, the Display Module concludes that the wand is dumb, and the Display Module goes to sleep for about four seconds, then wakes up and places quad 0 back in the display (or blank if no quad 0 information is available).

If the wand LED is off 9 milliseconds after the barcode is finished, the Display Module attempts a handshake with the wand. Before beginning the handshake, the module places a 1.3 ms pulse on the shelf bus, to wake up the Shelf Node processor.

The handshake, and subsequent UPC assignment, are defined such that neither receiver is examined while its own emitter is on; the module doesn't test the wand state while the module LED is on, and the wand doesn't look for a module-produced pulse unless the wand's LED is off. This avoids problems due to possible interactions between emitters and detectors (such as reflections).

The optical port state is vigorously oversampled during this handshake, adding to the error detection properties of the protocol.

The timing of both the handshake and the UPC transfer is determined by the Display Module, on a bit-by-bit basis. The Display Module issues a pulse of approximately 1 millisecond, and the smart wand sees the pulse end, delays 1 millisecond, and then either turns on its LED, or leaves it off. After three milliseconds, the wand turns its LED off, if the LED was on. This accomplishes the transfer of one bit of data from the wand to the Display Module. The Display Module waits one millisecond, and then issues another timing pulse. This results in a transfer rate of about six millisecond per bit.

The direction of data flow is from the wand to the Display Module; the only time that the Display Module sends data to the wand is during the barcode emission, described above.

The handshake consists of a six bit code; 110101. The pair of ones are issued first—the timing is from left to right. (A 1 here means that the wand LED is on.)

If the handshake is completed successfully, the Display Module continues to issue timing pulses, and the wand responds by feeding the new UPC code to the Display Module. The code is sent as BCD nibbles; there are 12 nibbles send for the code, and a 2 nibble checksum is included at the end. This is a total of 56 bits.

Shelf Node Operation

The following is a description of the Spread Spectrum transmission scheme for the Pricelink System that attempts to conserve battery power in the Shelf Nodes. The RF (radio frequency system) is preferably capable of transmitting data reliably at much higher rates than the Display Modules, thus allowing room for the extra overhead information needed to conserve battery life in the Shelf Nodes.

The basic concept of the scheme is to allow the Display Modules to be in HALT mode as much as possible, the Shelf Node processor to run at low speed most of the time, and have the receiver/transmitter in the Shelf Node off most of the time and allow address request and echo of data sent with acknowledge and low battery information included.

Every five minutes, the Data Manager will send out a command that tells the Shelf Nodes what will happen during the next five minutes. The Shelf Node is responsible for turning on its receiver just before this transmission and, depending on the information received, going back to sleep until the next message, or prepare to receive information that will be passed on to the Display Modules. If a Shelf Node wakes up between transmissions, it will receive information on when the next transmission will occur.

Each bus cycle is split into 6 windows. The following is the order of the windows for each cycle on the bus:

Window 1—Sync/Info
Window 2—Transmission Data
Window 3—Request
Window 4—Repeat Transmission Data
Window 5—(blank)
Window 6—Echo The Sync/Info is a window for the Data Manager to put all of the overhead information related to conserving battery life in the Shelf Nodes. This includes information on when the nodes turn on and off their receivers, sync information, etc. When there is no information being broadcast to the modules, this is the only window that will have any transmission from the Ceiling Node, the data windows will be left blank.

The Transmission Data is a packet that contains the bits that should be passed through to the Display Modules by the Shelf Node. Since 24 bits of information in this packet are sent through to the modules, the bus cycle time should be 24 bit times of the modules, which is 5.86 ms.

The Request Window is a space for a Shelf Node that is not currently active to insert a Display Module sequence assignment request. Since a request is 80 bits long and each transmission contains 24 bits, it will take four transmissions. A fifth transmission will be a packet containing the Shelf Node address.

The Repeat Transmission Data is a repeat of the Transmission Data. The Shelf Node reads it if the first transmission is missed or fails the checksum test.

The Echo is a window that the Shelf Node uses to transmit the bits that were on the Display Module bus when the previous Transmission Data was output, so any message that a module inserts on the module bus is transmitted. This leaves all of the deciphering of acknowledges and some requests to the other side of the RF.

Figure 8:
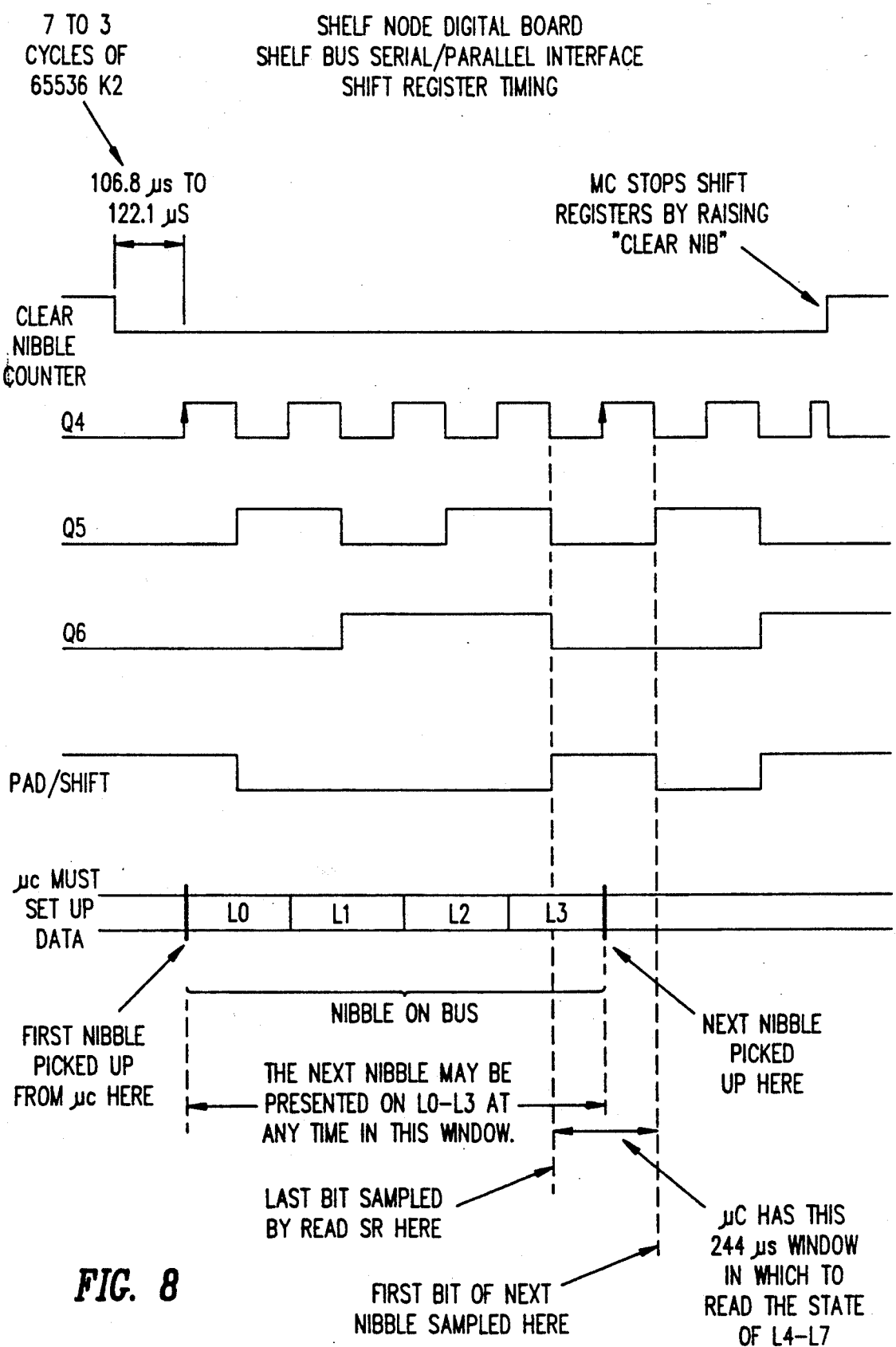
FIG. 8 is a timing diagram for the shelf node digital board.
Figure 9A:
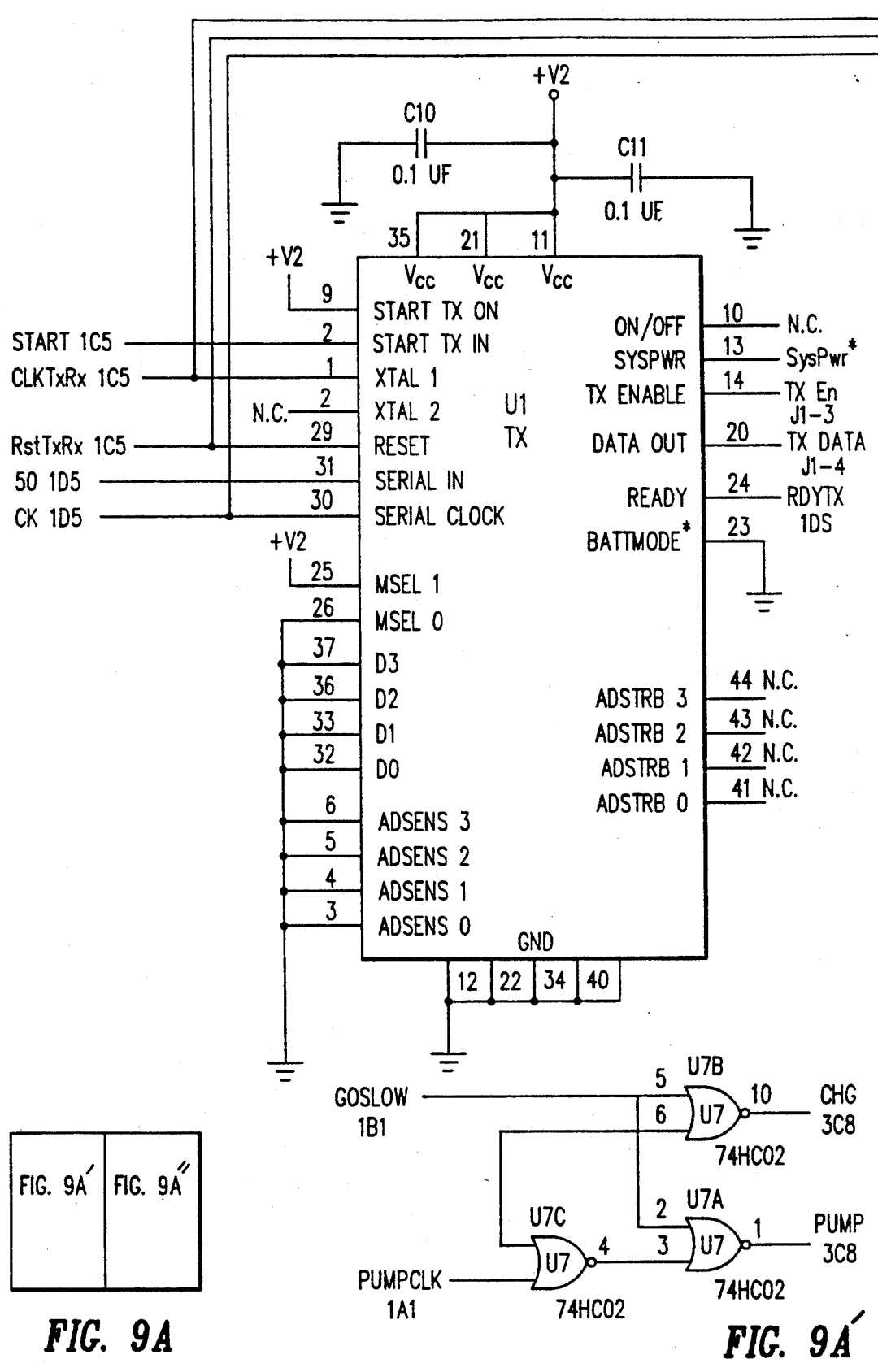
FIGS. 9A, 9B, 9C' and 9C are schematics for the shelf node.
Figure 9B:
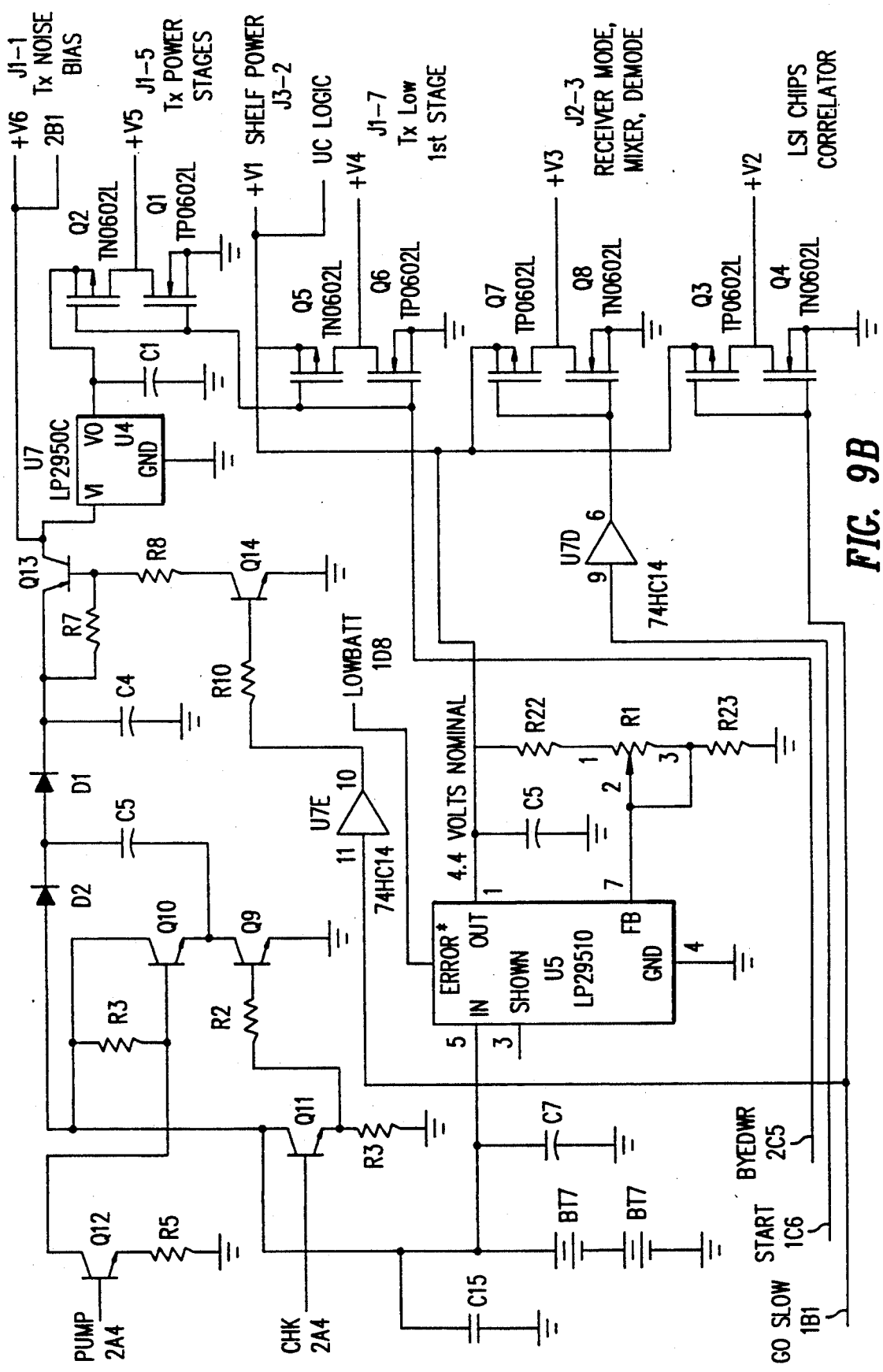
Figure 9C:
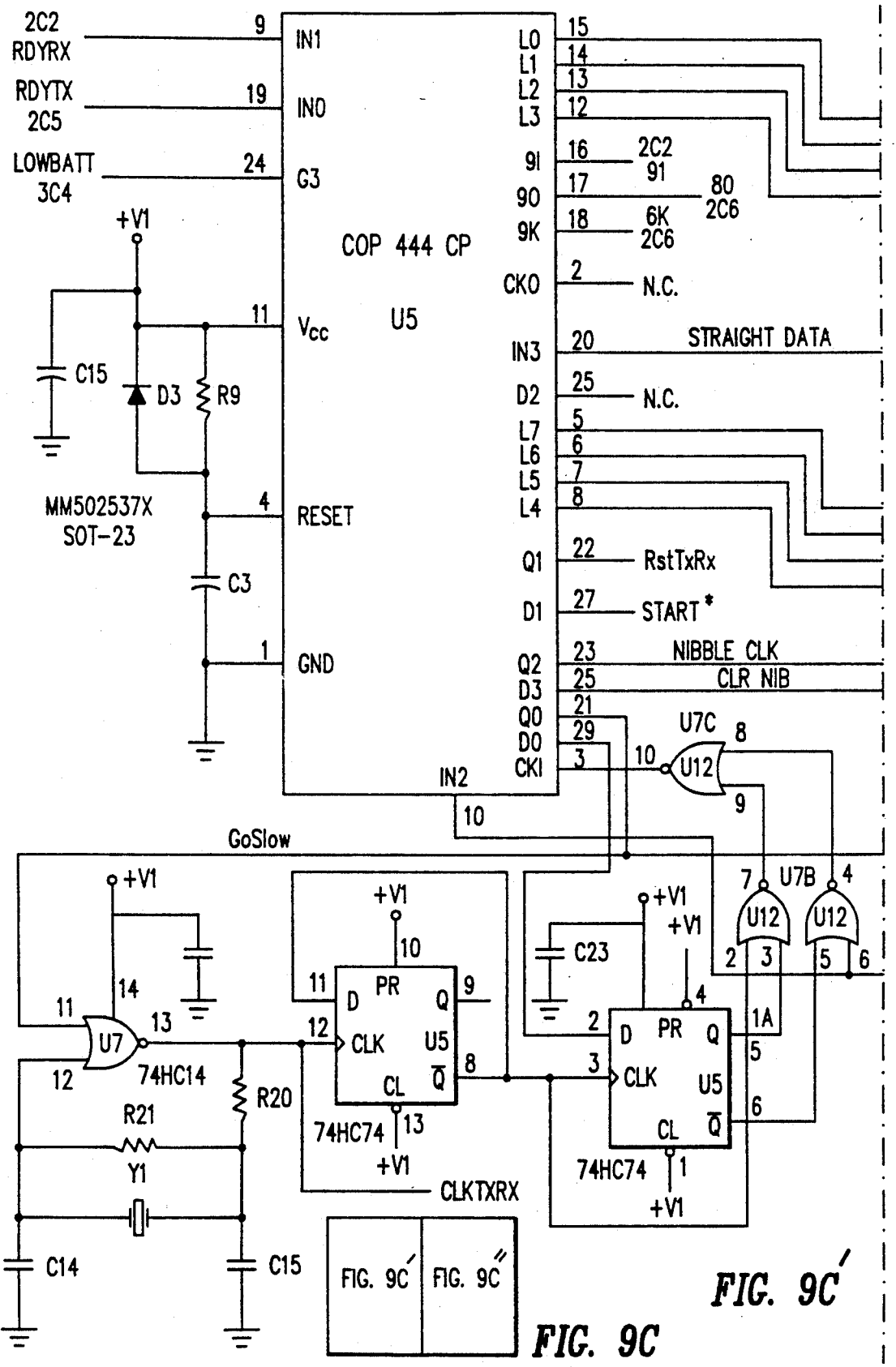

In order to allow for the different types of transmissions occurring, the first nibble of each packet will be a header. The last nibble in the packet will be used as a checksum, allowing for some error checking. This allows 24 bits of information to be contained in each 32 bit spread spectrum packet. FIG. 8 shows a timing diagram for the Shelf Node.

Some of the packets require an address while others are meant to be listened to by all of the Shelf Nodes. The Shelf Node handles each type of packet and which ones have addresses.

The address is four nibbles long and consists of 2 nibbles for Group address, and two nibbles for Node address. In order to guarantee that an entire group will be transmitted to in five minutes, the number of nodes per group will be limited to 128. In a normal store with 20,000 displays, six displays per shelf, only 26 groups would be expected. These specifications are illustrative and not limiting.

The separation of the address into Group and Node allows for a packet to be addressed to a group. If the Node address is zero then all nodes in the Group are addressed. If the Node and Group addresses are zero, then all of the shelves are addressed.

In general, the Shelf Node operates in three states: Sleep, Standby, and Active. The following is a general outline of the states.

In the Sleep state, the processor will be running at slow speed with the receiver and transmitter powered down. When an internal timer times out, the processor will speed up, power up the receiver, and receive information on what will occur in the next time block. Normally it will wake up every five minutes, but this can be decided by the Data Manager. When the node (i.e., Shelf Node) powers up, it will either receive sync information, or actual information on what will occur next. If the node is included in the transmissions that will occur in the next five minutes, it will calculate the time of its transmission and at that time it will change to the Standby state. There is also another way to get out of the Sleep state. If the module bus becomes active with a module request, the processor will transmit out the request in the Request window and then switch to the Standby state.

In the Standby state, the processor will be running at full speed with the receiver powered up. It will be constantly reading the Sync/Info window for an addressed command to enter either the Sleep or the Active state.

When a node reaches the Active state from Standby, the node will read the Transmission Data window only and pass these bits on to the Display Modules. In the Echo window, the node will put the data that was transmitted on the module bus last, containing the acknowledges and possibly a request mixed in. The node will leave the Active state when a command is issued in the Transmission Data window telling the node to drop back to Standby, or to go to Sleep. It is imperative that only one node be in this state at any time.

Any time that the Sync/Info window is not being used for some other message, synchronization information will be there. This information is broadcast to tell the Shelf Nodes when to listen for explicit information. Most of the time, all of the nodes in a store will wake up every five minutes at the same time and listen for explicit information on what will occur during the next five minutes. If a node falls out of sync with the broadcasts, then it will quickly be able to re-synchronize. The following is the format of the message:

Nibble 0—Header 0000 (0)
Nibble 1—Least Significant Time
Nibble 2—Time
Nibble 3—Time
Nibble 4—Most Significant Time
Nibble 5—
Nibble 6—
Nibble 7—Checksum The four time nibbles will be the number of 1/16ths of a second the Shelf Node should sleep for.

The Activate command is transmitted in the Sync/Info window and is used to make a Shelf Node that is in the Standby state change to the Active state. The command is formatted as follows:

Nibble 0—Header 0001 (1)
Nibble 1—Group #
Nibble 2—Group #
Nibble 3—Node #
Nibble 4—Node #
Nibble 5—
Nibble 6—
Nibble 7—Checksum It is the responsibility of the Data Manager to make sure that the last Active node is no longer in the Active state when this command is issued.

When the Data Manager knows that it is finished transmitting to an individual shelf in the Standby state, a command is sent to immediately shut down the receiver and drop into low power mode. The following is the format of the packet:

Nibble 0—Header 0010 (2)
Nibble 1—Group #
Nibble 2—Group #
Nibble 3—Node #
Nibble 4—Node #
Nibble 5—
Nibble 6—
Nibble 7—Checksum When a Shelf Node receives this command, it will read the next Synchronization packet to set its timer and fall into the Sleep state. Sleep commands could also be directed towards groups or every shelf.

The Node Assignment packet is placed in the Sync/Info window in response to a Node Assignment Request defined below. The following is the packet format:

Nibble 0—Header 0011 (3)
Nibble 1—Group #
Nibble 2—Group #
Nibble 3—Node #
Nibble 4—Node #
Nibble 5—1st tag digit
Nibble 6—2nd tag digit
Nibble 7—Checksum This command also has the effect of putting the node into the Active state. The Data Manager should delay entering the new Shelf Node into the database until there is some evidence that the node received its address.

When a Shelf Node receives a Group Wake Up that matches its own group, it calculates a time to go into the Standby state based on the time that is contained in the packet and its node number. The following is the format of the packet:

Nibble 0—Header 0100 (4)
Nibble 1—Group #
Nibble 2—Group #
Nibble 3—Node #
Nibble 4—Node #
Nibble 5—Rx time
Nibble 6—Rx time
Nibble 7—Checksum Nibbles 5 and 6 are used to indicate how long each shelf should be on, in 1/16ths of a second, so each individual Shelf Node can calculate the time of its broadcast by multiplying that number by its node address. Generally, for a group, the time should be 2.25 seconds in order to leave plenty of time for retries. The node # will be zero.

When the Individual wake up command is given, the Shelf Nodes listen until either they read their address or until the list is done. Only the modules in the list are transmitted to in the next five minutes. The following is the format of the packet:

Nibble 0—Header 0101 (5)
Nibble 1—Group #
Nibble 2—Group #
Nibble 3—Node #
Nibble 4—Node #
Nibble 5—Rx time
Nibble 6—Rx time
Nibble 7—Checksum The individual Shelf Node will listen to each packet, adding the time to its internal timer until it heard its address. When the list is completed, each Shelf Node that was included in the list uses the calculated sum to schedule when it will wake up. This adds some flexibility to the system, but it burdens the Data Manager with some scheduling. It is important that this method not be used too often because every Shelf Node must listen to the entire list.

The Emergency wake up command is used when a power outage has occurred and the whole store needs to be updated quickly, or for show purposes. The following is the format of the packet:

Nibble 0—Header 0110 (6)
Nibble 1—Group #
Nibble 2—Group #
Nibble 3—Node #
Nibble 4—Node #
Nibble 5—
Nibble 6—
Nibble 7—Checksum The middle six nibbles are really unused. This command puts all addressed nodes into the active state, causing the battery life to be shortened. Normally the address would be zero in order to wake up the whole store. This method should not be used at all under normal circumstances.

Data that will be sent to the Display Modules will be in the Transmission Data window in the following format:

Nibble 0—Header 1000 (8)
Nibble 1—Bits
Nibble 2—Bits
Nibble 3—Bits

Nibble 4—Bits
Nibble 5—Bits
Nibble 6—Bits
Nibble 7—Checksum

The bits are the bits that will be sent out to the Display Modules. They are formatted in 5 bit nibbles and then compressed into the packet so that each packet contains 4.8 module nibbles.

Repeat Transmission Data is a repeat of the Transmission Data that has a different header and is placed in the Repeat Transmission Data window. It is in the following format:

Nibble 0—Header 1001 (9)
Nibble 1—Bits
Nibble 2—Bits
Nibble 3—Bits
Nibble 4—Bits
Nibble 5—Bits
Nibble 6—Bits
Nibble 7—Checksum The End of Transmission packet is placed in the Transmission Data and Repeat windows and tells the Shelf Node to drop out of the Active state. It is in the following format:

Nibble 0—Header 1010 (A)
Nibble 1—(Destination)
Nibble 2—
Nibble 3—
Nibble 4—
Nibble 5—
Nibble 6—
Nibble 7—Checksum When an active Shelf Node receives this packet instead of the Transmission Data, it will drop into the Standby state. The second nibble could be used to give a destination, either Standby or Sleep states.

The Echo Data packet is placed in the Echo window. When a Shelf Node receives 24 bits, it clocks them out to the modules and also reads back the same 24 bits. The bits that are read are sent up in this packet. The following is the packet format:

Nibble 0—Header 1011 (B) or 1100 (C) if battery is low
Nibble 1—Bits
Nibble 2—Bits
Nibble 3—Bits
Nibble 4—Bits
Nibble 5—Bits
Nibble 6—Bits
Nibble 7—Checksum The header will contain the battery status.

When the Shelf Node is in the Sleep. or Standby states, and a Display Module sends out a request, the bits are passed in the Request Window in this format:

Nibble 0—Header 1101 (D)
Nibble 1—Bits
Nibble 2—Bits
Nibble 3—Bits
Nibble 4—Bits
Nibble 5—Bits
Nibble 6—Bits
Nibble 7—Checksum It should take 4 packets to send the entire request. In addition, a Node ID packet is sent up at the end of the 4 Module Requests.

The Node ID packet is the fifth packet of a Module Request. It identifies the source of the request so the Data Manager can properly handle it. The following is the format:

Nibble 0—Header 1110 (E)
Nibble 1—Group #
Nibble 2—Group #
Nibble 3—Node #
Nibble 4—Node #
Nibble 5—1st tag digit
Nibble 6—2nd tag digit
Nibble 7—Checksum If a node has no address when a request is sent up, the address is zero and the tag digits are random digits from somewhere used to identify the Node Assignment when it comes.

When converting from the Spread Spectrum packets to the module bus, there is some overhead involved. Since the module bus-on a Shelf Node is idle most of the time, it is necessary to start any transmission to a shelf with 93.9 ms of bus noise in order to guarantee that all of the modules on a shelf are awake. This equates to 16 24-bit packets that must be sent to wake up all of the modules. If there are n module bus cycles of information to be sent to the shelf, at 355 bits/cycle and 24 bits/packet, (n * 355)/24 packets must be sent. In addition, another extra packet is needed to get all of the echo data back, one for some extra time to decide if the last acknowledge was received, and one to shut off the shelf node. So:

$$\text{number of packets} = 19 + (n * 355)/24$$

In general, if x different images are to be sent to a particular shelf, then n=x+2. This is not the case if the data cannot be fully interleaved, and it is necessary to place dummy data on the bus to pad it out.

For example, if one image needs to be sent to one shelf node, then the number of bus cycles is n=3, so there need to be 64 Spread Spectrum packets. Since a packet is sent every 5.86 ms, the total time for this particular shelf is 0.375 seconds. Similarly, if one image is sent to each of 12 modules on a shelf, then n=14, the number of packets is 227, which will take 1.33 seconds.

If the Data Manager were disabled for a long period of time and all of the display modules blanked their displays, when the Data Manager came back on line, it would be sufficient to send one image to every module in the store in order to bring them back to life.

If each shelf were scheduled with individual wake ups, and assuming that each shelf has an average of six modules, then 0.81 seconds would be needed for each shelf. Leaving a little extra room for retries and giving 1 second per shelf, and assuming an average of 3333 shelves per store (20,000 modules, 6 modules/shelf), the entire store can be back to normal in 1 hour. If the average number of modules per shelf is higher, this time decreases.

For a change in price, individual wake ups would be used. In one five minute window, it is desirable to update as many modules as possible. If three images need to be sent to each module that needs a price change, and each module is on a separate shelf, then 14 module bus cycles per module would be needed, which is 227 packets, 1.33 seconds. If about 1.5 seconds are allowed per shelf, then one could expect to update as many as 198 modules in a five minute period. Performance would increase substantially if there were more than one module on each shelf.

It may be desirable to refresh all of the important images in a module occasionally. The preferred method for this is to wake up a particular group. Up to 2.25 seconds could be allotted for each shelf in the group, enough time to refresh six modules. If there was not enough time in the first five minutes, the same group could again be called. So it is possible to occasionally perform this function without sacrifice of the battery life.

FIGS. 9A, 9B, 9C and 9D show the Shelf Node circuitry schematically. FIG. 10 shows an I/O map for the Shelf Node controller.

The shelf node controller preferably is a COP 424 micro controller. Port L is used as four bits out and four bits in. Ports L0 to L3 are outputs for parallel-to-serial conversion by HC195. Data is then driven on the shelf bus. Ports L4 to L7 are inputs, from another HC195 which samples the bus during the middle of each bit time, and accumulates a nibble of bus activity which the processor then reports to a ceiling node. The processor tristates Port L each time it reads ports L4 and L7. The serial (microwire) interface is used for communication with the transmitter and receiver chips.

Ceiling Node Operation

Figure 11A:
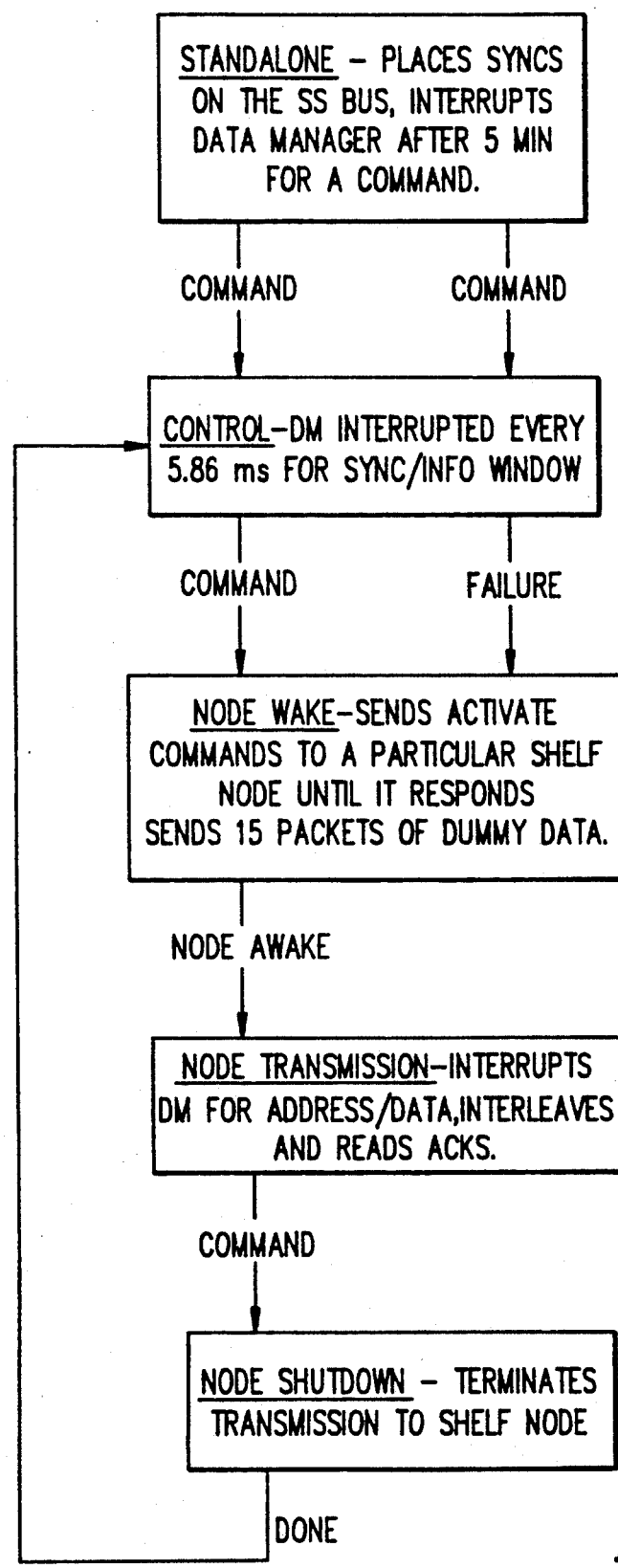
FIG. 11A shows the Ceiling Node functions.

One of the functions of the Ceiling Node (see FIG. 11a) is to act as a buffer between the Data Manager and the Spread Spectrum RF communications. Its functions include: interrupting the Data Manager when information is needed, formatting the address and data information in a format similar to the Display Module bus format, segmenting this format into 24-bit packages to be broadcast, receiving the echo from the Shelf Nodes and extracting the acknowledgements, relaying synchronization information to the Shelf Nodes, and receiving requests from the Shelf Nodes.

There are provided two 8-bit parallel ports with handshaking lines, one for each direction, that provide the communication link to the Data Manager. Any communication between the Ceiling Node and the Data Manager is initiated by the Ceiling Node interrupting the Data Manager with a byte that defines what is to occur. There are only six such commands. A well defined exchange of data then occurs.

The Ceiling Node operates in five modes: Standalone, Control, Node Wake, Node Transmission, and Node Shutdown. The following is a description of the operation in each of these modes.

Figure 12A:
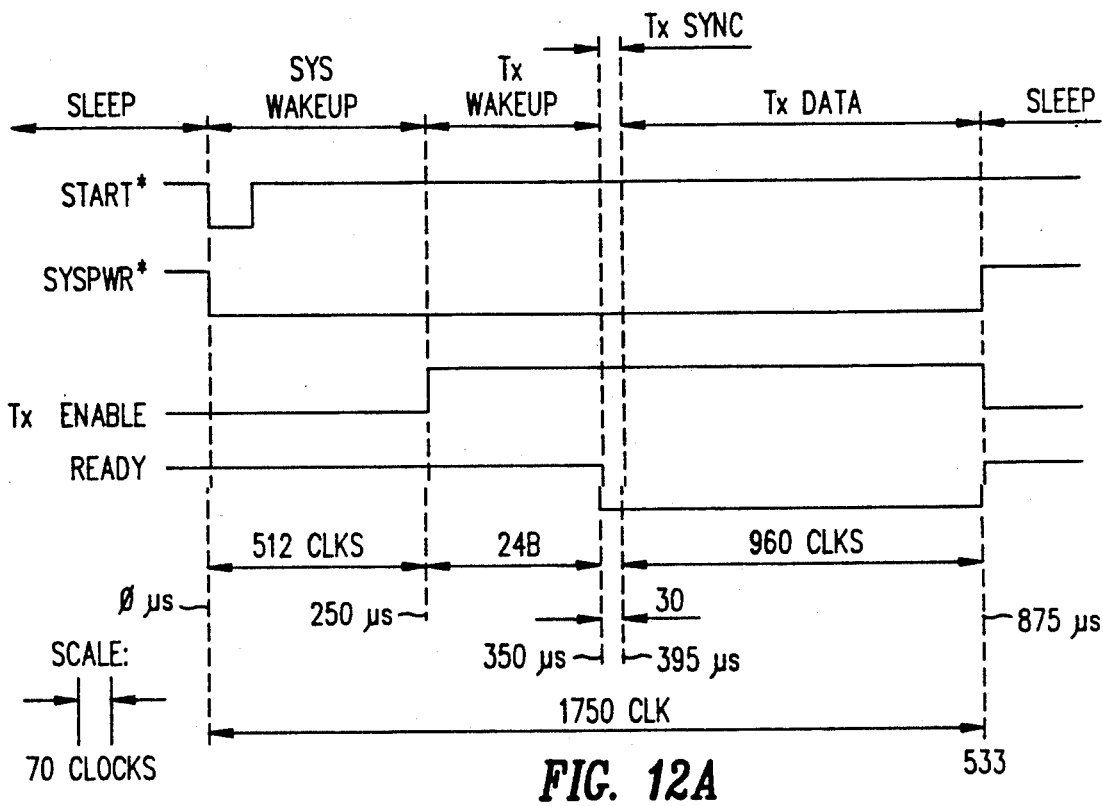
FIGS. 12A and 12B are timing diagrams for the Ceiling Node.
Figure 12B:
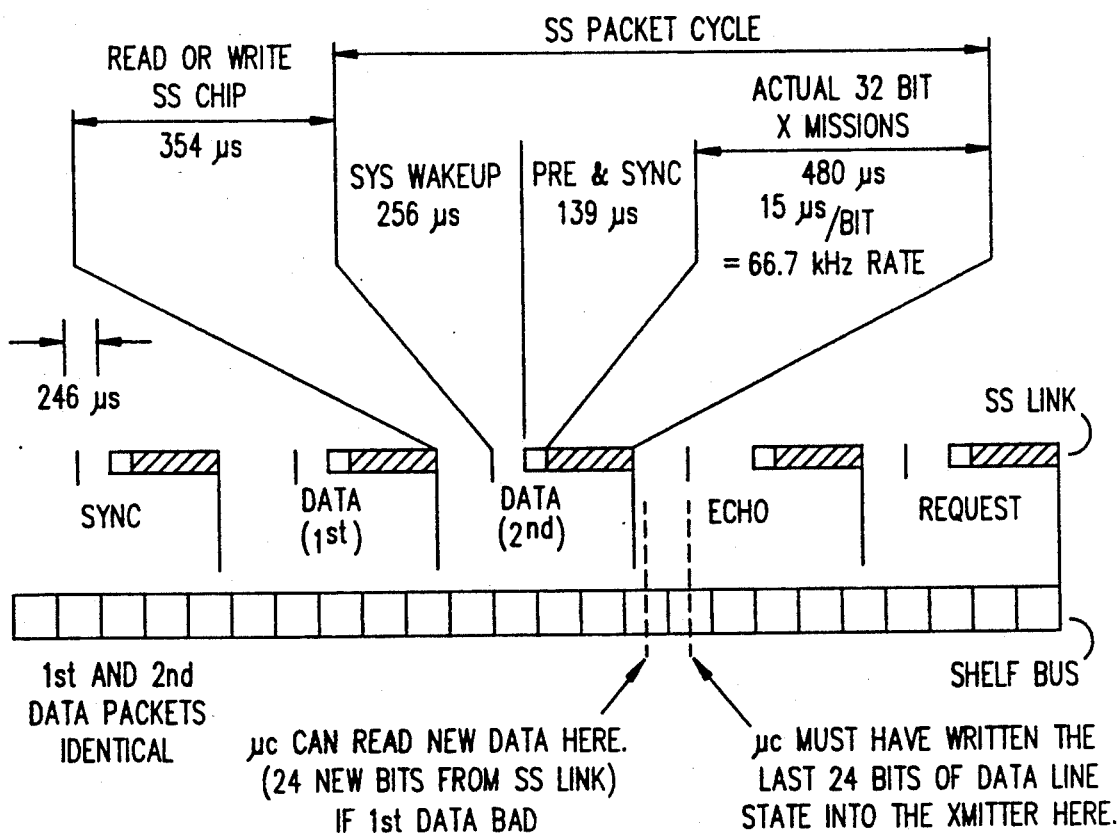
Figure 13A:
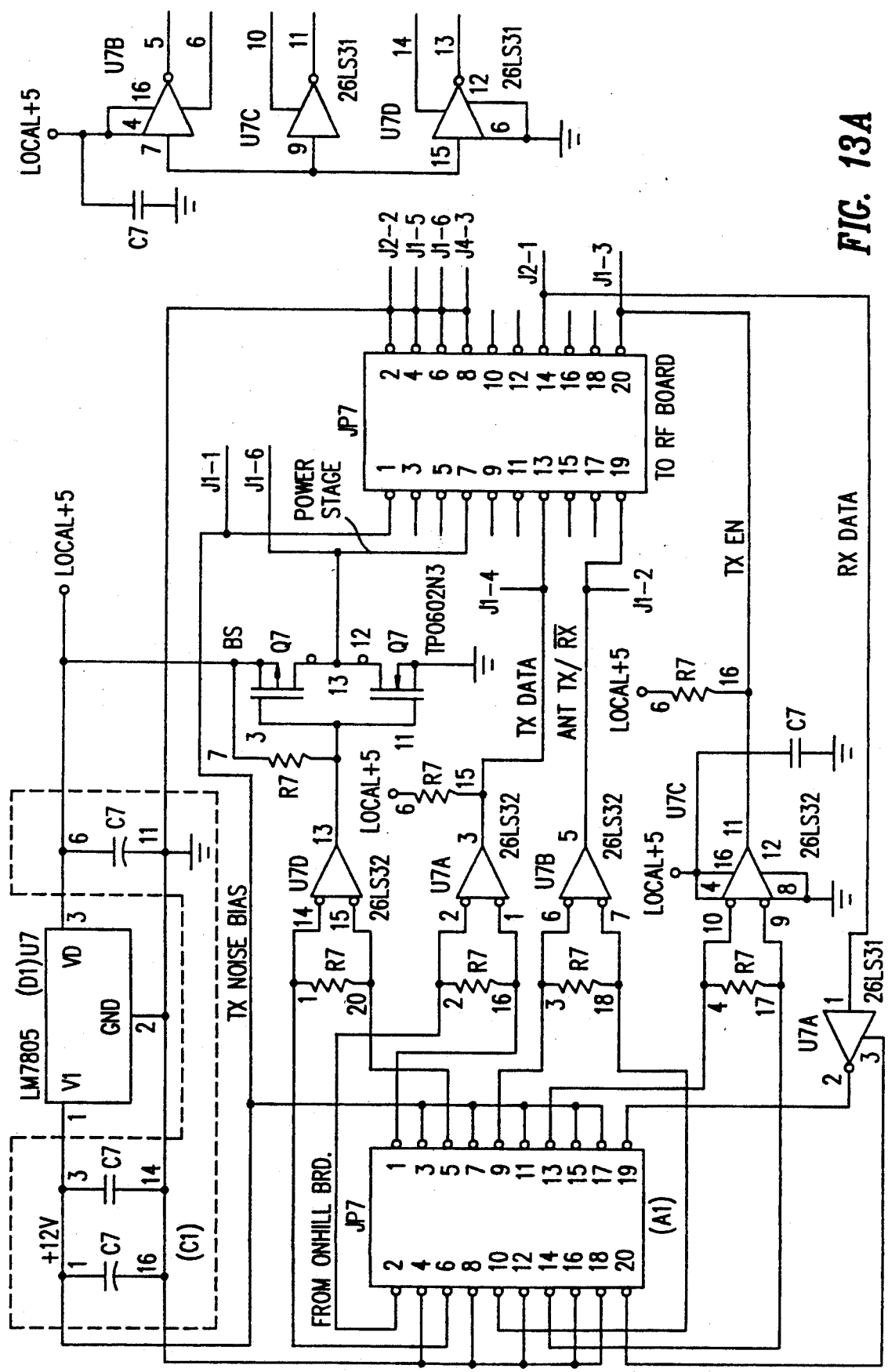
Figure 13B:
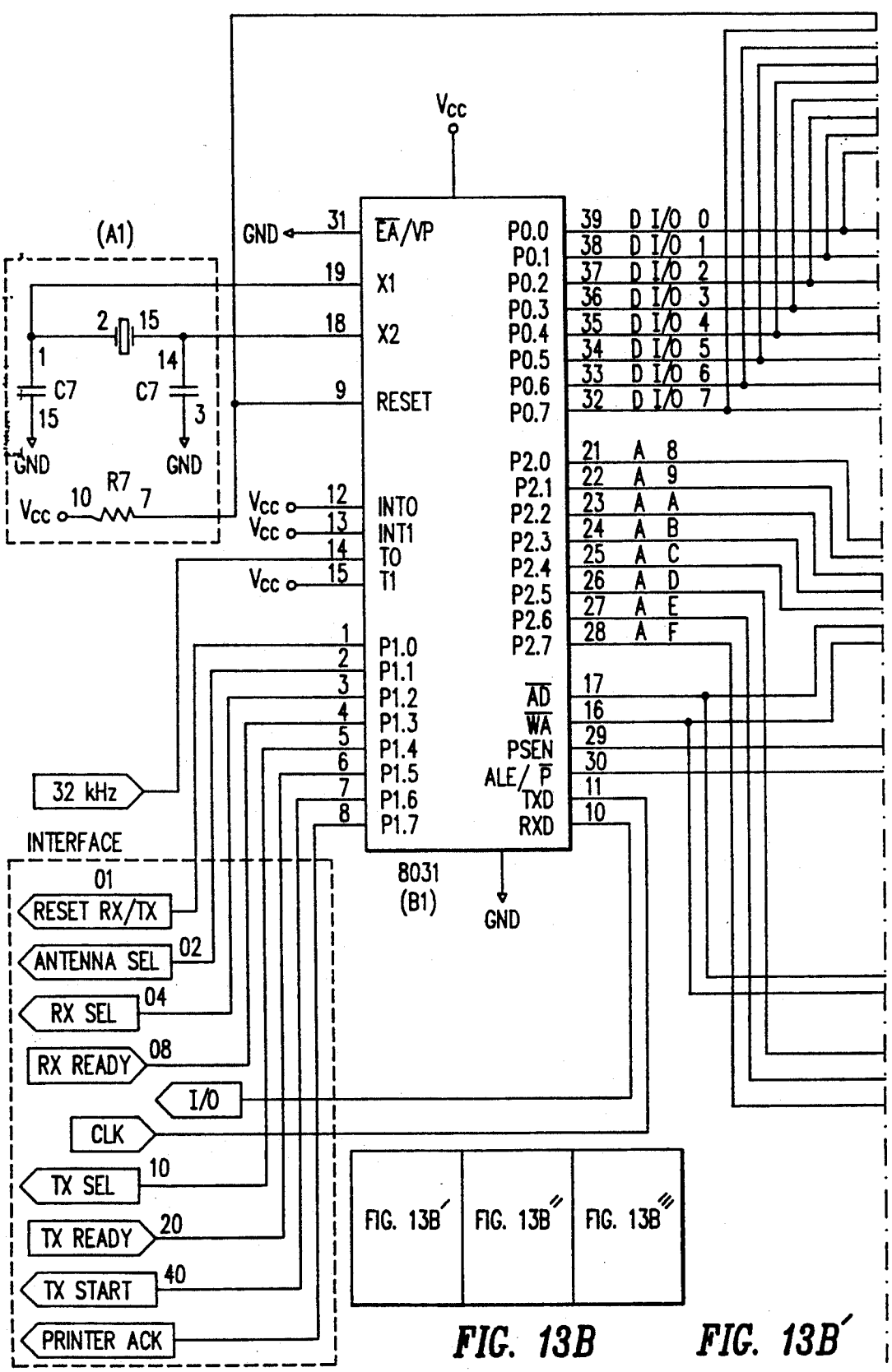
Figure 13B:
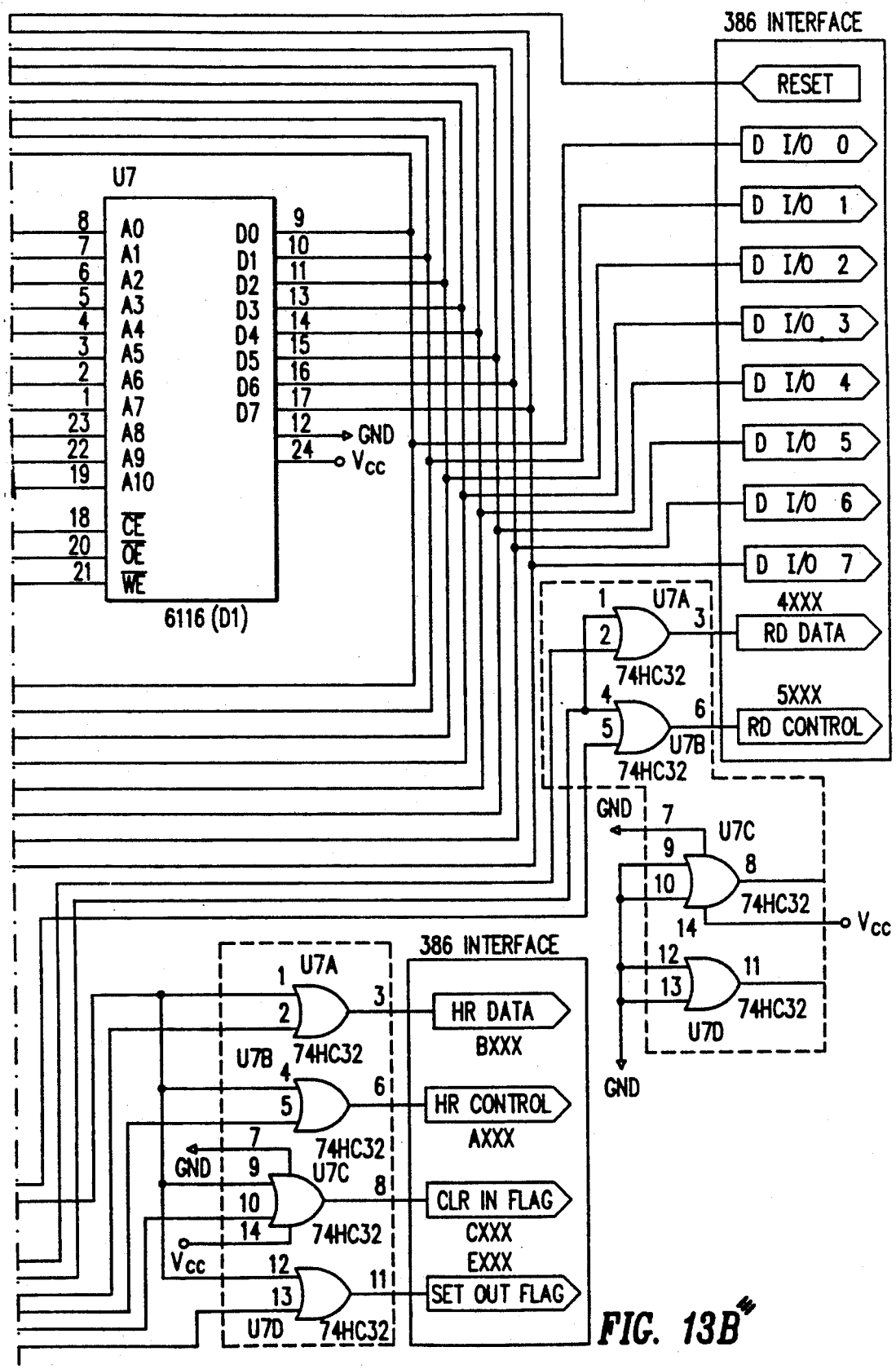
Figure 13D:
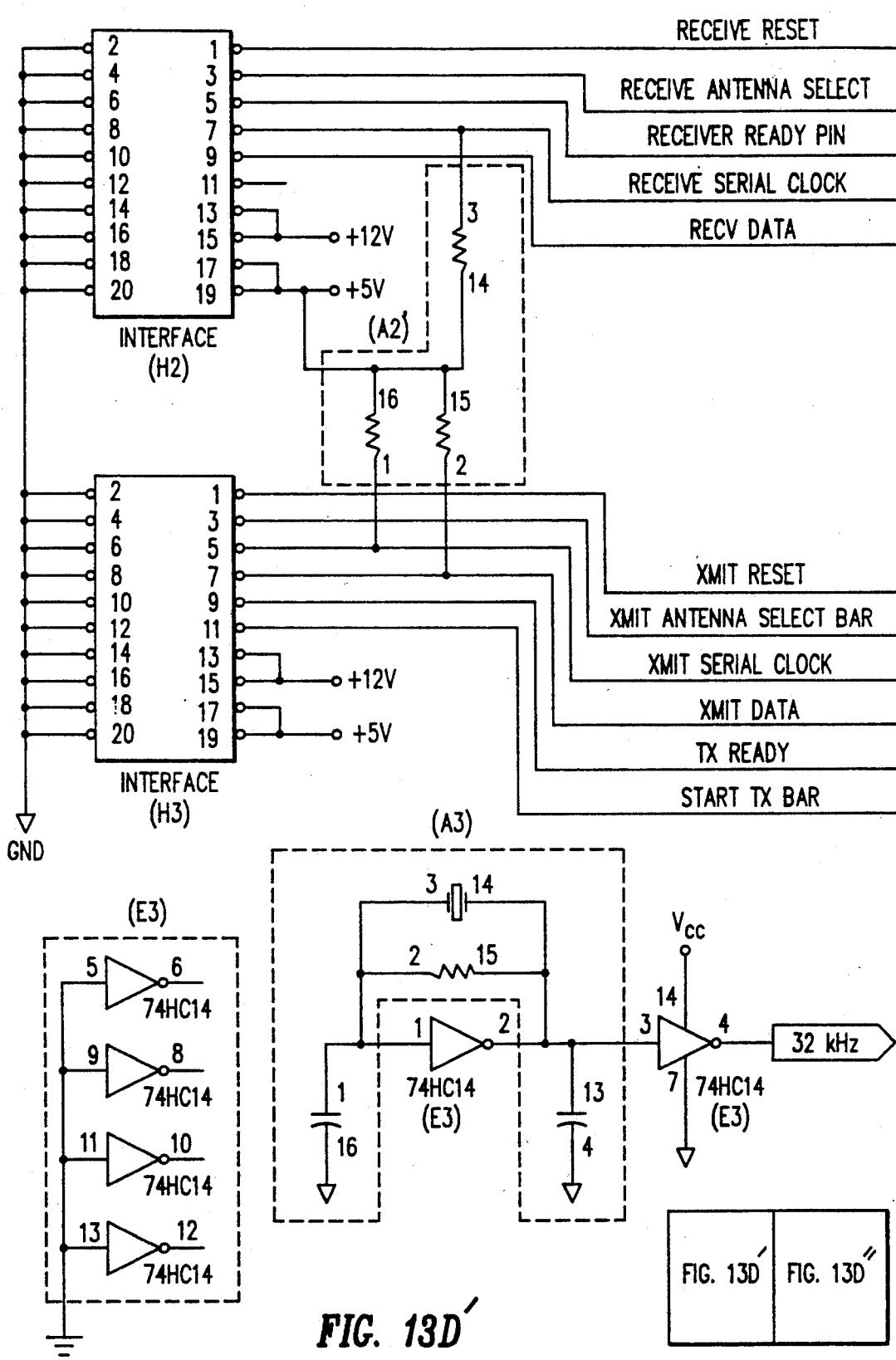
Figure 13E:
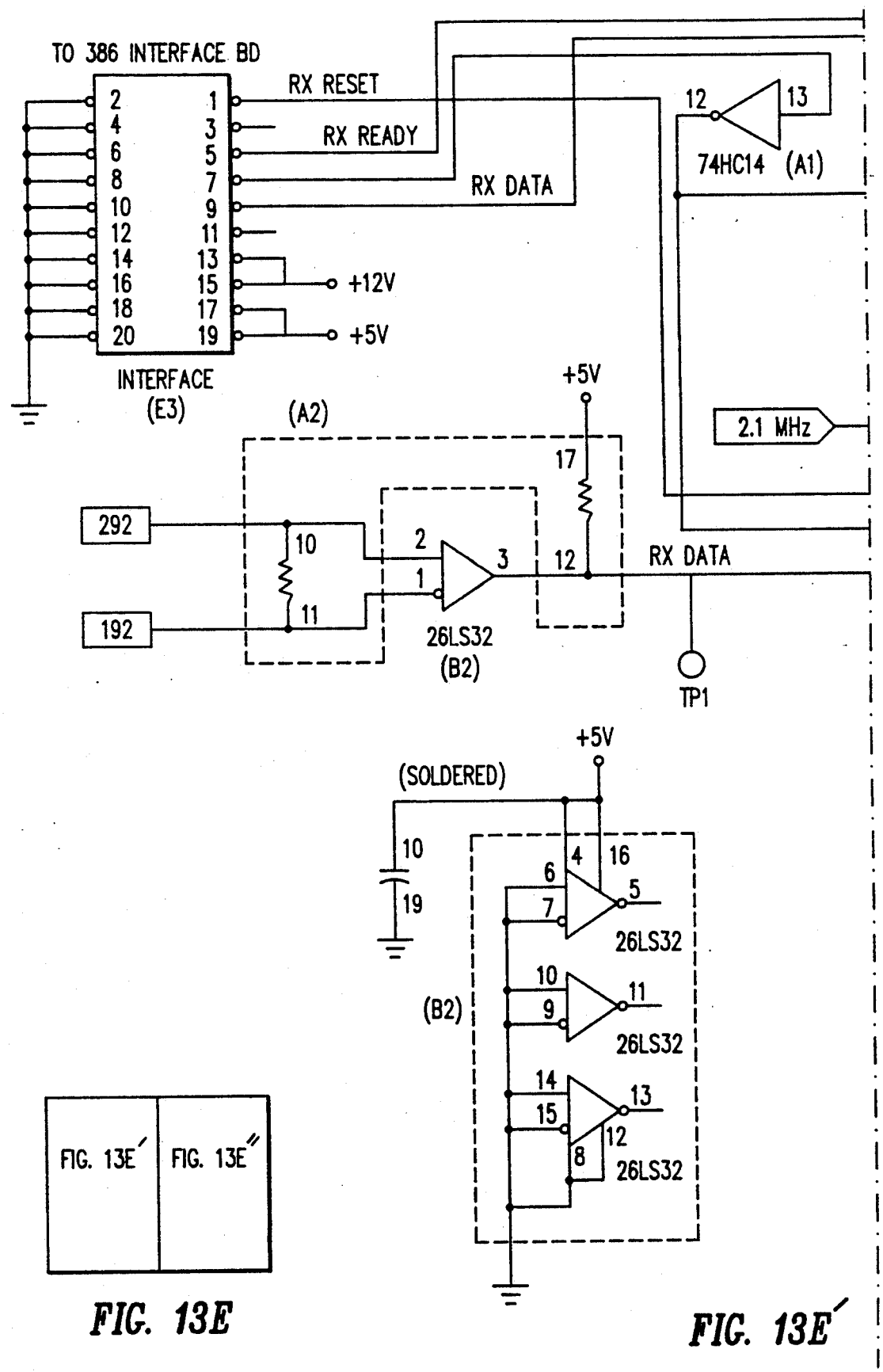
Figure 13F:
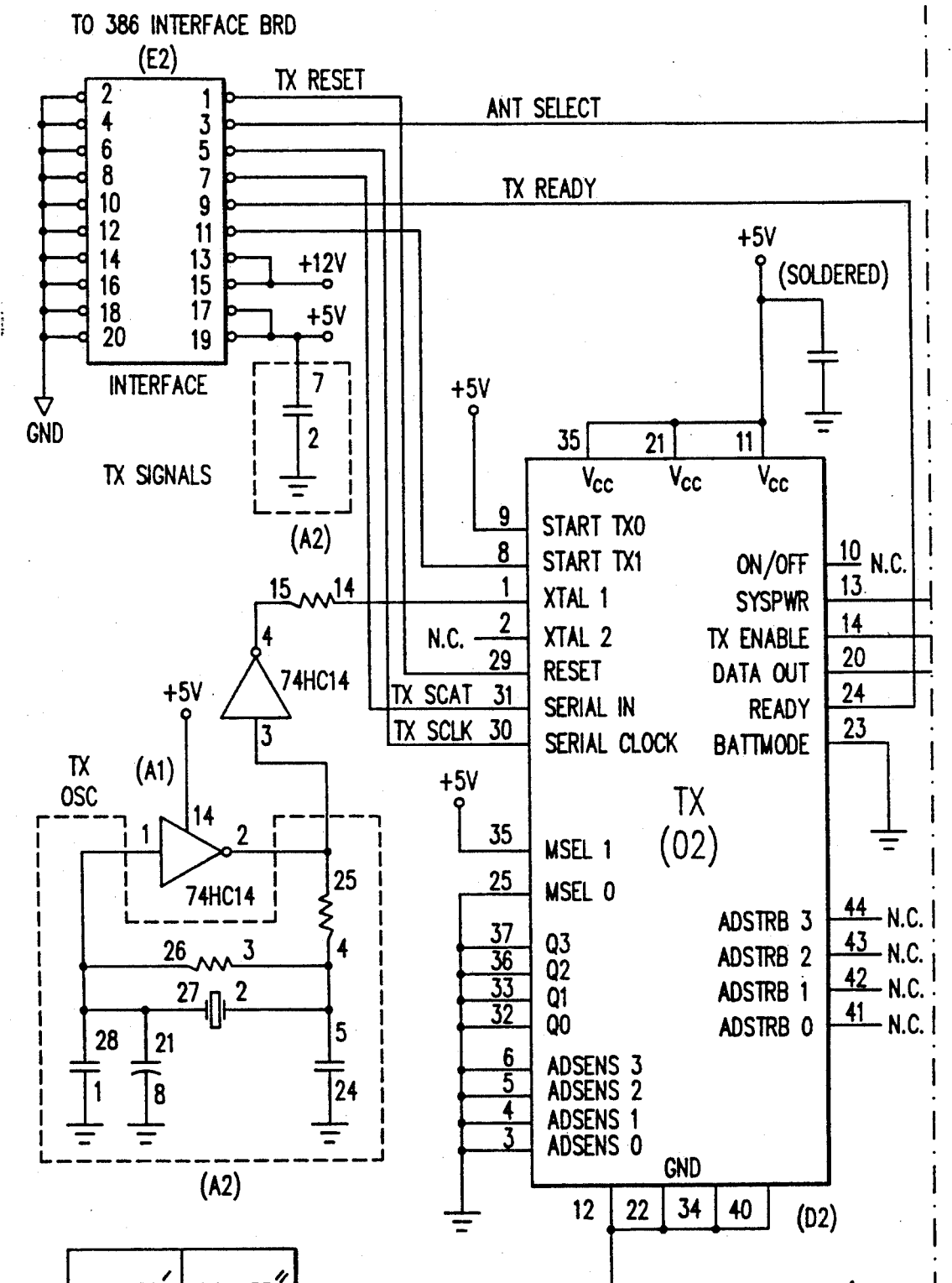
Figure 13G:
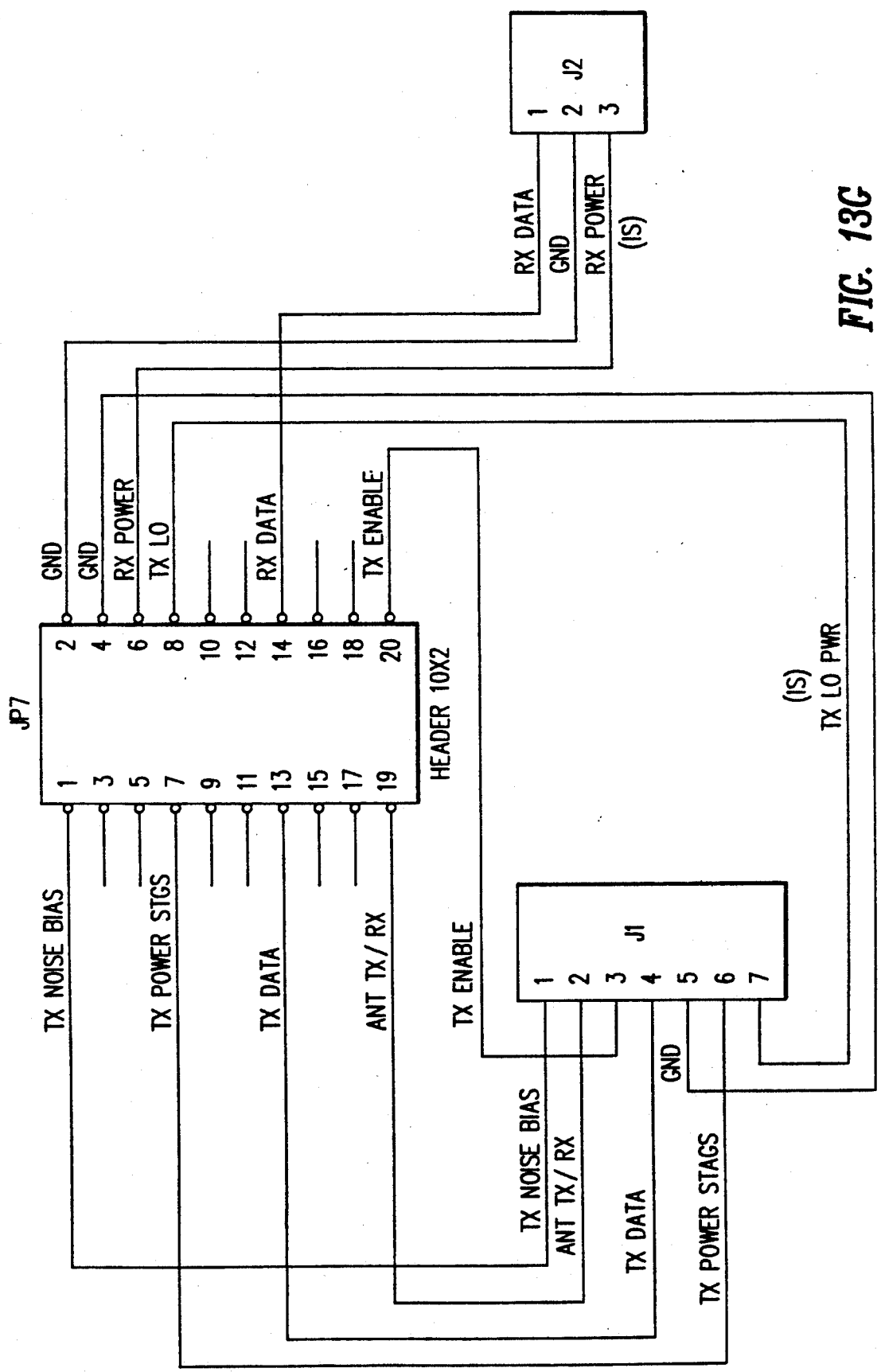

In the Standalone mode, the Ceiling Node will put synchronization information in all of the Info/Sync windows, and nothing in the Data windows. If a request is received, the Data Manager will be interrupted and the Control mode will be entered. At the end of each 5-minute period, the Data Manager is also interrupted, and the Data Manager will issue a command to either stay in the Standalone mode, or pass into the Control mode. Timing diagrams for the Ceiling Node are shown in FIGS. 12A, 12B, 12C.

In the Control Mode, the Data Manager is interrupted for every Sync/Info window. The Data Manager can directly put a command in the window, or drop back into the Standalone mode. Some of the commands, such as Activate Node, or Node Assignment, will cause the Ceiling Node to pass into the Node Wake mode.

In the Node Wake mode, Activate commands are sent to a particular Shelf Node with noise in the Data until an echo is received, then 15 more packets of noise Data are sent, after which the Node Transmission mode is entered. If the Shelf Node does not wake after several attempts, the Control mode is entered.

In the Node Transmission mode, the Data Manager will be interrupted about every 86 ms for a new address and data, and again shortly after to give the acknowledge from the n-3 data. A direct command will cause the Node Shutdown mode to be entered.

The Node Shutdown mode is the simplest mode. It simply causes the current Shelf Node to go to sleep and then passes back control to the Control mode.

The following is a description of the protocol for the exchange of information between the Ceiling Node and the Data Manager. Generally, the Ceiling Node gives the Data Manager one or more bytes, and then the Data Manager responds with zero or more bytes.

00

5 Minute Wake Up—This command is given by the Ceiling Node when a 5 minute interval is beginning and the Shelf Nodes are all listening. The Data Manager can respond as follows:

00

No Action—Tells the Ceiling Node to stay in the Standalone mode for another five minutes 01

Go To Control—Tells Ceiling Node to drop into the Control mode. The Data Manager must then send commands as it it was interrupted by the control mode.

01 (lowcount) (highcount)

Control—In this mode the Celing Node interrupts the Data Manager every 5.86 ms and gives the count, which is the number of packets until time zero. The Ceiling Node expects one of the following responses:

00

Standby—Tells the Ceiling Node to fill Info/Sync window with Sync information.

01 (Group#) (Node#) (blank)

Activate Node—Ceiling Node will transmit Activate packets until Node responds for 15 cycles, then the Node Transmission mode is entered, or on failure, back to control mode.

02 (Group#) (Node#) (blank)

Node Sleep—this command causes the Ceiling Node to issue a Sleep command that will put a Shelf Node that is currently in the standby state to sleep.

03 (Group#) (Node#) (Tags)

Node Assignment—Ceiling Node will transmit a Node Assignment until node responds for 15 cycles, then the Node Transmission mode is entered, or on failure, back to control. Dummy transmission data is sent with this packet as well as with the Activate Node. The Tags are the same as in the Request.

04 (Group#) (Node#) (Rxtime)

Group Wake—Ceiling Node will transmit Group Wake Up packet.

05 (Group#) (Node#) (Rxtime)

Wake—Ceiling Node will transmit Individual Wake—Ceiling node will transmit Individual Wake Up packet 06 (Group#) (Node#) (blank)

Emergency Wake—Ceiling Node will issue Emergency Wake Up packet 07 00

Go To Standalone—the 07 causes the Ceiling Node to fall into Standalone Mode, the following 00 is actually the No Action command seen at the 5 Minute Wake Up.

02 (lowcount) (highcount)

Address/Data—The Ceiling Node is requesting address and data information to be transmitted to a Shelf Node that is currently responding. The Ceiling Node is now in Node Transmission Mode. Interrupts of this sort will occur about every 86.9 ms in this mode. The time count is relayed to the Data Manager as above.

00

Dummy Data—The Ceiling Node will generate fake address and data to be transmitted on the bus.

01 (upc1) (upc2) (upc3) (upc4) (upc5) (upc6) (upc7) (upc8) (data1) (data2) (data3) (data4) (data5) (data6) (data7) (data8) (data9) (data10) (data11)

Real Data—This information will be separated and transmitted interleaved on the bus.

4 03 (status

Ack/No Ack—When the n-3 acknowledge is received or not, the Data Manager gets this interrupt. The status is as follows:

00—Ack ok, Battery ok
01—Ack ok, Battery not ok
02—Ack not ok, Battery ok
03—Ack not ok, Battery not ok The Data Manager then issues one of the following commands:

00

Continue Operation—This directs the Ceiling Node to continue transmission to the Shelf Node.

01

Cease Operation—This directs the Ceiling Node to drop into the Node Shutdown mode, where it will shut the node down and switch back to Control mode.

04 (Group#) (Node#) (Tag) (upc1) (upc2) (upc3) (upc4) (upc5) (upc6) (upc7) (upc8)

Request—Ceiling Node gives all of this information to the Data Manager. If group and node is zero, then Shelf Node needs assignment.

05 (Version

Reset—This relays to the Data Manager that the Ceiling Node has been reset. The Version refers to the transmission scheme version (this is #1) so that if there are changes in the future, both the Ceiling Node and the Data Manager must implement those changes.

FIG. 11B shows a block diagram of the ceiling node transceiver.

FIGS. 13A to 13G depict schematically the Ceiling Node circuitry.

Smart Wand

Figure 14:
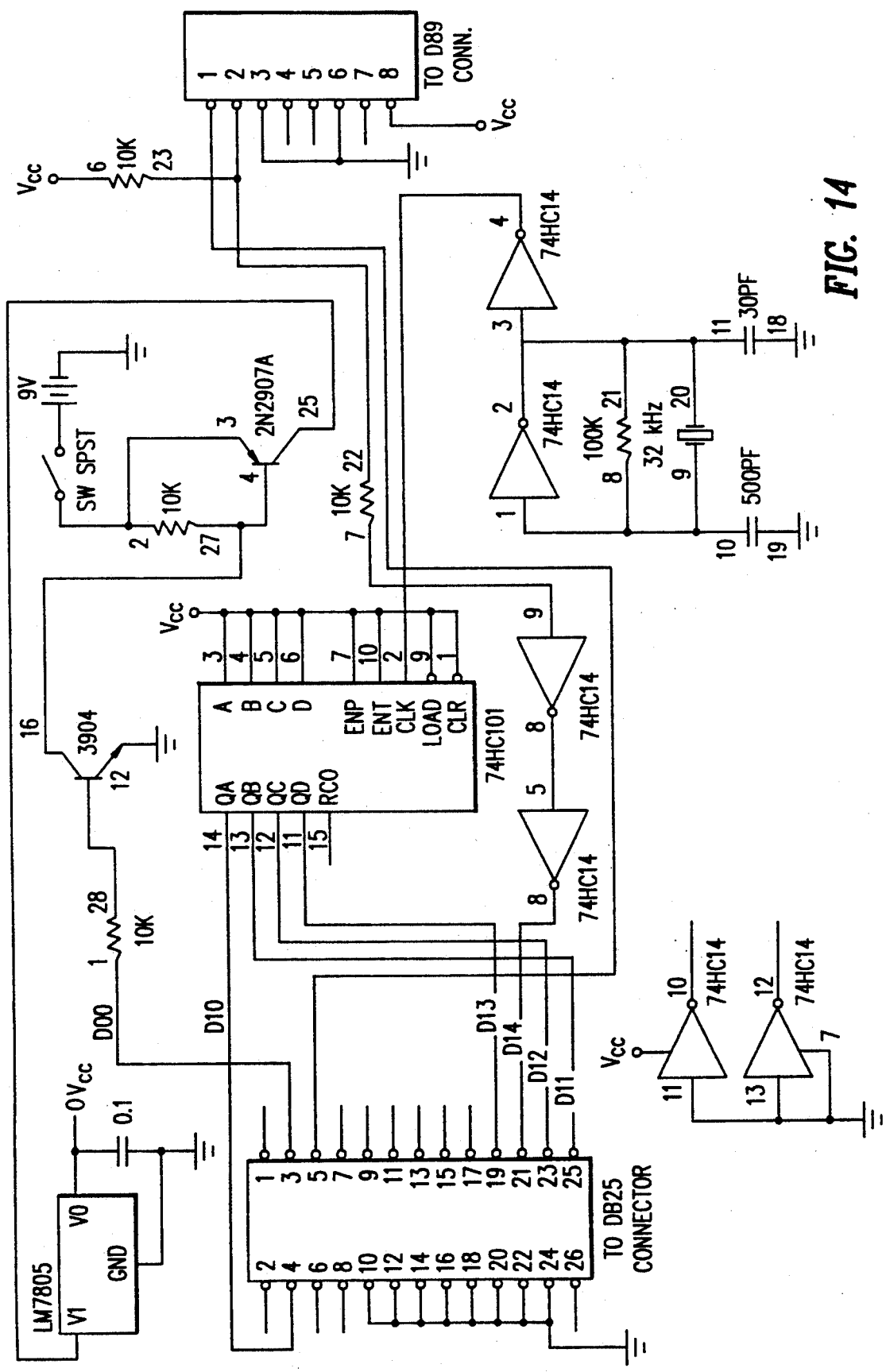
FIG. 14 shows schematically the smart wand.
Figure 15A:
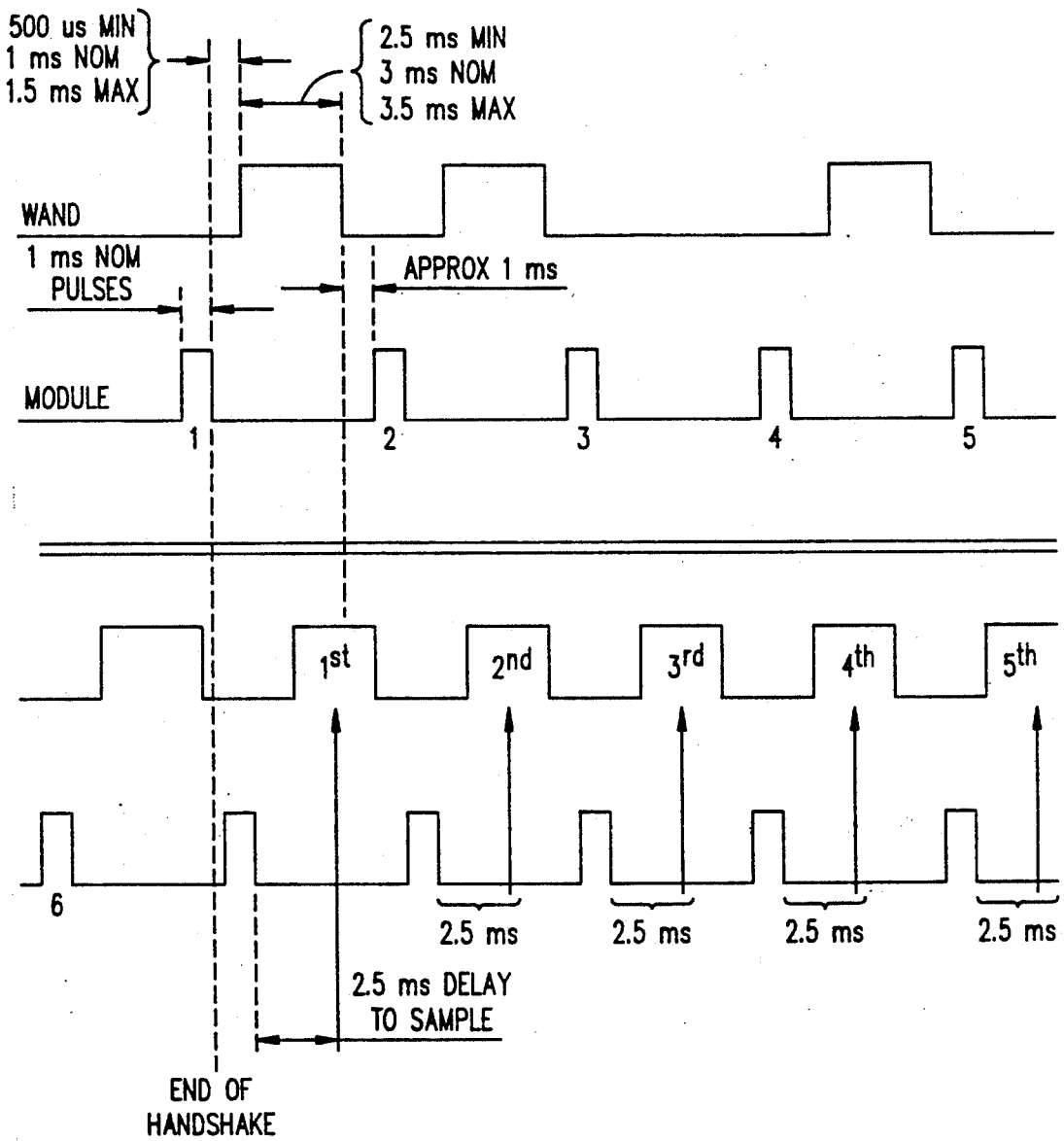
FIG. 15A and 15B show timing diagrams for the smart want.
Figure 15B:
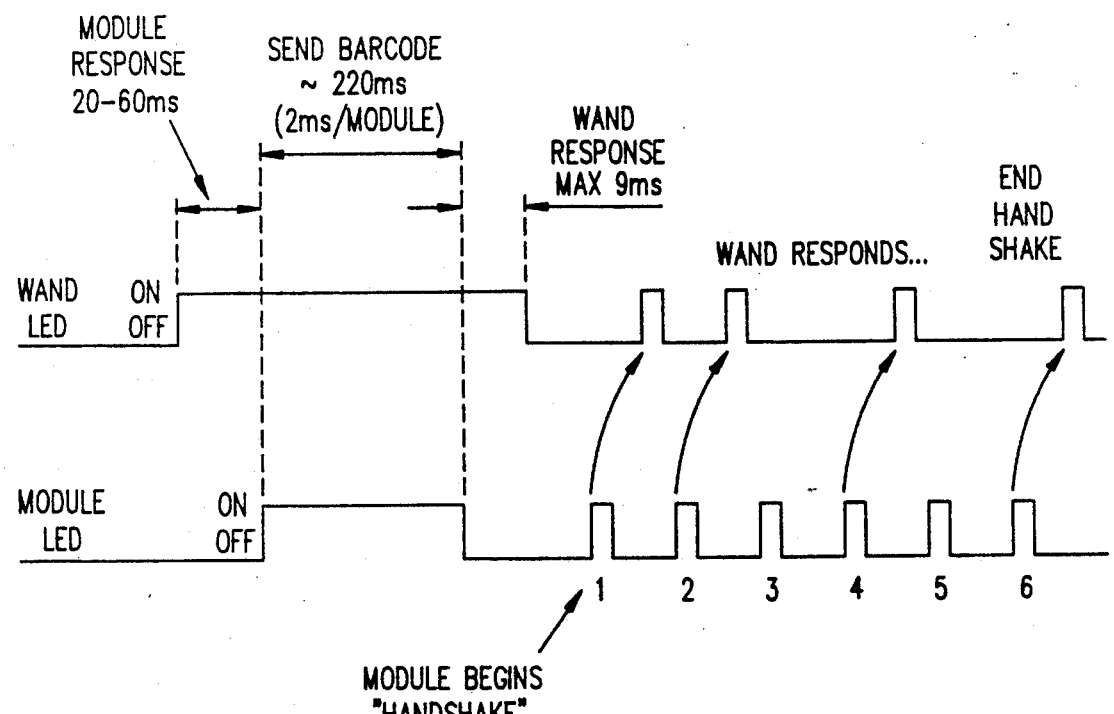

The smart wand operates as described above, in conjunction with preferably a specially programmed handheld data terminal (the Data Reader). The smart wand is shown schematically in FIG. 14. Associated timing diagrams are in FIGS. 15A and 15B.

Module Controller Software

The following describes by subroutines the Module Controller Software which resides in the Data Manager computer.

PL.PRJ

Contains necessary tie in to conventional Borland Graphics program. Note that EGAVGA.xxx must be available for the software to run.

PL.C

This is the main loop for the program and it includes.

Initialize loop:
 CONSOLE
 REFRESH
 ASSIGN
 PRINTER
 GATEWAY
close

Initialize

This consists of

--- creating certain files if they don't exist (Item.Dat, UI.Ndx,)
call to start_Ceiling() to initialize the background hardware interrupts

---

GATEWAY.C

This allows the module controller to get information from the Gateway Computer.

--- a timeout of GatewayException ( 5 minutes )
 or Module finished shipping a structure
 Initiate transmission to Module Controller to
  start Excp run in posilink.
 Look for response,
 Accept response,
 insert response into databases
  Module Changes.Lst
  Item.Dat
  for newly discovered items, UI.Ndx or specific time of day for GatewayItem
 Initiate transmission to Module Controller to
  start Item run in posilink
 Look for response
 insert response into databases
  Module Changes.Lst
  Item.Dat
  for newly discovered items, UI.Ndx

---

Note that access to update the record is only available if the database is not already open, that is console is in main menu.

PLPRINTER

This contains the routine to take any file named "PR.Buf" and send it character at a time to the printer.

It will not start until PrinterBufferEmpty flag is not 'Y'.

Once the job is done, the PrinterBufferEmpty flag is set to 'Y'.

The status of this system is visible on the Condition Screen.

PLMODULE: MODULE REFRESH

This function waits for the hardware to request another structure. If it waits over 10 minutes, reinitialize the system (Start_Ceiling()). The test is Ready_For_Data() 1 is ready, 0 is standby.

A further test is a call to Ceiling_OK(), 1 is OK, 0 calls for another Start_Ceiling() and branch back to wait for Ready_For_Data().

This opens the Group.Ndx and Image.Dat files. A structure is created in RAM for use by the hardware interrupt routines to send the refresh message to the Shelf Nodes and Display Modules. A call to Queue_Data( . . . ) starts the process.

The system then waits for Data_Ready(). This is to be followed by Unqueue_Data() which returns pointer to structure containing the response from the Shelf Node. Any failure information is written up by a call to Note_Problem (PLProblem).

PLMODULE: MODULE ASSIGN

This function regularly calls Request_Ready() til 1, which indicates that a module has requested an assignment.

Unqueue_Request() returns UPC and Shelf Node, ready for translation.

Assign_SeqNum(ItemNum, Group, Node) is called. If the Shelf Node itself is new, (Group & Node both 0) it is assigned the next address. In either case a new record is set aside in the Image.Dat file to keep the Image.

The new image record is then filled in using Item.Dat information.

Insert_Assignment() is called with a structure to program the module.

Wait for Assignment_Ready(). When ready (1), Unqueue Assignment() returns the data, or a NULL for retry Then This opens Item.Dat and UI.Ndx.

This opens the Group.Ndx and Image.Dat files. A structure is created in RAM for use by the hardware interrupt routines to send the assignment message to the Shelf Nodes and Display Modules. Any failure information is written up by a call to Note_Problem (PLProblem).

PLCONSOLE

This is the main human interface point.

The main menu allows the following choices:

Condition Screen

Item File Menu

This contains many of the routines to handle the file Item.Dat and its index UI.Ndx. The data in the file is added chronologically, but kept indexed by UPC Code. Most routines access the Item file using a binary chop on the index.

Specific functions on the Item Screen:

See Item

This allows the entry of a UPC code and the display of the Item.Dat file information on the product on the screen. Additional UPC codes may be entered to get subsequent displays.

Edit Item

This allows the entry of a UPC code and the line by line editing of the Item.Dat file information on the product. Each completed edit sends the control back to the menu.

Add Item

This allows the entry of a UPC code and then the entry of the data for it, if it does not exist.

Delete Item

This allows the entry of a UPC code, a look at the data in Item.Dat, and the option of deleting the record from the UI.Ndx file. This is done by setting the record number in UI.Ndx to 0xffff.

Back to Menu

Base Item File Menu

This will allow the entry of a UPC Code and relating it to another UPC Code for the same product. In the case of a "Cents Off" label, the module is to display the regular price.

It also allows editing and listing those relations.

Stock File Menu

This will allow the entry of a UPC Code and relating it to a Stock Number for the same product.

Report Menu

This allows choosing a report to run.

Options from the Report Screen include:

Item List

This reports all products in UPC order.

Transmission Sequence List

This reports all modules in the order of the Refresh transmission, that is, by Group, Shelf Node, then each module in the order they were assigned.

Since consistent order, except for the ones which fail and need replacement, the order will follow a pattern which a person can move through the store.

Low Battery List

This reports all Display.Modules (in the order of the Refresh transmission) which have given a low battery signal. The first Display Module on the Shelf Node is the key, but all other Display Modules on the Shelf Node will be listed too, to make it easy to find the Shelf Node.

see PLProblem, where the LowBattery_List function resides, see PLRefresh, which calls Note_Problem (PLProblem) whenever a low battery flag is spotted.

Retry Needed List

This report is the same as the Low Battery list except it reports Display Modules with communication problems of any severity, from occasional missed transmissions, to totally lost communications.

Failed to Answer List

This report is the same as the Retry Needed List except that it reports only Display Modules which have failed at least once.

Shelf Changes List

Any shelf change: new Display Module, lost Display Module

Item Changes List

This report contains a record of all recent changes to any record in the Item file.

Back to Menu

HouseKeeping Menu

This group of functions allow some configuration and cleanup of the system at various times under operator control.

Show Mode

This mode allows all Shelf Nodes to stand ready to accept input It consumes significant battery power, so it will not be used in practice. (On_Show())

This mode may be turned off with a call to Off_Show

Exception Scanning Time

This is the period between enabling the Gateway to compare the Excp records accessible thru Posilink with the Item.Dat records.

The number is rounded to the nearest multiple of refresh cycles. The number is decremented when Ready_Data has returned a 1 or when a 5.5 minute timer (Refresh #2 ) has timed out indicating that the full. It may be started only started just after a Queue_Data has sent a new task to the hardware, or after a timeout.

It uses timer 4.

Item Scanning Time

This allows edit of the number of days, and the time of day for the start of the Gateway Item process.

TStamp=1989-04-12 23:45, we pick out the 23:45 for a match

Lost Module Clearing

This allows the option of simply clearing all lost Display Modules, that is a Display Module which has failed to communicate for eight passes.

Another option is to display all Display Modules, active and dead, for a UPC code and ask for clear or continue on each which has failed to communicate over eight times. The Display Modules would be presented in group order with other Display Modules on the same Shelf Node also being visible.

Low Battery Restart

This clears the Low Battery counters to 0, assuming that most with problems have been given new batteries.

Comm Problem Restart

This clears the Lost Comm and Comm Problem counters, typically after a report. The result is to allow retry after problems are fixed.

Quit

This instruction will not always be available without a password, and will shortly require a confirm. It kills the whole system.

PLSTRUCT

This contains all of the definitions of the Global variables and notes on local variables and notes on files to be used.

PLSCREEN & PLMOUSE

This file contains all of the routines for managing the screen in graphics mode, accepting characters, and mouse inputs.

Gateway Computer

The store Gateway Computer 54 (see FIG. 1) is the interface between all of the parts of the system: the Regional Computer 46 (i.e., Host Computer) (a mainframe), the POS Controller 50, and the PriceLink Display Module Controller 42.

Other capabilities include managing all Regional Computer to POS Controller communication. It also manages communication for other in-store computers, such as in the Pharmacy.

The gateway function is provided due to the lack of information on the Datachecker POS communication standard. The available software takes full control of the system which will need to be updated to a real time protocol before it can be integrated into the PriceLink Module Controller Software.

In an alternative embodiment, the functions of the Gateway Computer 54 are integrated into the PriceLink Module Controller 42.

The four functions of the Gateway Computer are as follows:

The POS Controller is queried during the Exception226 activity and during the ItemVerify activity. In each case the request is sent to the POS Controller then the answer is received, translated, then retransmitted to the Module Controller.

The Host Computer is queried during the UnitPrice activity. Requests are transmitted to it, and answers are received back from it.

The communication is over a Bell 201 compatible modem such as modems 46B, 46C.

The timing of the Exception226 activity and the ItemVerify activity is determined in the Module Controller. When a cycle is desired, a message is sent to the Gateway Computer, the Gateway Computer gathers the desired information, then later the results are transmitted back to the Module Controller.

The timing for UnitPrice activity is determined in the Module Controller. When a cycle is desired, a message is sent to the Gateway computer, the Gateway computer displays its "modem switching" needs and waits for the keystroke to signify the line has been switched, then retrieves the desired data, then the results are transmitted back to the Module Controller.

The activities of the Gateway Computer may be both monitored and controlled through the keyboard and display on the computer. Any of the functions which could be started on command from the Module Controller may be started from the console.

Any price changes made in the store by the Data Management Computer or by the Host Computer will result in a record being added to the Exception Log with the "226" identifier attached to it. The Module Controller will, at a programmable offset, from the five minute basic timing of the Module Controller's activities, and at a selectable multiple of those basic timing cycles, request an update of the "226" records of the Exception Log.

For now, all the "226" records in the Exception Log will be transmitted every time. It is assumed that this will be a small number, and that redundantly transmitting the same data will not create a timing problem. If it does become a problem, a method of recognizing which records have already been sent will be devised and only new changes will be sent.

The possibility of changes which get around the Exception 226 function is relatively low, but at startup especially cannot be ignored. New items may appear, and old items may have been deleted. For these reasons, a complete transmission of all the records in the POS Controller's Item file is requested by the Gateway Computer at the prompting of the Module Controller. This data will be stripped of irrelevant fields then retransmitted to the Module Controller for use in updating its item records.

The Module Controller may be programmed to request this function be performed at a selectable time of day (i.e., 6:00 AM) separated any number of days (i.e., 1 or 7).

CONSOLE

The Console functions include the following:

The Main Standby screen will display any activity in progress, either from a top level (EXCP226 in progress) or at a more detailed level including full record information. The full display mode may be toggled on or off by pressing "D". This screen will invite the operator to press the space bar to call up a menu: Console Activity Screen.

The Console Activity menu allows the operator to select from the activities which are currently allowed, and from the QUIT which is not recommended.

Selecting "E" will result in calling POSiLink. The control of the computer is then turned over to the POSiLink software and the operator at the console until that activity is terminated. The automatic functions will not be occur until this mode is terminated. Through carelessness, the system could be left unable to perform its regular duties.

Selecting "X" will result in simulating a request from the Module Controller for a Exception 226 activity. The data received and the message formatted for transmission to the Module Controller will go into files instead of to the Module Controller. The operator will need to choose the filename suffixes, the prefixes will be automatic. The information as it is received will be sent to the screen, or not depending on the "D" toggle.

The operator will probably choose a number for the suffix.

The result will be

EXCP226I.xxx for the input from the POS
EXCP226O.xxx for the output to the Module Selecting "I" will result in simulating a request from the Module Controller for an Item Verify activity. The data received and the message formatted for transmission to the Module Controller will go into files instead of to the Module Controller. The operator will need to choose the filename suffixes, the prefixes will be automatic. The information as it is received will be sent to the screen, or not depending on the "D" toggle.

The operator will probably choose a number for the suffix.

The result will be

ITEMVERI.xxx for the input from the POS
ITEMVERO.xxx for the output to the Module Selecting "U" will result in simulating a request from the Module Controller for an Unit Price Verify activity. The data received and the message formatted for transmission to the Module Controller will go into files instead of to the Module Controller. The operator will need to choose the filename suffixes, the prefixes will be automatic. The information as it is received will be sent to the screen, or not depending on the "D" toggle.

The operator will probably choose a number for the suffix.

The result will be

UNITVERI.xxx for the input from the Mainframe
UNITVERO.xxx for the output to the Module When no activity is imminent from the console, the user should press the space bar or "S" to go back to the Standby menu.

Selecting "Alt-Q" is discouraged as it is not the correct choice during normal operation. It will however be useful during debug to get to DOS to look at some of the files generated above.

The Datachecker software package POSiLink will be called from DOS in the following manner:

POSILINK EXCP226.KST

This will cause the loading and executing of POSiLink, followed by the use of "Keystrokes" from the file "EXCP226.KST".

The file "EXCP226.KST" will contain the following:
SET FILE ON
SET PRINT OFF
SET SCREEN OFF
BATCH FROM EXCP226.CMD TO EXCP226.-
    OUT
SET SCREEN ON
EXIT The file "EXCP226.CMD" will contain the following:
/C Manager change of item price
/READ EXCP ( 1 = 226 )

This will cause the POSiLink software to look up any records in the exception log ( EXCP ) with field 1 = 226 ( Manager price change ) and put it into a file named EXCP226.OUT The Datachecker software package POSiLink will be called from DOS in the following manner:

POSILINK ITEMVER.KST

This will cause the loading and executing of POSiLink, followed by the use of "Keystrokes" from the file "ITEMVER.KST".

The file "ITEMVER.KST" will contain the following:
SET FILE ON
SET PRINT OFF
SET SCREEN OFF
BATCH FROM ITEMVER.CMD TO ITEMVER.OUT
SET SCREEN ON
EXIT The file "ITEMVER.CMD" will contain the following:
/C Dump full image of item file
/READ ITEM This will cause the POSiLink software to look up all records in the item file ( ITEM ) and put them into a file named ITEMVER.OUT The commands to perform the unit price activity will be determined in conjunction with the programmers for the mainframe.

EXCEPTION 226 is the data in the file "EXCP226.-OUT" as received from the POSiLink application.

```
struct excp226pos
    {
    char Byte[38];
            /*  0,1         226 or ignore
                2           0 or ignore
                3           0 version A UPC code
                4-15        UPC code
                            4 5 6 7 8 9 10 11 12 13 14 15
                20-21       price for quantity
                32-33       quantity for price
            */
    };
```

PRICE CHANGE is the data in the format sent to the Module controller at the end of an Exception 226 activity.

```
struct excp226
    {
    char ItemNum[13];       /* 12 digit UpC Code incl check  */
    int DealQty;            /* Quantity for Deal Price       */
    int DealPriceCents;     /* Cents for Deal Quantity       */
    }
```

POS ITEM RECORD is the data in the file "ITEMVER.OUT" as received from the POSiLink application.

```
struct itempos
    {
    char ItemPos[105]
        /*  104 bytes
            6           0,2 Pricing Quantity is 1
                        1   Pricing Quantity to follow
            7           0 UPC Version A or ignore
            8-19        UPC code
                        8 9 10 11 12 13 14 15 16 17 18 19
            34-49       Description in ( ASCII - 0×20 )
                        ( page 129 of S18 Vol 2 )
            62-63       Pricing Quantity ( if byte 6 was 1 )
            66-67       Unit Price ( 000.00 = unassigned )
```

ITEM VERIFY RECORD is the data in the format sent to the Module Controller at the end of an Item Verify activity.

```
struct item
    {
    char ItemNum[13];       /* 12 digit UPC Code incl check  */
    char Descr[31];         /* 30 digits or characters       */
    int DealQty;            /* Quantity for Deal Price       */
    int DealPriceCents;     /* Cents for Deal Quantity       */
```

UNITS RECORD is the data in the file "UNITS.-OUT" as received from the Regional Computer after the Unit Price Activity.

(Pick a format providing any subset of the following you have handy in whatever format you can describe to the bit level, possibly fixed field length ASCII or EBCDIC.)

```
struct unithost
{
    char ItemNum[13];          /* 12 digit UPC Code incl
                                  check                          */
    char DeptNum[5];           /* 4 digit or characters          */
    char Descr[31];            /* 30 digits or characters        */
    char UnitOfMeasure[3];     /* 2 characters from list         */
    int UnitsPer100;           /* Units of Measure per count
                                  with decimal fixed             */
    int Facings;               /* digit                          */
    int HorizTenths;           /* Tenths of inches               */
    int VertTenths;            /*                                */
    int DeepTenths;            /*                                */
};
```

UNITS VERIFY RECORD is the data in the format sent to the Module Controller at the end of a Unit Price Activity.

```
struct units
{
    char ItemNum[13];          /* 12 digit UPC Code incl
                                  check                          */
    char DeptNum[5];           /* 4 digit or characters          */
    char Descr[31];            /* 30 digits or characters        */
    char UnitOfMeasure[3];     /* 2 characters from list         */
    int Unitsper100;           /* Units of Measure per count
                                  with decimal fixed             */
    int Facings;               /* digit                          */
    int HorizTenths;           /* Tenths of inches               */
    int VertTenths;            /*                                */
    int DeepTenths;            */                                */
}
```

MODULE CONTROLLER ITEM RECORD is the format of the data in the item file store in the Module Controller.

```
struct item
{
    int lock;                  /* 00-99 reserved                 */
    char ItemNum[13];          /* 12 digit UPC Code incl
                                  check                          */
    char DeptNum[5];           /* 4 digit or characters          */
    char Descr[31];            /* 30 digits or characters        */
    char Location[5];          /* 05-L typical                   */
    char ShelfGroup;           /* 00 - 7F ( automatic )          */
    char ShelfNum;             /* 00 - FF ( automatic )          */
    char UnitOfMeasure[3];     /* 2 characters from list         */
    int UnitsPer100;           /* Units of Measure per count
                                  with decimal fixed             */
    int DealQty;               /* Quantity for Deal Price        */
    int DealPriceCents;        /* Cents for Deal Quantity        */
    char SpecialFlag;          /* 0 off, 10 on...display flag    */
    char CouponFlag;           /* 0 off, 10 on...display flag    */
    int Facings;               /* digit                          */
    int HorizTenths;           /* Tenths of inches               */
    int VertTenths;            /*                                */
    int DeepTenths;            /*                                */
}
```

This disclosure includes copyrightable material. While the copyright owner has no objection to facsimile reproduction of any material in Patent Office records, the copyright owner reserves all other copyright rights.

We claim:

1. An information display system comprising:
   at least one receiver for receiving transmitted information to be displayed;
   means for transmitting information to said at least one receiver;
   at least two independent displays each associated with a different product and each being mounted on a shelf and having an address defined by the associated product, and each connected to said one receiver by the same multi-wire parallel bus carrying both power for the displays and information signals for the displays, and each display being capable of displaying selected received information as determined by the address relating to the particular associated product; and means for optically locally programming the address of each display into the display when the display is mounted on the shelf and connected to the parallel lines.

2. The device of claim 1, wherein the means for transmitting comprises means for transmitting spread spectrum radio frequency signals.

3. The device of claim 1, wherein the means for transmitting comprises means for transmitting a product code and a decoded bit-mapped image of a price associated with the product code.

4. The device of claim 1, wherein the receiver draws all its electric power from at least one battery and the receiver includes means for detecting a low battery state and changing operation of the receiver in response thereto.

5. The device of claim 1, wherein the means for locally programming further comprises a port for locally being assigned a product code and other information relating to the address by light signals.

6. The device of claim 1, wherein each display comprises a liquid crystal display.

7. The device of claim 1, further comprising a light sensitive port in each displayed adaptive to changes in ambient light, and wherein each display further comprises means for displaying a first display of price information usually, a second display of unit price information in response to a user covering the optical port, and a third display of product order information in response to a user providing a higher than ambient light to the optical port.

8. The device of claim 1, wherein the receiver comprises:
   a receiving portion for receiving the information; and
   a logic portion; wherein the receiving portion is physically detachable from the logic portion.

9. The device of claim 1, wherein at least six displays are connected to said one receiver, and each display draws all required electric power from said one receiver.

10. The device of claim 1, further comprising means for providing electric power to the receiver at predetermined intervals, and also at a time as calculated by the receiver from received information when a display module connected to the receiver is receiving information via the receiver.

11. The device of claim 1, wherein the receiver further comprises means for acknowledging the receipt of the transmitted information.

12. The device of claim 1, wherein each display includes means for displaying graphic images transmitted by the means for transmitting as decoded bit-mapped data for directly driving specific segments of the display.

13. The device of claim 1, further comprising an input device for locally inputting data for programming a product code and price data into each display, the price data being input as decoded bit-mapped data for directly driving specific segments of the display.

14. The device of claim 13, wherein the input device includes means for interrogating each display for store product ordering information by a transition in light levels sensed by the display, the display adapting automatically for changes in ambient light level.

15. The device of claim 1, wherein each display includes means for indicating that no information has been received by the display for a particular time and in response thereto providing a visual indication on the display.

16. The device of claim 1, wherein each display comprises an area for displaying information other than the information transmitted to the display.

17. The device of claim 1, wherein the transmitted information comprises at least four images, and means for automatically alternating between two of the images, thereby displaying a flashing effect.

18. The device of claim 16, wherein the area for displaying information comprises a detachably portion of the display.

19. The device of claim 1, wherein the displays are one different tiers.

20. The device of claim 1, wherein the display includes a rails for protecting a surface of at least one of the displays.

21. The information display system of claim 1 further comprising:
   means for temporarily providing power to each display when a battery is removed from the receiver.

22. The device of claim 21, further comprising an interlock for preventing removal of the battery unless the means for temporarily providing power is provided.

23. The device of claim 1, further comprising means for providing a clock timing signal from a crystal oscillator in the receiver to each of the displays for operation thereof, thereby eliminating any need for a timing oscillator in the display modules.

24. An information display system comprising:
   at least one receiver for receiving transmitted information to be displayed;
   means for transmitting information to said at least one receiver;
   at least one display connected to each said receiver, each display being capable of displaying selected received information;
   means for alterably assigning an identifier to each display; and
   means for assigning related identifiers to a plurality of displays, each identifier including a product code and additional information uniquely identifying each display, wherein a plurality of displays located at different spaced-apart locations are assigned an identical product code.

25. A shelf rail assembly for attachment to a shelf comprising:
   a shelf rail for attachment to the shelf having a plurality of electrical loads;
   at least one display module fitting entirely into a recess in the shelf rail whereby no part of the display module extends out of the recess;
   a plurality of springs fitting between the display module and the shelf rail, wherein all of the springs must be compressed simultaneously to release the display module from the shelf rail; and
   means for electrically connecting the display module to the plurality of electrical leads.

26. The device of claim 25 wherein the shelf rail further comprises at least one extension which extends beyond the recess for protecting the display module.

27. The device of claim 25, further comprising a clip having a slanted end portion operatively connected to each spring, the slanted end portion fitting into a corresponding cavity defined by the shelf rail.

28. A display module for displaying information comprising:
   a display;
   an optical portion including alight source; and
   means for detecting light at the optical port and displaying information on the display in response to the detected light, wherein the means for detecting includes:
      means for detecting light from a wand inserted in the port including means for performing the detecting only when the light source in the optical port is not illuminated; and
      means for communicating with the wand by a handshaking.

29. A display module comprising:
   a display for displaying information;
   means for detecting at least three different levels of light wherein one of the three light levels is detected only if it is of at least 18 millisecond duration; and
   means for displaying particular information on the display in response to each of the three levels of light detected by the means for detecting.

30. The device of claim 29, wherein one of the levels of light is a predetermined sequence of light patterns.

31. An information display system comprising:
   at least one receiver for receiving transmitted information to be displayed;
   means for transmitting information to said at least one receiver;
   at least one display connected to each said receiver, each display being capable of displaying selected received information;
   wherein the receiver includes a receiver portion for receiving the transmitted information, and a processor for providing the received information to the displays, and the receiver further comprising:
   means for periodically providing electric power to the receiver portion, the receiver portion being in an inoperative state when electric power is not so provided; and
   means for operating the processor at tone speed when information is being received by the receiver portion, and at a lower speed at other predetermined times.

32. The device of claim 31, further comprising means for operating the display in a low power state when the display is not receiving information from the processor means.

33. A method for displaying information comprising the steps of:
   providing at least one receiver/transmitter for receiving transmitted information to be displayed;

providing a multi-wire parallel bus carrying both power for displays and information signals for the displays;

connecting at least two independent displays not having an address and each associated with a different product to said receiver/transmitter by said bus;

designating the associated product by locally programming a product code into each display;

sending the programmed product code from each display via the bus to the receiver;

transmitting the product code from the receiver/transmitter to a central controller;

sending price data for the associated product code from the central controller to each display via the receiver/transmitter and parallel bus; and display the price data sent to each display on the display.

34. An information display system comprising:

at least one receiver for receiving transmitted information to be displayed;

means for transmitting information to said at least one receiver;

at least two independent displays each associated with a different product and each connected to said one receiver by the same multi-wire parallel bus carrying both power for the displays and information signals for the displays, each display being capable of displaying selected received information relating to the particular associated product;

wherein the receiver draws all its electric power from at least one battery and the receiver includes means for detecting a low battery state and changing operation of the receiver in response thereto; and means for providing electric power to the receiver at predetermined intervals, and also at a time as calculated by the receiver at predetermined intervals, and also at a time as calculated by the receiver from received information when a display module connected to the receiver is receiving information via the receiver.

35. An information display system comprising:

at least one receiver for receiving transmitted information to be displayed;

means for transmitting information to said at least one receiver; and at least two independent displays each associated with a different product and each connected to said one receiver by the same multi-wire parallel bus carrying both power for the displays and information signals for the displays, and each display being capable of displaying selected received information relating to the particular associated product;

wherein each display includes means for indicating that no information has been received by the display for a particular time and in response thereto providing a visual indication on the display.

36. An information display system comprising:

at least one receiver for receiving transmitted information to be displayed;

means for transmitting information to said at least one receiver;

at least two independent displays each associated with a different product and each connected to said one receiver, each display being capable of displaying selected received information relating to the particular associated product; and means for providing electric power to the receiver at predetermined intervals, and also at a time as calculated by the receiver from received information when a display module connected to the receiver is receiving information via the receiver.

37. An information display system comprising:

at least one receiver for receiving transmitted information to be displayed;

means for transmitting information to said at least one receiver;

at least two independent displays each associated with a different product and each connected to said one receiver, each display being capable of displaying selected received information relating to the particular associated product; and wherein each display includes means for indicating that no information has been received by the display for a particular time and in response thereto providing a visual indication on the display.

38. An information display system comprising:

a transmitter for transmitting information;

a plurality of receiver/transmitter sets for receiving pricing information from the transmitter and transmitting information back to the transmitter;

at least two independent displays for displaying the pricing information associated with each of the receiver/transmitter sets, each display associated with a different product, each display connected to the associated transmitter by a parallel bus;

wherein the pricing information transmitted to the receiver/transmitter sets includes:

a first portion indicating the particular receiver/transmitter set to which the information is being transmitted; and a second portion including a product code and a price for the particular product associated with at least one of the displays connected to the particular receiver/transmitter set; and wherein the particular receiver/transmitter set processes only the first portion, and upon processing the first portion, sends the second portion to the parallel bus.

39. The apparatus of claim 38, wherein each receiver/transmitter set is turned on for receiving and transmitting a proportion of the time less than about 1%.

* * * * *